(12) United States Patent
Brown et al.

(10) Patent No.: US 7,962,521 B2
(45) Date of Patent: Jun. 14, 2011

(54) INDEX SELECTION IN A DATABASE SYSTEM

(75) Inventors: Douglas P. Brown, San Diego, CA (US); Jeetendra Chaware, Andhra Pradesh (IN); Manjula Koppuravuri, Andhra Pradesh (IN)

(73) Assignee: Teradata US, Inc., Dayton, OH (US)

( * ) Notice: Subject to any disclaimer, the term of this patent is extended or adjusted under 35 U.S.C. 154(b) by 124 days.

(21) Appl. No.: 12/396,184

(22) Filed: Mar. 2, 2009

(65) Prior Publication Data
US 2010/0057796 A1    Mar. 4, 2010

Related U.S. Application Data

(63) Continuation of application No. 09/977,038, filed on Oct. 12, 2001, now Pat. No. 7,499,907.

(51) Int. Cl.
*G06F 17/30* (2006.01)

(52) U.S. Cl. ........ 707/791; 707/601; 707/602; 707/608; 707/802; 707/828

(58) Field of Classification Search ........... 707/600–831
See application file for complete search history.

(56) References Cited

U.S. PATENT DOCUMENTS

| | | | |
|---|---|---|---|
| 5,303,383 A | 4/1994 | Neches | |
| 5,640,584 A | 6/1997 | Kandasamy | |
| 5,864,842 A | 1/1999 | Pederson | |
| 5,884,299 A | 3/1999 | Ramesh | |
| 5,960,423 A | 9/1999 | Chaudhuri | |
| 6,366,903 B1 | 4/2002 | Agrawal | |
| 6,513,029 B1 | 1/2003 | Agrawal | |
| 6,738,756 B1 | 5/2004 | Brown | |
| 6,801,903 B2 | 10/2004 | Brown | |
| 7,155,428 B1 | 12/2006 | Brown | |
| 2003/0088541 A1* | 5/2003 | Zilio et al. | ........................ 707/1 |
| 2003/0088546 A1 | 5/2003 | Brown | |

OTHER PUBLICATIONS

Oracle Corporation, "SQL Language: Reference Manual, Version 6.0," pp. 5-1 to 5-5, 5-96 to 5-97 (1990).
Douglas P. Brown et al., Teradata Solutions Group, "Real-Time Diagnostics Tools for Teradata's Parallel Query Optimizer, White-Paper," pp. 1-20 (Aug. 2000).
Eugene Wong et al., ACM Transactions on Database Systems, vol. 1, No. 3, "Decomposition-A Strategy for Query Processing," pp. 223-241 (Sep. 1976).
P. Griffiths Selinger et al., ACM, "Access Path Selection in a Relational Database Management System," pp. 23-34 (1979).
Masaru Kitsuregawa et al., Institute of Industrial Science, University of Tokyo, "Query Execution for Large Relations on Functional Disk System," pp. 159-167 (1989).
D.D. Chamberlin et al., "Views, Authorization, and Locking in a Relational Data Base System," National Computer Conference, pp. 425-430 (1975).
D.D. Chamberlin et al., "Sequel 2: A Unified Approach to Data Definition, Manipulation, and Control," IBM Journal of Research and Development, vol. 20, pp. 560-575 (Nov. 1976).

(Continued)

*Primary Examiner* — Isaac M Woo
(74) *Attorney, Agent, or Firm* — Trop, Pruner & Hu P.C.

(57) ABSTRACT

An index selection mechanism allows for efficient generation of index recommendations for a given workload of a database system. The workload includes a set of queries that are used to access tables in a database system. The index recommendations are validated to verify improved performance, followed by application of the indexes. Graphical user interface screens are provided to receive user input as well as to present reports to the user.

23 Claims, 44 Drawing Sheets

OTHER PUBLICATIONS

M.W. Blasgen et al., "On the Evaluation of Queries in a Relational Data Base System," IBM Research Report RJ 1745, pp. 1-44 (Apr. 1976).

M.W. Blasgen et al., "Storage and Access in Relational Data Bases," IBM Systems Journal, No. 4, pp. 363-377 (1977).

* cited by examiner

FIG. 20

| | ICON | DESCRIPTION |
|---|---|---|
| 800 |  | TO LOGON TO THE TERADATA RDBMS SERVER |
| 801 |  | TO LOG OFF FROM THE TERADATA RDBMS SERVER |
| 802 |  | TO SELECT THE STATEMENTS FROM THE DBQL |
| 803 |  | TO ENTER THE SQL STATEMENTS OR SELECT THEM FROM MORE THAN ONE FILE |
| 804 |  | TO SELECT THE SQL STATEMENTS FROM THE QCD |
| 805 |  | TO IMPORT A WORKLOAD FROM A PRODUCTION SYSTEM |
| 806 |  | TO SELECT AN EXISTING WORKLOAD |
| 807 |  | TO SET/RESET THE INDEX ANALYSIS PARAMETERS |
| 808 |  | TO START INDEX ANALYSIS |
| 809 |  | TO PERFORM "WHAT-IF" ANALYSIS |
| 810 |  | TO RESTART INDEX ANALYSIS FROM A CHECKPOINT |
| 811 |  | TO DISPLAY SUMMARY INFORMATION |
| 812 |  | TO VALIDATE THE INDEXES |
| 813 |  | TO SCHEDULE THE CREATION OF INDEXES |
| 814 |  | TO VIEW THE HELP CONTENTS |
| 815 |  | TO GUIDE THE USER HOW TO USE HELP |

FIG. 26

Existing Workload — 550

Workload Statements

QCD Name: TIWizQCD

Workload Name: MyWorkload

| State | Frequ | Statement Text |
|---|---|---|
| 1 | 1 | sel * from query;; |
| 2 | 1 | sel * from relation;; |

— 552

Workload Status

| Recommend | Index Tag | Validate Sy | Validate Ti | Validate Q | Recom |
|---|---|---|---|---|---|
| 2 | myindextag | deepika | 7:43.670000 | tiwizqcd | NONE |
| 1 | MyIndexT ac | deepika | 7:43.670000 | tiwizqcd | NONE |
| 2 | myindextag | deepika | 7:43.670000 | tiwizqcd | NONE |

— 554

Modify Options

☐ Qcd Statements

☐ Query Text

556 — Modify

OK    Cancel

FIG. 27

Existing Workload

Workload Statements

QCD Name: TIWizQCD      Workload Name: MyWorkload

| Selec | State | Frequ | Statement Text |
|---|---|---|---|
| ✓ | 1 | 1 | sel * from query;; |
| ☐ | 2 | 1 | sel * from relation;; |

Workload Status

| Recommend | Index Tag | Validate Sy | Validate Ti | Validate Q | Recom |
|---|---|---|---|---|---|
| 2 | myindextag | deepika | 7:43.670000 | tiwizqcd | NONE |
| 1 | MyIndexT ac | deepika | 7:43.670000 | tiwizqcd | NONE |
| 2 | myindextag | deepika | 7:43.670000 | tiwizqcd | NONE |

Modify Options
- ☐ Qcd Statements
- ☐ Query Text

New Workload Name: [ ]

[ Update ] — 559

[ OK ]  [ Cancel ]

Index Recommendation Report

QCD Name: tiwizqcd    Workload Name: myworkload    Index Tag: myindextag

| Table Name | Index Tag | Index T... | Size(KB) | Time Esti... | Index DDL | Stats DDL |
|---|---|---|---|---|---|---|
| QUERY | MyIndextag | USI | 10.00 | 59.00 | CREATE INDEX... | COLLECT STATS |
| RELATION | MyIndextag | USI | 10.00 | 59.00 | CREATE INDEX... | COLLECT STATS |
| RELATION | MyIndextag | USI | 10.00 | 59.00 | CREATE INDEX... | COLLECT STATS |

FIG. 33

Existing Indexes Report

QCD Name: TIWizQCD    Workload Name: myworkload    Index Tag: MyIndexTag

| Table Name | Index Name | Index Type | Columns |
|---|---|---|---|
| QUERY | PK_QueryID | P | QueryID |
| RELATION | PK_RelationKey | P | RelationKey |

FIG. 34

Query Cost Analysis Report — 640

QCD Name: TIWizQCD    Workload Name: myworkload    Index Tag: MyIndexTag

| Query Type | Cost(with existing i... | Cost(with recommended... | Percentage Cha... | Query Text... |
|---|---|---|---|---|
| SELECT | 100.00 | 50.00 | 100.00 | sel * from query,relation w |
| SELECT | 100.00 | 50.00 | 100.00 | sel * from query;; |
| SELECT | 100.00 | 50.00 | 100.00 | sel * from relation;; |

Disk Space Analysis Report

QCD Name: TIWizQCD    Workload Name: myworkload    Index Tag: MyIndexTag

| Table Name | Index Name | Size(KB) |
|---|---|---|
| QUERY | MyIndextag | 10.00 |
| RELATION | MyIndextag | 10.00 |
| RELATION | MyIndextag | 10.00 |

Table Usage Report

QCD Name: TIWizQCD    Workload Name: myworkload    Index Tag: MyIndexTag

| Table Name | Access Count | Statement Text |
|---|---|---|
| QUERY | 1 | sel * from query,relation where relation.relationid = query.queryid and query.qu |
| RELATION | 1 | sel * from query,relation where relation.relationid = query.queryid and query.qu |
| QUERY | 1 | sel * from query;; |
| RELATION | 1 | sel * from relation;; |

Workload Analysis Report

Workload Analysis Report

QCD Name: TIWizQCD    Workload Name: myworkload    Index Tag: MyIndexTag

| State... | Cost | Relative... | Table Na... | Columns | Columns involve... | Statement T |
|---|---|---|---|---|---|---|
| SELE... | 10... | 3.70 | RELATION | RelationKey, Cardinality, Geogl... | ? | sel * from q |
| SELE... | 10... | 3.70 | QUERY | QueryText, QUERYNAME, Que | QueryID, QUER... | sel * from q |
| SELE... | 10... | 3.70 | QUERY | UDB_KEY, QUERYNAME, Dat... | ? | sel * from q |
| SELE... | 10... | 3.70 | RELATION | SortInfo, VIEWNAME, UDB_KE... | ? | sel * from q |

Summary Report

QCD Name: TIWizQCD    Workload Name: myworkload    Index Tag: MyIndexTag

| Table Name | Index Name | Index DDL | Stats DDL |
|---|---|---|---|
| QUERY | MyIndextag | CREATE INDEX index_3 (QueryText) on Query; | COLLECT STATS Query IND |
| RELATION | MyIndextag | CREATE INDEX index_4 (name) on Relation; | COLLECT STATS Relation I |
| RELATION | MyIndextag | CREATE INDEX index_4 (name,TableName) o... | COLLECT STATS Relation I |

FIG. 40

Table Scan Report

QCD Name: tiwizqcd    Workload Name: myworkload

| Owner | Table Name | Cardinality | AMPs Retrieves... | Geograph... | Statement Text |
|---|---|---|---|---|---|
| tiwizqcd | QUERY | 45.00 | All AMP Retrieve | built locally | sel * from query,relation where query.que |
| tiwizqcd | QUERY | 45.00 | All AMP Retrieve | built locally | sel * from query,relation,workload where |
| tiwizqcd | QUERY | 45.00 | All AMP Retrieve | built locally | sel * from query,relation,workload;; |
| tiwizqcd | RELATION | 282.00 | All AMP Retrieve | built locally | sel * from query,relation where query.que |
| tiwizqcd | RELATION | 282.00 | All AMP Retrieve | built locally | sel * from query,relation,workload where |
| tiwizqcd | WORKLOAD | 2.00 | Single AMP Retr... | built locally | sel * from query,relation,workload where |
| tiwizqcd | WORKLOAD | 2.00 | All AMP Retrieve | built locally | sel * from query,relation,workload;; |

FIG. 41

Workload Clean Up — 710

Workload Statements

| QCD Name: | | Workload Name: |
|---|---|---|
| TIWizQCD ... | | MyWorkload ▼ |

— 712

| State | Frequ | Statement Text |
|---|---|---|
| 1 | 1 | sel * from query;; |
| 2 | 1 | sel * from relation;; |

Workload Status

— 714

| Selec | Recommend | Index Tag | Validate Sy | Validate Ti | Validate Q |
|---|---|---|---|---|---|
| ☑ | 2 | myindextag | deepika | 7:43.670000 | tiwizqcd |
| ☑ | 1 | MyIndexT ac | deepika | 7:43.670000 | tiwizqcd |
| ☑ | 2 | myindextag | deepika | 7:43.670000 | tiwizqcd |

Delete Options

☐ Delete Workload  ☑ Delete Analysis
☐ Delete Plans

[ Delete ]

[ OK ]  [ Cancel ]

INDEX SELECTION IN A DATABASE SYSTEM

CROSS REFERENCE TO RELATED APPLICATION

This is a continuation of U.S. Ser. No. 09/977,038, filed Oct. 12, 2001, now U.S. Pat. No. 7,499,907, which is incorporated herein by reference.

BACKGROUND

A database is a collection of stored data that is logically related and that is accessible by one or more users. A popular type of database is the relational database management system (RDBMS), which includes relational tables made up of rows and columns (also referred to as tuples and attributes). Each row represents an occurrence of an entity defined by a table, with an entity being a person, place, thing, or other object about which the table contains information.

To extract data from, or to update, a relational table in an RDBMS, queries according to a standard database-query language (e.g., Structured Query Language or SQL) are used. Examples of SQL include INSERT, SELECT, UPDATE, and DELETE.

As applications become increasingly sophisticated, and data storage needs become greater, higher performance database systems are used. One example of such a database system is the TERADATA® database management system from NCR Corporation. The TERADATA® database systems are parallel processing systems capable of handling relatively large amounts of data. In some arrangements, a database system includes multiple nodes that manage access to multiple portions of data to enhance concurrent processing of data access and updates. In TERADATA® database management systems, concurrent data processing is further enhanced by the use of virtual processors, referred to as access module processors (AMPs), to further divide database tasks. Each AMP is responsible for a logical disk space. In response to a query, one or more of the AMPs are invoked to perform database access, updates, and other manipulations.

A physical storage structure that is provided by some database management systems is an index. An index is a structure that provides relatively rapid access to the rows of a table based on the values of one or more columns. An index stores data values and pointers to the rows where those data values occur. An index can be arranged in ascending or descending order, so that the database management system can quickly search the index to find a particular value. The database management system can then follow the pointer to locate the row containing the value.

The advantage of having an index is that it speeds the execution of SQL statements with search conditions that refer to an indexed column or columns. Generally, it is desired to create an index for columns that are used frequently in search conditions (such as in the Where clause of a SELECT statement).

In the TERADATA® database management system, a primary index is defined for each table, and one or more secondary indexes are optionally defined for each table. In a database system having multiple access modules, such as AMPs in a TERADATA® database management system, the primary index is used for assigning a data row to a particular one of plural AMPs. In effect, the primary index determines the distribution of rows of a table across multiple AMPs of the database system.

As noted above, one or more secondary indexes can also be specified for each table. Secondary indexes are stored in sub-tables of the database system. A "sub-table" is also a relational table. The secondary index does not affect distribution of a table across multiple AMPs. However, the secondary index does add to overhead, since the secondary index is stored in sub-tables. Despite the extra storage required, secondary indexes, if properly used, can enhance database performance.

Proper selection of indexes (such as the primary and secondary indexes of the TERADATA® database management systems) is important for optimal database performance. This is also referred to as the index selection problem, which can be a difficult problem when applied to a sophisticated parallel database system. Conventionally, many database designers rely mostly on their application experience and intuition to manually make index design decisions. With the increasing complexity of some database applications (e.g., data warehousing applications, which contain thousands of tables, indexes, and complex queries), the ability of a database designer to effectively perform tuning of indexes becomes increasingly difficult.

SUMMARY

In general, an improved method and apparatus is provided for selecting indexes in a database system. For example, a system includes a first module adapted to receive a set of queries and to provide a set of candidate indexes for the set of queries. The first module is adapted to eliminate one or more candidate indexes based on one or more predetermined criteria. An optimizer is adapted to generate a recommended index from the set of candidate indexes.

Other or alternative features will become apparent from the following description, from the drawings, and from the claims.

BRIEF DESCRIPTION OF THE DRAWINGS

FIGS. 12-19 and 21-31 illustrate various graphical user interface screens of an index wizard tool.

FIG. 20 illustrates icons in the various graphical user interface screens.

FIGS. 32-40 illustrate various report screens of the index wizard tool.

FIG. 41 illustrates a screen for performing workload clean up.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 1:
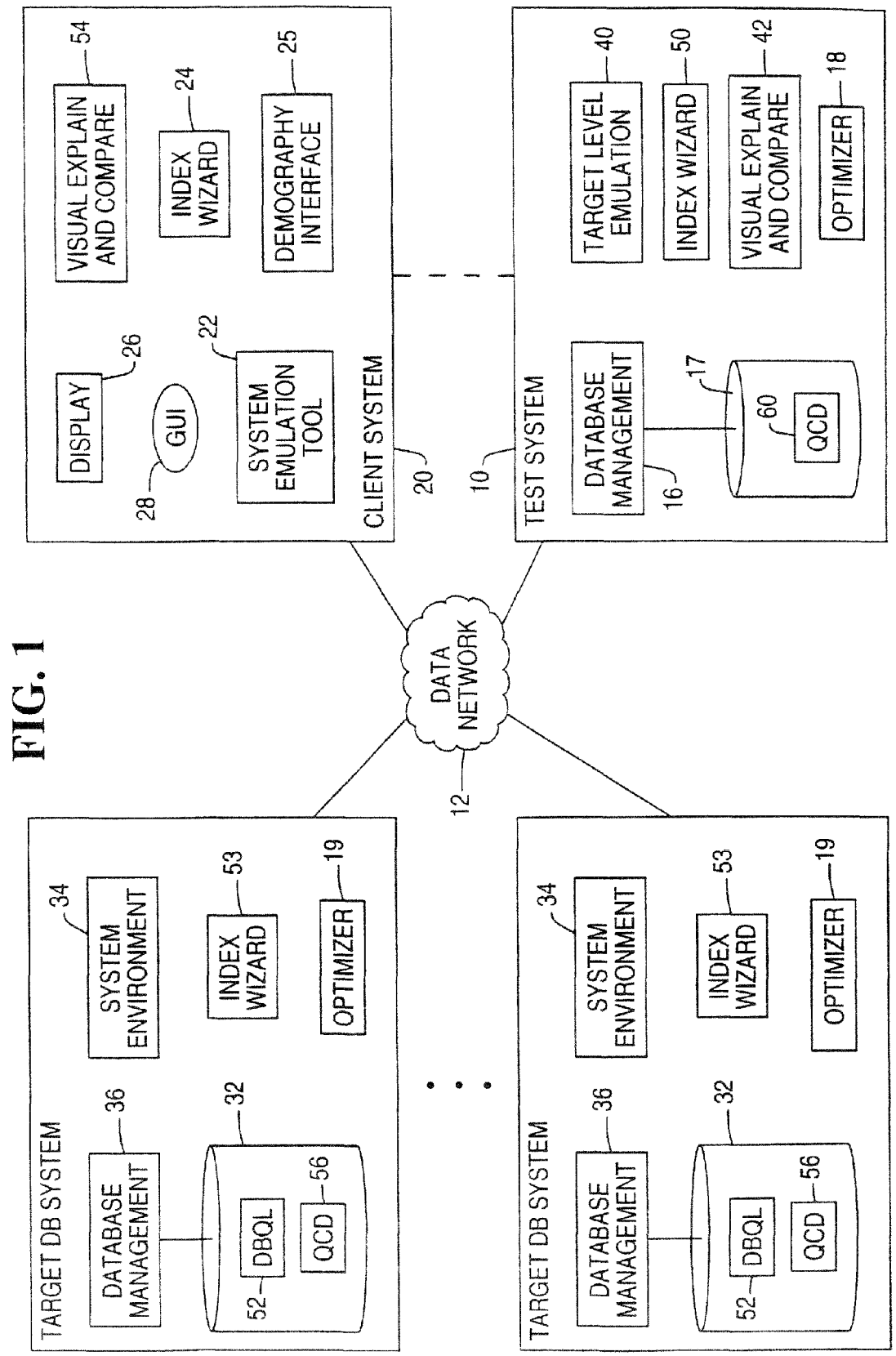
FIG. 1 is a block diagram of an example network of systems, including target database systems, a client system, and a test system.

FIG. 1 shows an example arrangement of several target database systems (14A, 14B), a test system 10, and a client system 20. In one example, the target database system 14A is located at a first customer site, while the target database system 14B is located at a second customer site. Essentially, each target database system 14 is a production system that is used by a customer.

The test system 10 is used to test database software before the database software is released for loading on the target database systems 14, which are production systems of customers. Note that although a separate client system 20 and test system 10 are shown, they can actually be combined into one system.

The client system 20 includes a system emulation tool 22, an index wizard client module 24, a visual explain and compare module 54, and a demography interface 25. The tasks of each of these modules are described in further detail below. In accordance with some embodiments, the index wizard client module 24, in combination with an index wizard server module 50 executable in the test system 10 or an index wizard server module 53 in a target database system 14, provide an improved mechanism of performing index selection on tables stored in a database system, such as one of the target database systems 14A, 14B.

If the test system 10 and client system 20 are integrated into a single platform, then the index wizard client module 24 and index wizard server module 50 are executed on the same platform. Alternatively, the index wizard server module 50 is omitted, with the index wizard client module interacting with the index wizard server module 53 in a target database system 14 to perform index selection.

Collectively, the index wizard client module 24 and index wizard server module 50 or 53 are part of an "index wizard tool." More generally, the index wizard tool is referred to as an index selection tool.

Each target database system 14 includes database management software 36 that manages access of data in a respective database made up of plural relational tables (stored in a storage system 32). In accordance with some embodiments, the database is distributed across plural nodes in each target database system 14. Such a multi-node parallel processing system is referred to as a massively parallel processing (MPP) system. Alternatively, the target system 14 is a single-node system having plural processors (sometimes referred to as a symmetric processing system or SMP). In yet another embodiment, a single-node system having a single processor can be used for implementing a database system.

As used here, a "parallel system" refers to a multi-node multi-processing system, a single-node system having plural CPUs (e.g., an SMP system), or a single-node system running multiple virtual processors on one or more CPUs. A "parallel database system" or "parallel database" refers to a database system or database implemented in the parallel system.

Each target database system 14 is associated with a system environment 34, which is made up of system-specific information as well as database-level information of each target system. Thus, as used here, "environment information" of a target database system refers to the system-specific information, database-level information, or any portion of the system-specific or database-level information.

System-specific information includes such information as the number of nodes in the target system, the number of processors or central processing units (CPUs) per node, the number of virtual processors in each node, and other system information. Database-level information includes statistics, random samples of virtual processors, data manipulation language (DML) statements, data definition language (DDL) statements, and the actual data of the database itself.

Statistics include information on how data is structured in the database, the number of rows in a table, the data demographics of a table, and approximations of the distributions of particular data values in columns (or attributes) of a table (or relation). Random samples refer to samples captured from virtual processors, which are software modules that manage access of respective portions of a database. The random samples contain the data demographics of the database portions managed by the virtual processors. DDL statements affect the structure of database objects, and may include statements such as SQL (Structured Query Language) ALTER statements (to redefine or alter databases, tables, indexes, etc.), CREATE statements (to create databases, indexes, tables, etc.), and so forth. DML statements are statements that manipulate data, such as the COMMIT statement (to make permanent all changes since the beginning of a transaction), DELETE statement (to remove rows from a table), INSERT statement (to add a new row to a table), SELECT statement (to perform a query by selecting rows and columns from one or more tables), UPDATE statement (to change data in a table), and so forth.

The target database systems 14A, 14B are coupled to a data network 12. The data network 12 can be a private network, or it can be a public network such as the Internet. Communications over the data network 12 according to one of various techniques and protocols.

The system emulation tool 22 in the client system 20 is able to export target-level emulation (TLE) data from the target database system 14A, 14B over the data network 12. Once the TLE date is stored in data files in the client system 20, the system emulation tool 22 sends the TLE data to the test system 10. This is referred to as importing the TLE data to the test system 10.

The TLE data exported by the system emulation tool 22 includes environment information, such as cost-related information, statistics, random samples, DDL statements, DML statements, actual database data, and so forth, from the database target systems 14. The environment information is then imported to the test system 10, with the environment information maintained as target-level emulation data 40. With the ability to export TLE data from a target database system 14 and to import the TLE data into the test system 10, an accurate test environment (to emulate a target database system 14) can be created in the test system 10 in which various tests can be performed. Providing an accurate test environment can be beneficial if the test system 10 is a relatively unsophisticated system (when compared to a target database system 14).

Thus, for example, a laptop computer can be used to emulate an MPP database system by emulating the environment of the MPP system.

The test system 10 further includes an optimizer module 18 that selects a query plan from among several possible query plans for a given SQL query that accesses data in a database (stored in storage system 17) managed by database management software 16. For more accurate performance determinations, the optimizer module 18 uses the target-level emulation data 40 that has been imported from the system emulation tool 22 to form a test environment in the test system 10 to emulate a desired target system. Running in the emulated environment, the optimizer module 18 identifies and selects the most efficient query plan (or one of the more efficient query plans) for a given query. Based on test performed in the emulated environment, expected performance of various queries in the target database system can be determined. As explained further below, the optimizer module 18 is executed in the emulated environment to perform index selection.

For a given query, the optimizer module 18 identifies a query plan that has the lowest, or one of the lowest, response times. The response time is the amount of time it takes to complete the execution of the query. One technique of query optimization uses a cost model to estimate the response time of a given query plan and to search the space of query plans that return a plan with low cost. In the cost-based optimization model, different methods for doing a unit of work is compared in the most efficient method is selected (the plan with the lowest cost). Because a number of alternatives can be quite large, especially in a parallel database system with a large number of nodes storing a large relational database (with many tables), the optimizer module 18 uses statistics and/or sampling techniques to reduce the search space in optimizing queries. Each target database system 14 also includes an optimizer module 19.

In accordance with some embodiments of the invention, the optimizer 18 or 19 is also part of the index wizard tool. The index wizard server module 50 provides candidate indexes and statistics to the optimizer module, which generates an index recommendation based on cost analysis.

A query plan generated by the optimizer module 18 is stored in a table of a query capture database (QCD) 60. The QCD 60 is made up of several tables. The captured query plans are stored in a table in the QCD 60. The query plans captured in the QCD 60 are available to various analysis tools, including the index wizard server module 50.

The test system 10 can optionally include a visual explain and compare tool 42, which is in addition to or in place of the visual explain and compare tool 54 in the client system 20. The visual explain and compare module 42 or 54 provides a graphical user interface in which steps of a query plan are displayed. Each step of the query plan is depicted as an icon, with the icons connected by lines to represent the flow of the steps in the query plan. The icons are designed to represent objects such as relational algebraic (e.g., select, project, join); physical algebraic operators such as nested join, merge join, hash join, and so forth; tables; sorts; redistribution; views; duplications; and other objects.

Another feature of the visual explain and compare module 42 or 54 is its ability to graphically or visually compare plural query plans for a given query, with the plural query plans generated under different conditions. This provides the user with the ability to analyze differences between different query plans. Thus, for example, the comparison can be made of query plans for different indexes selected by the index wizard server module 50 that runs in the test system 10.

The index wizard tool automates the index selection process by recommending a set of indexes for a particular workload, which corresponds to a set of queries that are captured from a target database system 14 (e.g., from a database query log or a query capture database). Thus, the index wizard tool takes as input a workload from a specified system. The workload includes a set of SQL queries such as SELECT, UPDATE, INSERT, and DELETE statements. The workload can also be a single SQL query.

Based on the workload, the index wizard tool recommends a set of indexes that are appropriate for the given workload. If the target database systems 14A, 14B are TERADATA® database systems from NCR Corporation, then the indexes recommended are secondary indexes. The indexes recommended can also be primary indexes. However, note that although reference is made to selecting secondary indexes in this discussion, the invention is not to be limited in scope to selection of secondary indexes. In other types of database systems, other types of indexes can be selected. Thus, the term "index" or "indexes" is intended to cover any index that can be used to enhance table access in a database system. There are several types of secondary indexes, including a unique secondary index (USI) and a non-unique secondary index (NUSI).

The workload can be generated by logging activity in each of the target database systems 14A, 14B. The logged queries are stored in a database query log (DBQL) 52 in each target database system 14. In addition to storing the query, the database query log 52 can also store performance related data for requests such as an account identifier, usage of objects, rows returned, start and finish times, and so forth. The database query log can include various DBQL tables, including a rule table, a main table, a table to store query objects, a table to store query step information, a table to store the SQL statement of a query, a table to store summary and threshold information, and a table to store explain information.

Alternatively, instead of retrieving the workload from the database query log 52, the workload can be retrieved from a QCD 56 in the target database system 14.

Figure 2:
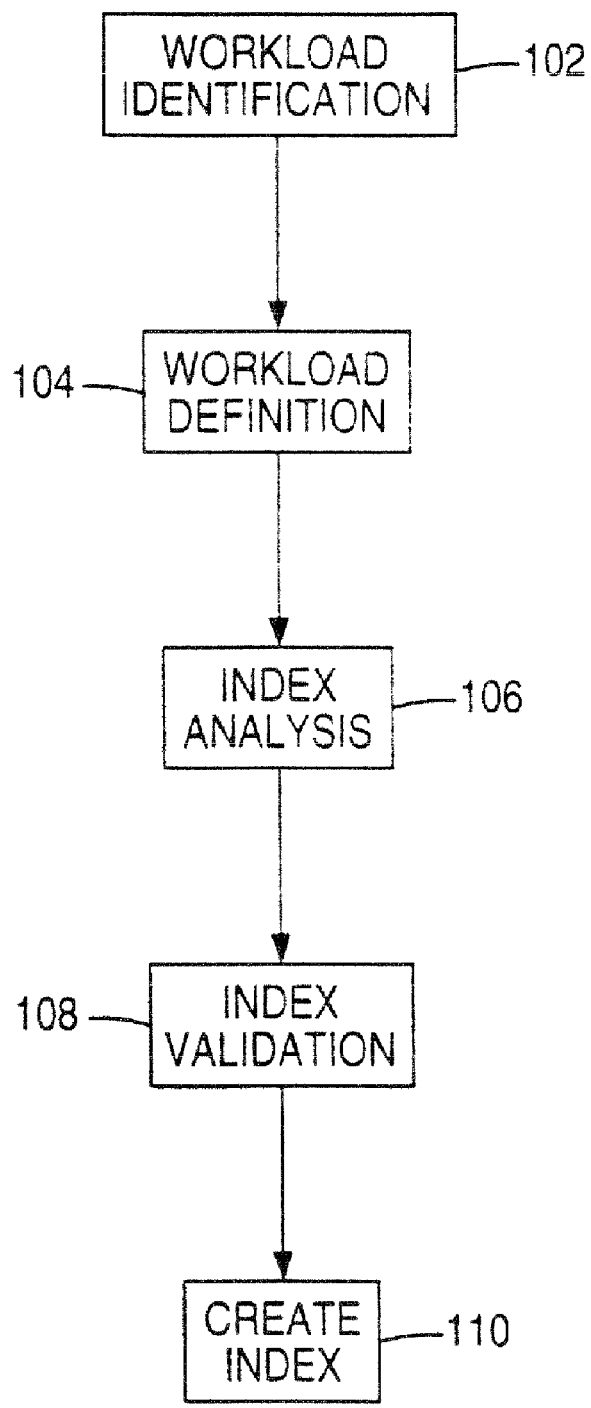
FIG. 2 is a flow diagram of a procedure of performing index selection in accordance with an embodiment.

FIG. 2 shows the general tasks performed by the index wizard tool, in accordance with one embodiment. First, the index wizard tool performs (at 102) workload identification, which involves the identification of the SQL statements for performance analysis. The workload can be input from the database query log 52, or alternatively, the workload is captured from the QCD 56 where execution plans are saved.

Next, the workload is defined (at 104) on the database system, which can be either the test system 10 or a target database system 14. After definition of the workload, the index wizard tool performs index analysis (at 106) on the defined workload to generate the index recommendations. The index recommendations are then validated (at 108) on the target database system 14. In the validation phase, the cost of a modified plan (with the recommended index) is compared with the cost of the original plan (without the recommended index). After validation, the index wizard tool applies the index recommendations on the target database system 14, which involves the submission of one or more DDL statements to the target database system 14 to create (at 110) the recommended indexes.

The index identification (at 102) is performed by the index wizard client module 24 in the client system 20, such as in response to user input. Thus, for example, the user (through one or more graphical user interface screens presented in the display 26 of the client system 20) can issue queries to the DBQL to identify queries that are candidates for performance improvement. Alternatively, using the visual explain and compare module 54, a query can be submitted to the QCD to extract the queries. Yet another option is for the user to type in specific SQL statements manually in the graphical user interface screen provided by the index wizard client module 24.

Figure 3:
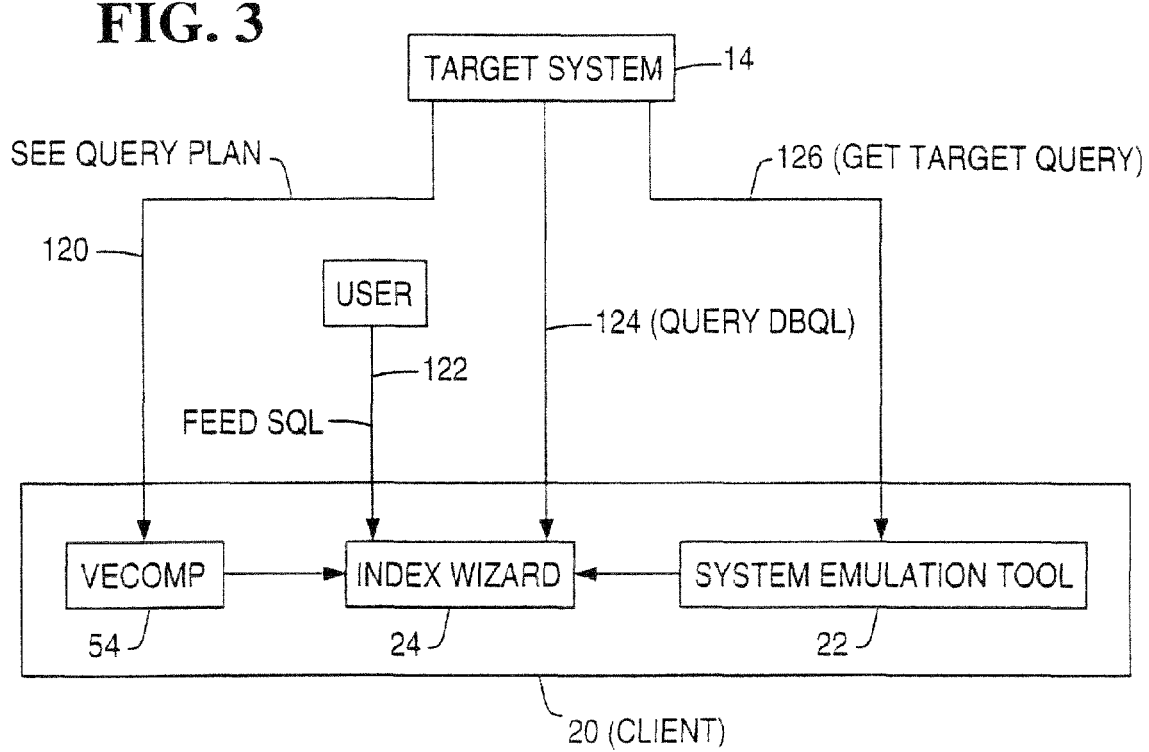
FIG. 3 illustrates a workload identification task performed in the procedure of FIG. 2.

As shown in FIG. 3, the query plan(s) are retrieved (at 120) from the QCD 56 in the target database system 14. Alternatively, the user can manually type in the query(ies) that make up the workload (at 122). The input can also be input (at 122) from a file stored somewhere (either in the client system 20 or in the target database system 14). Another option is for the index wizard client module 24 to fetch (at 124) DBQL data from the database query log 52 in the target database system 14. As yet another option, one or more queries are exported (at 126) using the system emulation tool 22 to be included in the workload that is input to the index wizard client module 24.

Figure 4:
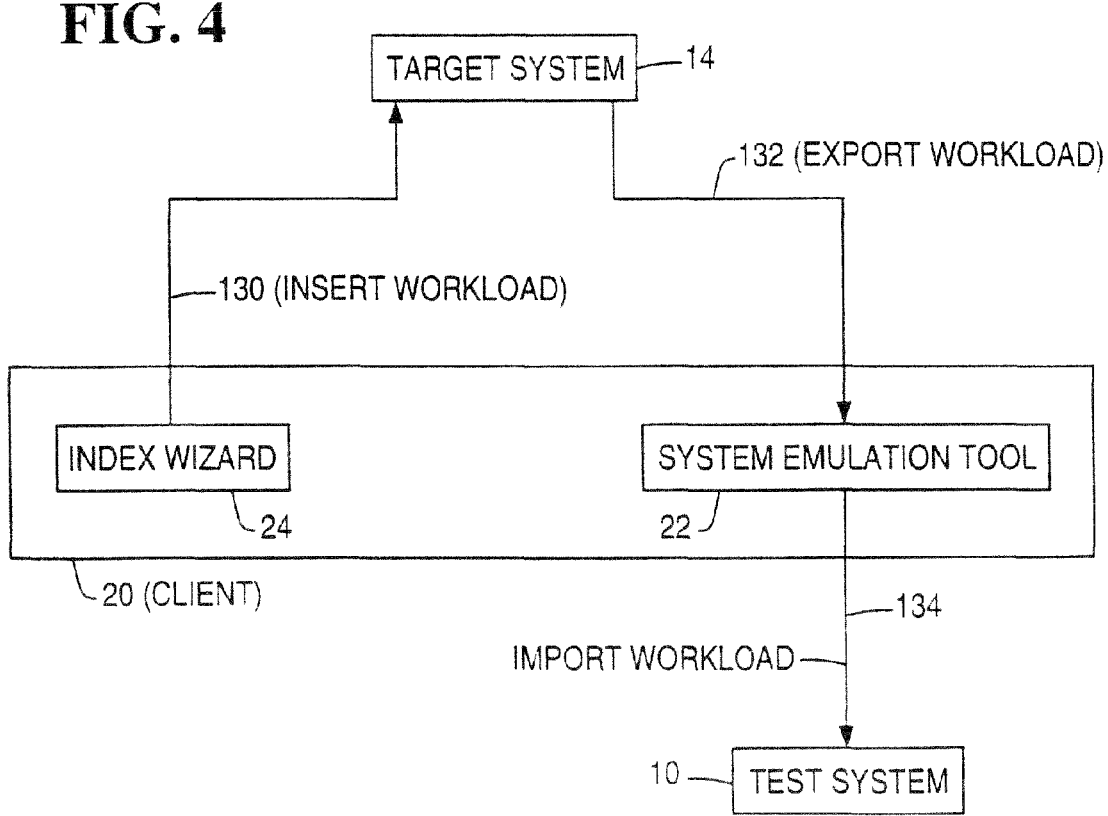
FIG. 4 illustrates a workload definition task performed in the procedure of FIG. 2.

FIG. 4 illustrates the workload definition task (104). The workload is registered in the target database system 14 to enable the use of workload data for index analysis. After identifying the set of SQL statements (at 102) that are potential candidates for performance tuning, the user submits (at 130) SQL statements with an INSERT EXPLAIN modifier from the index wizard client module 24 to capture query plans in the QCD 56 of the target database system 14. Once the plans are captured in the QCD 56, the workload is defined by associating the queries with the workload.

Figure 5:
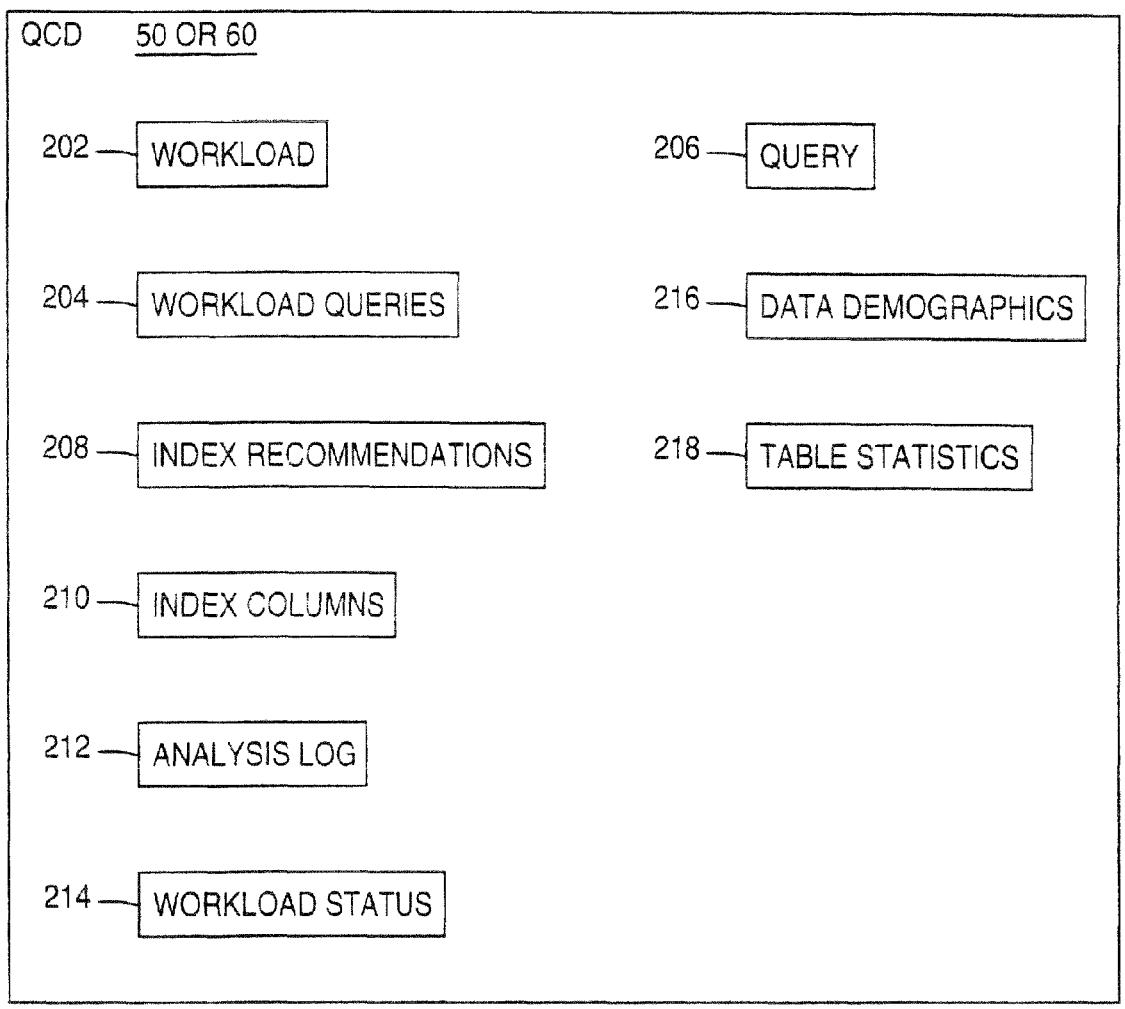
FIG. 5 illustrates tables in a query capture database (QCD) used by the index selection procedure of FIG. 2.

As shown in FIG. 5, the QCD 56 includes several tables, including a Workload table 202 and a WorkloadQueries table 204. The Workload table 202 is used to register the workload name in the QCD 56. The workload has a workload identifier (ID) that is used to link the workload with queries. The WorkloadQueries table 204 has the association of queries with a given workload.

The following provides an example of defining the workload. First, the query plans are captured in the QCD 56 using the INSERT EXPLAIN statement modifier. Example statements are provided below:

INSERT EXPLAIN FOR 10 WITH STATISTICS INTO MyQCD SELECT * FROM tab1;
 INSERT EXPLAIN FOR 10 WITH STATISTICS INTO MyQCD SELECT * FROM tab2 WHERE tab2.j BETWEEN 10 AND 100;
 INSERT EXPLAIN FOR 10 WITH STATISTICS INTO MyQCD SELECT * FROM tab3;

As specified in the example statements, the QCD 56 has a name MyQCD. The queries specified in the three example statements are as follows:

SELECT * FROM tab1;
 SELECT * FROM tab2 WHERE tab2.j BETWEEN 10 and 100;
 SELECT * FROM tab3.

These queries are stored in a Query table 206 in the QCD 56. The "WITH STATISTICS" clause indicates that demographics information is desired. Demographics information includes information such as disk utilization information of a table on each access module, the row count and average row size of a table on each access module, column statistics, and blocks distribution, as examples. The demographics information is stored in a DataDemographics table 216 (FIG. 5) by the demography interface 25. Details regarding the capture and display of demographics information is discussed in U.S. patent application Ser. No. 09/976,632, U.S. Patent Publication No. 2003/0088546, entitled "COLLECTING AND/OR PRESENTING DEMOGRAPHICS INFORMATION IN A DATABASE SYSTEM", filed on Oct. 12, 2001, which is hereby incorporated by reference.

The "FOR 10" clause indicates the number of times (frequency) the specified SQL statement is executed. In this example, the frequency is 10.

A row is then inserted into the Workload table 202 to register the workload name. A workload ID is obtained for the workload. Using query IDs returned in response to the INSERT EXPLAIN statements, all queries from the Query table 206 along with the associated query frequencies are inserted into the WorkloadQueries table 204.

The insertion of data into the workload table 202 and the WorkloadQueries table 204 can be accomplished using macros or other predefined routines that can be invoked by the index wizard tool.

Additional query plans can be captured using statements with the INSERT EXPLAIN modifier. Using query IDs, the associated queries and corresponding frequencies are inserted into the WorkloadQueries table 204. Entries in the WorkloadQueries table can also be deleted.

As further shown in FIG. 4, the workload is exported (at 132) from the QCD 56 in the target database system 14. The exporting is performed by the system emulation tool 22. The system emulation tool 22 then imports the workload (at 134) into the QCD 60 of the test system 10 for index analysis.

Figure 6:
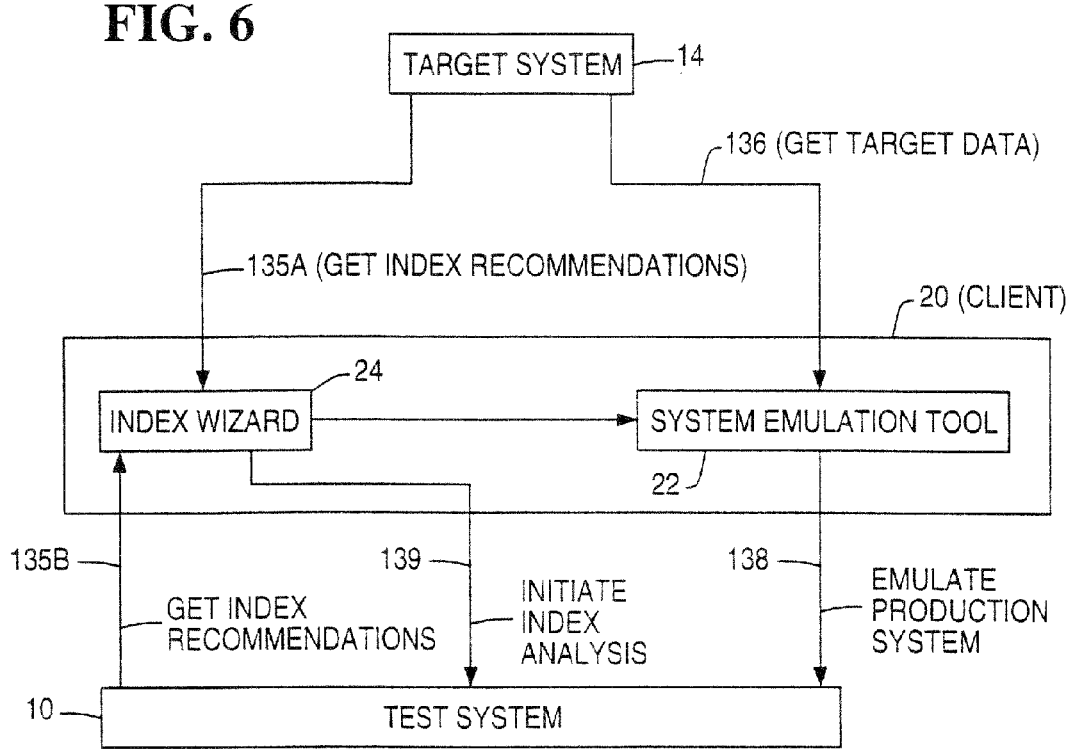
FIG. 6 illustrates an index analysis task performed in the procedure of FIG. 2.

Following workload definition (104 in FIG. 2), index analysis (106) is performed. As shown in FIG. 6, if the index analysis is performed in the test system 10, the client system 20 invokes the system emulation tool 22 to obtain TLE data (cost parameters, random AMP samples, and so forth) from the target database system 14. The system emulation tool 22 exports (at 136) the TLE data from the target database system 14. Next, the TLE data from the target database system 14 is imported (at 138) into the test system 10 at a session level to emulate the target database system 14. If the analysis is performed in the database system instead of the test system, then the TLE data export and import tasks can be skipped.

Index analysis is then performed in the test system 10 by the index wizard server module 50. The workload to be analyzed is submitted in an INITIATE INDEX ANALYSIS statement sent (at 139) from the index wizard client module 24 to the test system 10. If the index analysis is performed in the target database system 14, the INITIATE INDEX ANALYSIS statement is submitted to the target database system 14 instead.

The INITIATE INDEX ANALYSIS statement has the following syntax (according to one embodiment):

```
INITIATE INDEX ANALYSIS
    [ON <TableList>]
    FOR <WorkloadName>
    IN <QCDName>
    AS <IndexNameTag>
    [SET <Option> = <number> { [, <Option> = <number>]} ... ]
    [KEEP INDEX]
    [CHECKPOINT <NumberOfQueries>];
    <Options> ::= IndexesPerTable
                 |SearchSpace
                 |ChangeRate
                 |ColumnsPerIndex
```

The INITIATE INDEX ANALYSIS element indicates an index analysis mode for the session in the system. The <TableList> element specifies a list of tables that are to be considered for index recommendations. The <WorkloadName> element specifies the workload to which the queries to be analyzed belong. The <QCDName> element identifies the QCD in which the Workload table is present. The index recommendations are also saved in the identified QCD (in an IndexRecommendations table 208). The <IndexNameTag> element defines a name for the index recommendations that are provided. The SET element allows a user to set the threshold values for parameters during the index analysis phase. The IndexesPerTable element indicates that the indexes on a table should not exceed a specified number. The SearchSpace element indicates the maximum number of candidate indexes that are searched for a given table. The ChangeRate element indicates whether a column can or cannot participate in an index. The index wizard tool considers a column as an index candidate if the change rate value for the column is less than this specified limit. The ColumnsPerIndex element indicates the maximum number of columns that make up a multi-column index recommended by the index wizard tool.

Each of the parameters identified above in the INITIATE INDEX ANALYSIS statement can be specified by the user in one or more GUI screens presented by the index wizard client module 24. The index wizard GUI screens are described below.

As discussed in further detail below, the index wizard server module 50 is implemented in a parsing engine of the test system 10 or database system 14. The parsing engine also includes the optimizer 18 or 19. The index wizard server module 50 invokes the optimizer to perform cost analysis of a query for a given a candidate index. A recommended index is generated based on the cost analysis performed by the optimizer. The index wizard server module 50 submits the candidate indexes, along with statistics, to the optimizer module, which generates the recommended index based on a least-cost analysis.

The index recommendations generated in response to INITIATE INDEX ANALYSIS statement are stored in the IndexRecommendations table 208 and an IndexColumns table 210 of the specified QCD. The Index Recommendations table 208 captures the recommendations obtained during index analysis, while the IndexColumns table 210 captures the columns of the indexes recommended for the queries.

The KEEP INDEX element is specified to indicate that existing indexes are not to be removed during the analysis. The CHECKPOINT element defines points in the index analysis where the index wizard tool pauses to record that the system has analyzed a specified number of queries for index recommendations. A record of this is saved in the Analysis-Log table 212 of the QCD to save the information pertaining to the analysis thus far. This information can be used for restarting the index analysis in case the current index analysis operation is terminated prematurely.

The objective of the index analysis is to recommend a set of indexes on the different tables referenced in the workload (and listed in the INITIATE INDEX ANALYSIS statement) that provides the maximum improvement in the response time of the workload.

There are two possible index types: unique secondary index (USI) or non-unique secondary index (NUSI). A NUSI can include a VOSI (value ordered secondary index) or a covered secondary index. The index type is set to USI if the data demographics for the column(s) indicate that the number of distinct values of the column equals the table cardinality. If the condition above is not satisfied, then the index type is set to NUSI.

After the index recommendations have been generated the index wizard client module requests the index recommendations from the test system 10 or database system 14 (135B or 135A), depending on which performed the index analysis. The client system 10 can optionally display the index recommendations (such as in response to user request).

To create the IndexRecommendations table 208, the following statement can be used (in one example implementation):

```
CREATE TABLE IndexRecommendations (
        WorkLoadID
        UserName
        TimeOfAnalysis
        RecommendationID
        QueryID
        IndexID
        IndexNameTag
        TableName
        DatabaseName
        TableID
        IndexType
        IndexTypeText
        StatisticsInfo
        OriginalCost
        NewCost
        SpaceEstimate
        TimeEstimate
        DropFlag
        IndexDDL
        StatsDDL
        Remarks
        AnalysisData
        IndexesPerTable
        SearchSpaceSize
        ChangeRateThreshold
        ColumnsPerIndex  )
```

The attribute WorkloadID identifies the workload, and the attribute UserName names the user who performed the index analysis. The TimeOfAnalysis parameter is the time when the index recommendations were analyzed. The RecommendationID refers to a system generated unique identifier for the recommendation. QueryID refers to the query identifier of the workload database for which the current entry is an index recommendation. IndexID refers to the unique index identifier given by the system for an index. IndexNameTag refers to the name of the index recommendation as specified in the SQL INITIATE INDEX ANALYSIS statement.

The parameter TableName indicates the name of the table for which the current row defines a recommendation, and the parameter DatabaseName indicates the name of the database containing TableName. TableID is the internal identifier for the table. IndexType indicates the type of index, and IndexTypeText is the textual representation of IndexType.

StatisticsInfo refers to the statistics based on which the index recommendations have been made. OriginalCost is the original estimated cost of the query without the index recommendations, and NewCost is the new estimated cost with the index recommendations. Cost improvement can be obtained by comparing NewCost with OriginalCost.

The parameter SpaceEstimate is the approximate estimate of the space the index occupies when created, and TimeEstimate is the estimated time it takes to act on the recommendation. A parameter DropFlag is set to true in case the specified index is recommended for dropping. The parameter IndexDDL is the DDL text for creating the index in the target database system, and the parameter StatsDDL is the DDL text for the SQL COLLECT STATISTICS statements.

The parameter Remarks provides the details of the analysis involved in making the index recommendation, and the parameter AnalysisData provides the results of the predicate analysis. The parameter IndexPerTable records the specified limit on a number of indexes on a given table, and the parameter SearchSpaceSize records the maximum number of candidate indexes that are searched on a given table. The parameter ChangeRateThreshold records the threshold value of the column volatility specified by the user. The parameter ColumnsPerIndex records the maximum number of columns permissible in the index during the index analysis.

To create the IndexColumns table 210, the following statement can be used (in one example implementation):

```
CREATE TABLE IndexColumns (
    WorkLoadID
    RecommendationID
    TableID
    IndexID
    ColumnName    )
```

The WorkloadID parameter identifies the workload, and the RecommendationID parameter refers to the recommendation identifier in the IndexRecommendations table 208. The TableID refers to the table identifier in the IndexRecommendations table 208, and the IndexID parameter refers to the index identifier in the IndexRecommendations table 208. The ColumnName parameter contains the name of the column in the index.

The index recommendations made by the index wizard server module 50 and optimizer module 18 or 19 in the test system 10 are optionally validated before actually applying the recommendations on the target database system 14. The index recommendations are retrieved (at 152) from the QCD 60 in the test system 10, or alternatively, the index recommendations are retrieved (at 150) from the target database system 14.

Figure 7:
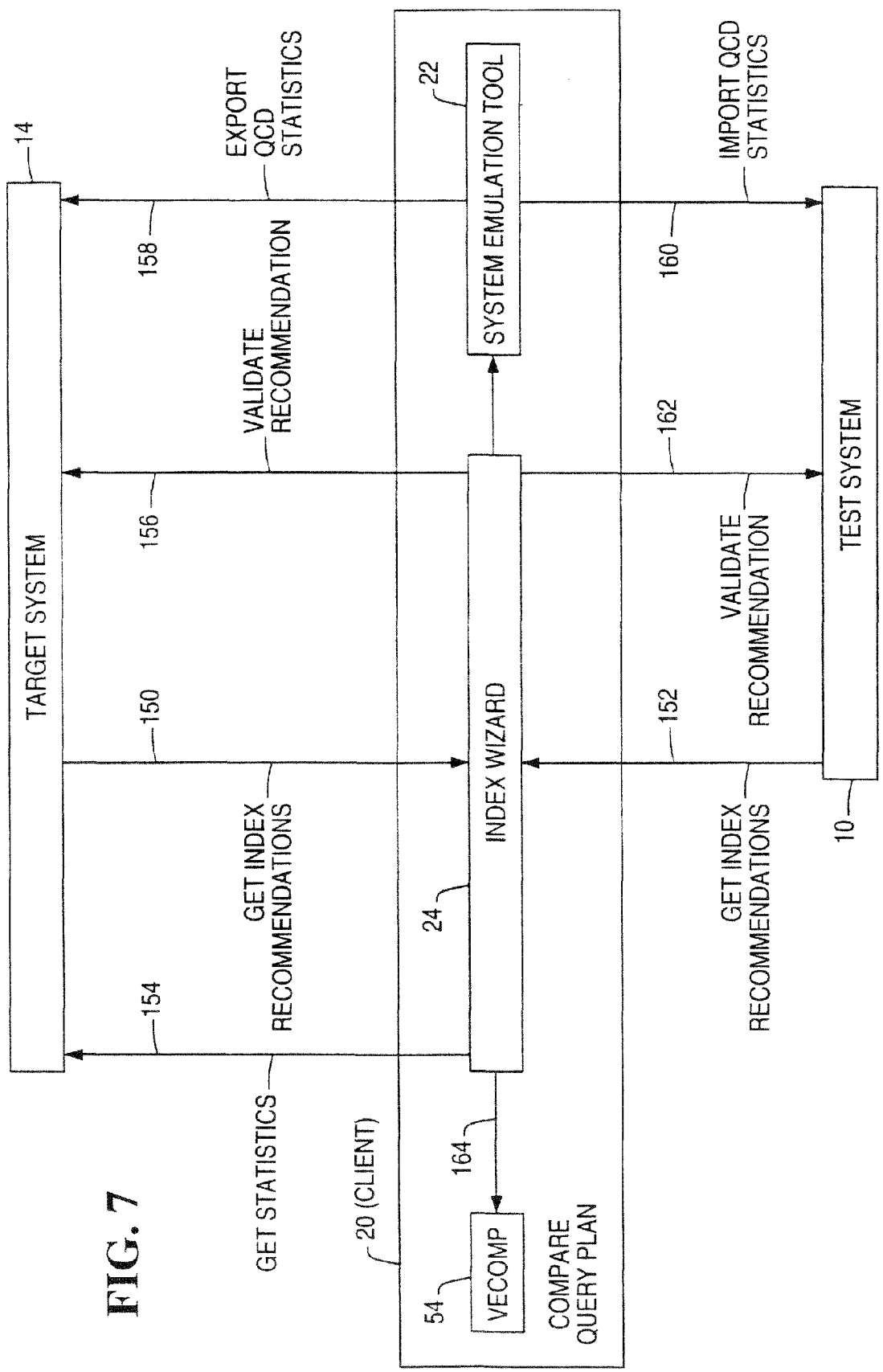
FIG. 7 illustrates an index validation task performed in the procedure of FIG. 2.

After the index recommendations are retrieved, the index wizard client module 24 submits commands (at 154) to capture statistics from the production system (one of the target database systems 14). The statistics can be captured using a new SQL COLLECT STATISTICS statement (described below) that collects statistics based on a specified percentage (less than 100) of the entire table. Alternatively, a collect statistics mechanism that is based on a full table scan be used. The command(s) to capture statistics is issued at 154 (FIG. 7). The statistics collected, using either the sample technique or the full table scan technique, are stored in a TableStatistics table 218 in the QCD. A more detailed discussion of collecting statistics based on a sample of a table is discussed in U.S. patent application Ser. No. 09/976,634, U.S. Pat. No. 6,801,903, entitled "COLLECTING STATISTICS IN A DATABASE SYSTEM", filed on Oct. 12, 2001, hereby incorporated by reference. The percentage used can be specified by the user in a user interface.

Figure 47:
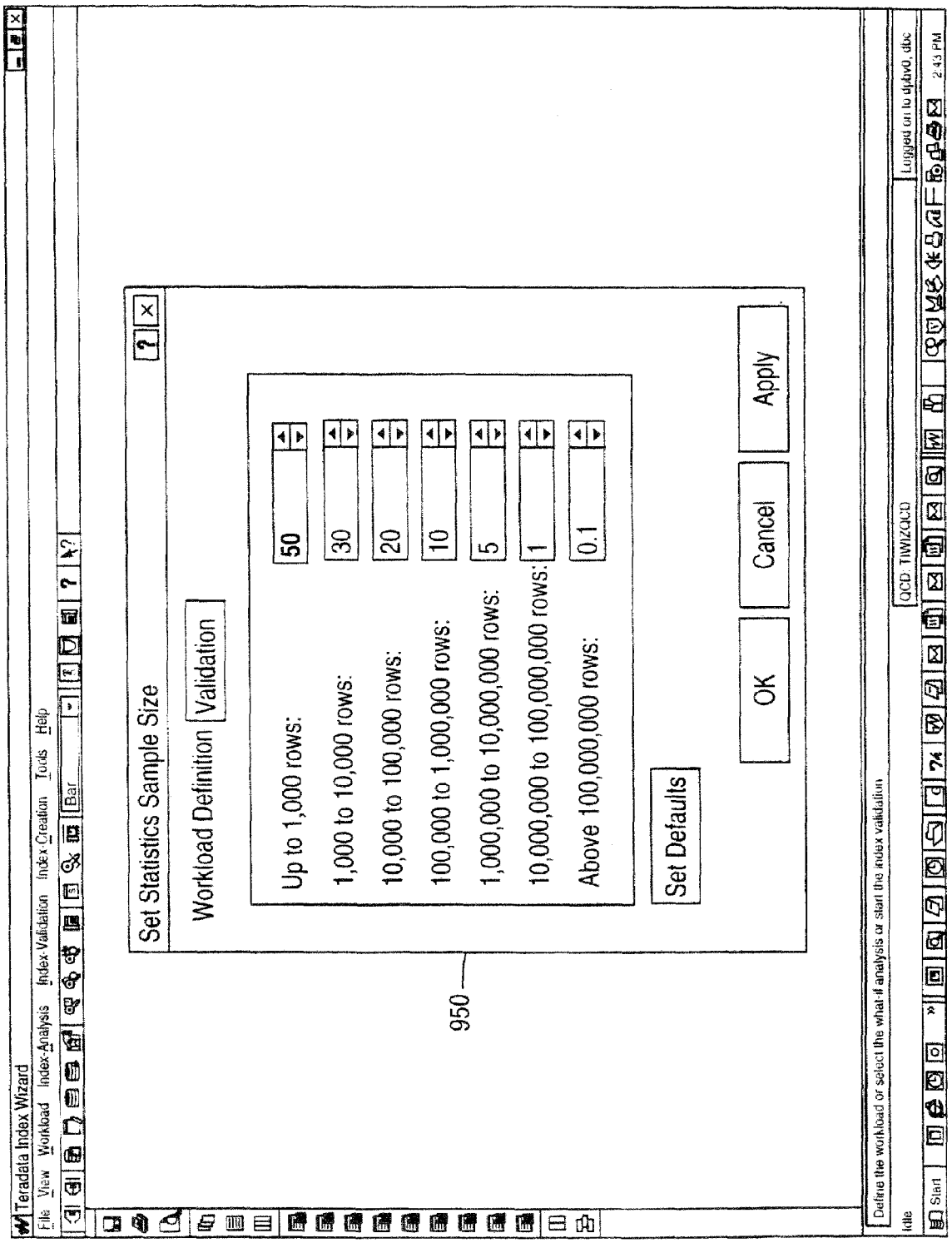
FIG. 47 illustrates a screen to set statistics sample size.

One example user interface is shown in FIG. 47, which includes a Set Statistics Sample Size screen 950. In the illustrated example, for tables having up to 1000 rows, 50% is set. For tables having 1000 to 10,000 rows, 30% is set. For tables having 10,000 to 100,000 rows, 20% is set. For tables having 1000,000 to 1,000,000 rows, 10% is set. For tables having 1,000,000 to 10,000,000 rows, 5% is set. For tables having greater than 10,000,000 rows 1% is set. Other percentages can be specified in other embodiments, as adjusted by a user. The Set Statistics Sample Size screen 950 can be launched from a What-If Analysis screen 590 (FIG. 31), described further below.

The validation is performed on either the target system 14 or on the test system 10. If the test system 10 is used, the statistics collected are collected on the target database system 14, and the system emulation tool 22 exports (at 158) the statistics from the QCD in the target database system 14. The statistics are imported (at 160) into the QCD 60 in the test system 10.

After loading the statistics, the index wizard client module 24 issues a command (at 162) to perform validation of the indexes in the test system 10.

In one embodiment, this statement is an SQL DIAGNOSTIC statement that enables an index validation mode for a given session level. In the index validation phase, the index recommendations are made available to the optimizer module 18 in the test system 10 for generating a query plan. During the validation phase, the modified plan that is based on the index recommendations is captured in the QCD 60 of the test system 10. The modified plan is compared with the original plan using the visual explain and compare module 42 or 54.

Alternatively, the validation can be performed in the target database system 14 (instead of the test system 10). In this case, the index wizard client module 24 submits the SQL DIAGNOSTIC statement (at 156) to the target database system 14 to perform validation. The optimizer module 19 produces different plans (with and without the recommended indexes) for comparison purposes. Also, if the validation is performed in the target database system 14, the exporting and importing of statistics (158, 160) are not performed.

The index wizard client module 24 invokes (at 164) the visual explain and compare module 54 to allow the user to compare the query plans with and without the index recommendations. In this way, the user can visualize the differences between the query plans.

At this stage, the user can also perform "what-if" analysis. For example, the user can modify the recommended indexes or propose different indexes. The costs for the user-proposed indexes are calculated and presented to the user.

Alternatively, the user can supply an artificial set of statistics to perform the "what-if" analysis. Also, the index wizard tool can provide a hint regarding tables for which statistics need to be collected.

Figure 8:
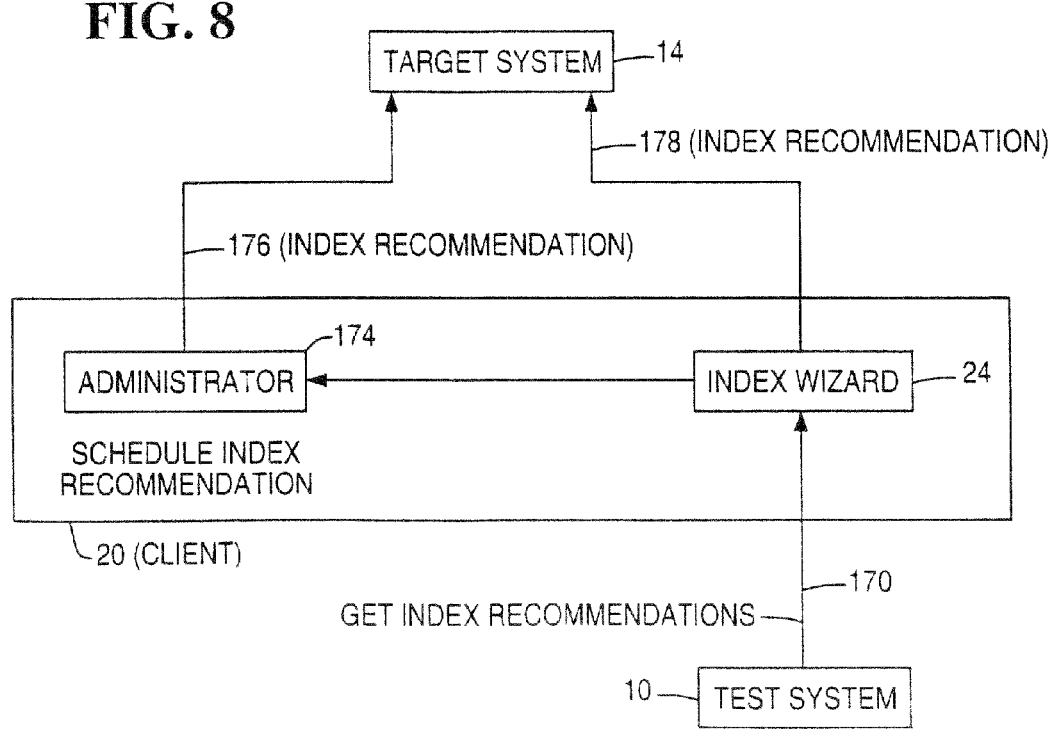
FIG. 8 illustrates an index application task performed in the procedure of FIG. 2.

After the index recommendations have been validated, the user can choose to apply the recommendations. During the index analysis phase, DDL statements were generated as part of the index analysis to apply the recommendations. As shown in FIG. 8, the index wizard client module 24 reads (at 170) the index recommendations from the QCD 60 in the test system 10. Alternatively, the index wizard client module 24 reads the index recommendations from a target database system 14. A user, through the index wizard client module 24, is able to apply the index recommendations using a scheduling administrator tool 174. The DDL statements for the index recommendations are then communicated (at 176 from the administrator module 174 or at 178 directly from the index wizard client module 24) to the target database system 14 for execution. The scheduling administrator 174 allows the DDL statements to be executed at a later time.

Figure 9:
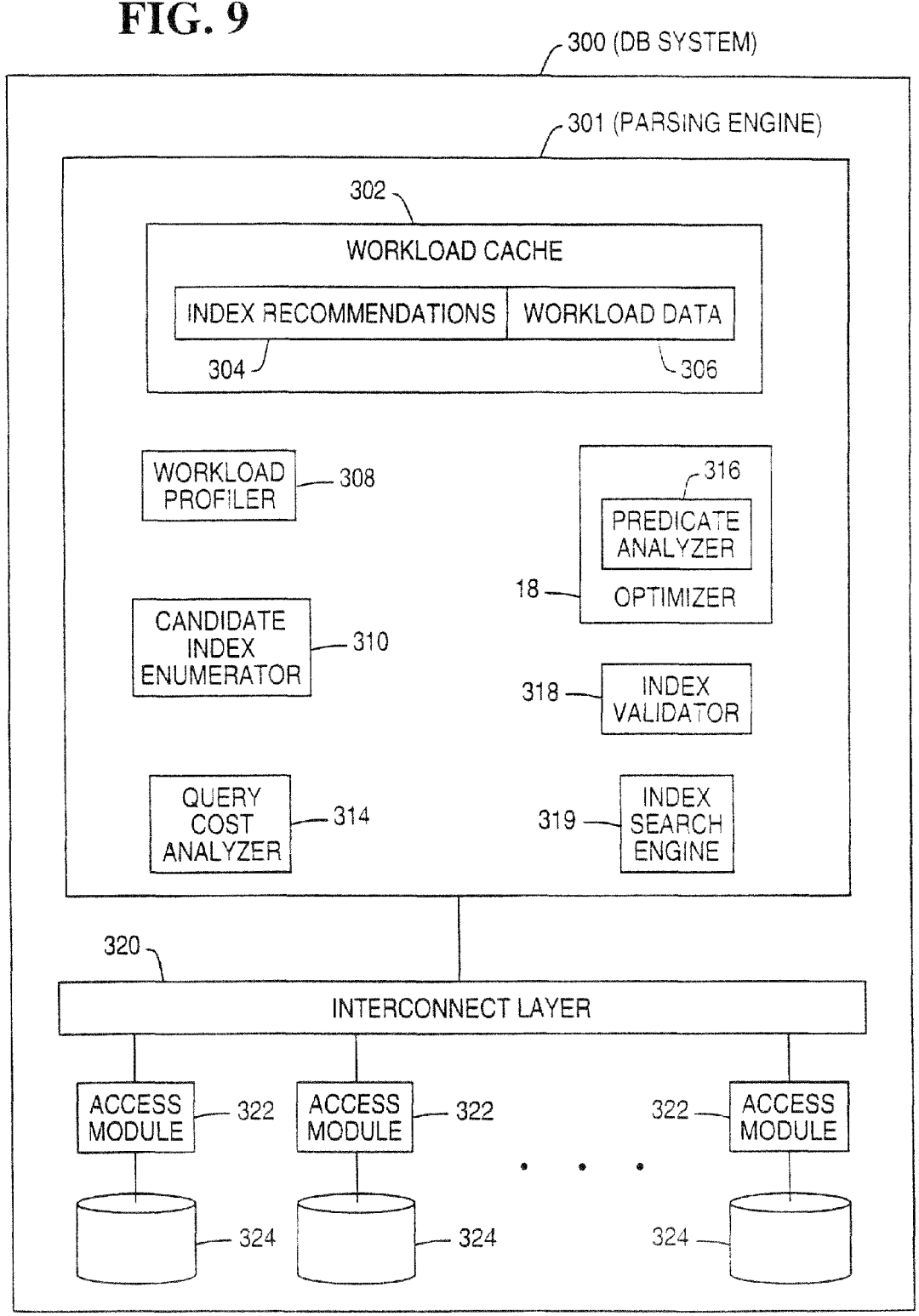
FIG. 9 is a block diagram of components in an example database system.

FIG. 9 shows an example arrangement of components in a database system 300. The database system 300 can be either the test system 10 or a target database systems 14. The database system 300 includes a plurality of access modules 322 that control access to respective storage modules 324. Each access module 322 creates, modifies, or deletes definitions of tables; inserts, deletes, or modifies rows within the tables; retrieves information from definitions in tables; and locks databases and tables. In one example, each access module 322 is an access module processor (AMP), which is a virtual processor implemented with in software. An example of an AMP is the AMP used in some TERADATA® database systems from NCR Corporation. The access module 322 can each reside on a separate node in the database system 300, or alternatively, multiple access modules 322 can reside on each node of the database system 300.

The access modules 322 are interconnected by an interconnect layer 320. Also included in the database system is a parsing engine 301. The parsing engine 301 generally receives queries and parses each query into actions to be performed by the access modules 322. The parsing engine 301 includes the optimizer module 18 along with other components. The optimizer 18 includes a predicate analyzer 316 that performs the predicate analysis for a predicate specified in a query. The predicates are the conditions specified in the Where clause of an SQL SELECT statement or other DML statement. The result of the predicate analysis performed by the predicate analyzer 316 is the following: the value access for columns is computed; the join access for the columns is computed; multi-column index candidates are identified; and range predicates are identified. A value access occurs when a column appears in an equality constraint with a constant expression (e.g., Table1.column1=10). A join access occurs when a column appears in an equality join constraint (e.g., Table1.column=Table2.column).

The computation of the value access and join access is the total number of times each occurs in a query. Each query is considered as a distinct entity for which join and value frequencies are collected. Later on, during analysis of the workload for index recommendations, the frequency values are aggregated into net frequencies per column based on queries marked for index analysis.

During the workload definition phase, the predicate analysis results are used to compute the value access and join access for the columns in a query. The analysis is performed as the query is being optimized. The analysis is done on a per-table basis, and a workload profiler 308 uses the information to compute and save value/join access frequencies in the QCD. Another task of the predicate analyzer 316 is to obtain the updates made to the different columns of the tables and a workload. The result of this task is used to rate the column with a "change rate" that is a measure of the volatility of the column data. The change rate is used to filter out possible index candidates, as discussed above.

During index analysis, the predicate analyzer 316 uses the value/join access information and the change rate information, saved in the QCD, to build a set of columns on which indexes can be defined. The predicate analyzer 316 builds a predicate list including the different conditions (also known as terms) specified in the Where clause of the query, which is used by a candidate index enumerator 310. The list includes conditions that help prune the search space for candidate indexes. For example, a condition such as "WHERE tab1.column1<tab2.column2" is not included in the list as the optimizer module 18 does not look for a secondary index on such a condition. However, a condition such as "WHERE tab 1.column3=10 AND tab1.column4=20" is included in the list, as the optimizer module 18 looks for an index for this condition. Also, columns that do not satisfy a selected change rate are also pruned.

The candidate index enumerator 310 effectively reduces the number of columns that are to be considered as candidate indexes. This reduces the work that needs to be performed during index analysis. Thus, rather than throwing all possible candidate indexes at an optimizer to perform index analysis, the candidate index enumerator 310 identifies the columns that are more likely to produce optimal results. The reduced set of enumerated candidate indexes are then provided to the optimizer for cost determination and query plan generation. By reducing the number of enumerated candidate indexes, the use of heuristics to prune the search space is not needed.

A workload profiler 308 captures workload data, which includes queries and associated query plans and the tables, columns, and indexes used in the query plans. The mechanism to capture the data is the INSERT EXPLAIN modifier. The workload data is captured into the QCD 60. The workload profiler 308 uses the predicate analyzer 316 to perform the predicate analysis on the workload queries. The objective of the predicate analysis is to obtain the values/join access on the columns in the query. In addition, the workload profiler 308 obtains the statistics from the system based on the outcome of the predicate analyzer 316.

A workload cache 302 is maintained by the workload profiler 308. The workload cache 302 stores the workload data 306 and index recommendations 304 (which are generated based on the workload data 306). If the workload data resides in the workload cache 302, then a fetch of the workload data from the QCD is not required (which saves I/O access time).

Another component in the parsing engine 301 is an index search engine 319, which is activated for index analysis. The main objective of the index search engine 319 is to obtain the index recommendations from the given set of candidate indexes. The component is responsible to search the index candidates in the query and to build the index candidate list. The index search engine 319 uses the information captured as part of predicate analysis to build the candidate list.

Another component in the parsing engine 301 is the query cost analyzer 314, which obtains the cost based on proposed indexes made by the index search engine 319. The query cost analyzer 314 also analyzes the cost with respect to the cost without the recommended indexes. The query cost analyzer 314 regenerates a plan by simulating the indexes and their statistics to the optimizer module 18 or 19. The table header that is passed to the optimizer module 18 is "faked" or simulated for the presence of an index to simulate the indexes. The statistics are "faked" or simulated when the optimizer module 18 or 19 queries the system for statistics on the indexes. The query cost analyzer 314 is used during the index analysis stage by the index search engine 319.

Another module in the parsing engine 300 is the index validator 318. The index validator 318 validates the performance of an index in the query plan. The index validator 318 allows a user to determine if an index recommendation has improved the response time of the query execution. The index that is created and statistics collected during the index validation are "faked" or simulated so that the optimizer module can use the information.

A more detailed discussion of the index analysis is provided below. The following are some definitions of terms used. A "candidate index" is an index on a table that is proposed by the index wizard tool. A "selected index" is a candidate index that is used by the optimizer module 18 in generating the query plan. An "index configuration" is the set of selected indexes for a set of candidate tables. The "workload index configuration" is the index configuration for a workload. The "query index configuration" is the index configuration for a single query.

Initially, the workload index configuration is empty and a workload index candidate set is empty. The queries in the workload are sorted in decreasing order of the query cost. For each query analyzed, the query index candidates are enumerated. The query index candidates are searched and analyzed to obtain an optimal set of index configurations for the query. The selected indexes are referred to as the query index configuration. The query index configuration is added to the workload candidate index set. The workload candidate index set is searched and analyzed to get the workload index configuration. The index recommendations are then reported.

The index wizard server module 50 uses the optimizer module 18 to recommend the candidate indexes. Note that components of the index wizard server module 50 and the optimizer module 18 are part of the parsing engine 301 (which make up the database engine). Thus, in one arrangement, the index wizard server module 50 is incorporated into the database engine alongside the optimizer (rather than being a separate application that calls the optimizer). However, an arrangement in which the index wizard server module 50 is located outside the database engine is also within the scope of some embodiments of the invention.

The index wizard server module 50 invokes the optimizer module 18 with the candidate indexes along with the statistics collected during the workload definition. The statistics can be sample statistics, in case the statistics are not available in the data dictionary. As noted above, statistics can be collected on a sample (less than 100%) of a table. In case of a multi-column candidate index, the statistics are derived from the individual column statistics.

According to one embodiment, the approach for obtaining index recommendations is in two phases. Each SQL statement in the workload is considered during the phases. The index recommendations for a workload are built from the index recommendations for each SQL statement in the workload. This approach increases the likelihood that "good" index candidates are not lost due to use of heuristics to prune the list due to memory constraints. The analysis is performed one statement at a time rather than on all statements of the entire workload in one search. By searching for one query at a time, the search space is reduced so that the use of heuristics to prune the search space can be avoided.

The first phase is the candidate enumeration phase. During this phase, the workload statements are analyzed for candidate indexes, and the candidate indexes are enumerated for the tables referenced. The next phase is the index search phase, during which the enumerated indexes are analyzed to obtain the index recommendations. In one embodiment, a genetic algorithm is employed during this phase to search the candidate index space to pick the best set of indexes for the set of tables used in the workload.

The candidate index enumeration phase includes both predicate analysis and projection list analysis. A predicate is a search condition in the Where clause of a SELECT or other DML statement. The projection list is the select list in the SELECT statement. Each workload SQL statement is submitted to the optimizer module 18 to analyze the statement.

The predicate list, as represented by the predicate analyzer 316 (FIG. 9) in the optimizer module 18, is in a conjunctive normal form. A predicate in conjunctive normal form is represented as a series of AND terms for use in join and access planning. The predicate list is used to obtain the index candidates. The predicates of each query that satisfy the properties listed in Table 1 (below) are considered as candidate indexes.

TABLE 1

| Predicate format | Term type | Example |
| --- | --- | --- |
| Column_ name = value | Explicit Term. | ORDERS.O_ORDERKEY = 2312; |
| Column_ name is null | Misc Term. | ORDERS.O_CLERK IS NULL; |
| Column_ name in (values) | Misc Term. | ORDERS.O_ORDERSTATUS IN ('P', 'O'); |
| Column_ name in (sub query) | Bind Term. | LINEITEM.L_ORDERKEY IN (SELECT O_ORDERKEY FROM TPCD.ORDERS WHERE O_ORDERSTATUS = 'P'); |
| Column_ name = any/all/some (values) | Misc Term. | ORDER.O_ORDERSTATUS = ALL ('P'); |
| Column_ name = any/all/some (sub query) | Bind Term. | LINEITEM.L_ORDERKEY = ALL (SELECT ORDERS.O_ORDERKEY FROM ORDERS WHERE ORDERS.O_ORDERSTATUS = ('P'); |
| T1.Col1 = T2.Col2 | Bind Term. | ORDERS.O_ORDERKEY = LINEITEM.L_ORDERKEY; |
| T1.Col1 = T1.Col2 | Misc Term. | |
| Cond1 AND Cond2 | Misc Term, ANDed Terms | ORDERS.O_ORDERKEY = LINEITEM.L_ORDERKEY; AND ORDERS.O_ORDERKEY = 1234; |
| Cond1 OR Cond2 | Misc Term, ORed Terms | ORDERS.O_ORDERKEY = 1234; OR ORDERS.O_ORDERKEY = 1474; |
| T1.col1 BETWEEN <number> AND <number> | Range Term | ORDER.O_ORDERKEY BETWEEN 10 AND 20 |

The analysis involves scanning the queries for bind terms, range terms, and explicit terms in the term list of the query. A list of these terms is collected as each relation of the query is being processed. Multi-column indexes are derived from ANDed and ORed term lists, which are extracted during predicate analysis. Index types are assigned to the candidates (USI or NUSI).

The predicate lists are aggregated into index groups based on the procedure described below. The list of index groups is then used to generate candidate indexes at the index analysis phase, which avoids the potentially large overhead of storing the candidate indexes in advance.

The procedure described below performed by the candidate index enumerator 310 reduces the search space by ignoring certain columns. Initially, it is assumed that a candidate index group list is empty. For each ANDed and ORed term list, the columns whose change rate exceeds a preset threshold are identified and ignored. Only the columns whose change rate are less than or equal to the preset threshold are considered as possible candidates Note that the change rate is set in a Change Rate Threshold field in a screen 560 of FIG. 28 (discussed below). The change rate of a column indicates the volatility of the column. A high change rate indicates that the column value is modified almost with every update. A low change rate indicates that the column is stable. It is desirable to consider a column having a low change rate for index recommendation.

Also, if the columns in a "current" term list (a term list that is currently being considered) are a subset of any existing groups in the index group list, and the index assigned for the list matches with a group in the candidate index group list, then the current term list is ignored (Rule 1). If the columns in the current list are a subset of any of the groups in the index group list and the index type assigned for the current list does not match with any group in the candidate group list, then the column is added as a new group in the candidate index group list (Rule 2). If a column in the list is a superset of any of the groups in the index group list, the current list is inserted into the index group list and the elements of groups that are the subset of the current list are removed (Rule 3). If the columns in the current list are neither a subset nor a superset of the elements of the candidate index group list, then the current list is added to the candidate index group list (Rule 4).

A maximum number of entries in the group is specified. If the entries exceed this maximum, then the top entries based on value access frequency are selected, discarding the rest. Value access frequency is a numeric rating of how many times all known transactions access a column in a given period.

The index group list is stored by the candidate index enumerator 310 in the workload cache 302. As an example, the following set of term lists is considered {abc, cd, abcd, ab, cdx, cdy}. The following steps indicate how the candidate index groups are built (where "res" represents the result set).
Step 1: res={ }, which indicates that the result is initially empty;
Step 2: input=abc, type NUSI, res={abc}, based on Rule 4;
Step 3: input=cd, type NUSI, res={abc, cd}, based on Rule 4;
Step 4: input=abcd, type NUSI, res={abcd}, as 'abcd' is a superset of the groups {abc, cd}, based on Rule 3;
Step 5: input=ab, type NUSI, res={abcd}, ignore as 'ab' is a subset of {abcd}, based on Rule 1;
Step 6: input=cdx, type NUSI, res={abcd, cdx}, as 'cdx' is not a subset of 'abcd', based on Rule 4;
Step 7: input=cdy, type NUSI, res={abcd, cdx, cdy}, based on Rule 4;
Step 8: input=c, type VOSI, res={abcd, cdx, cdy, c}, based on Rule 2;
Step 9: input=c, type NUSI, res={abcd, cdx, cdy, c}, based on Rule 1.

The final result is as follows:
{abc, cd, abcd, ab, cdx, cdy, c}→{abcd, cdx, cdy, c}

Thus, there are 4 candidate index groups (reduced from the original 7 groups) and the number of candidate indexes is $((2^4-1)+(2^3-1)+(2^3-1)+1)=30$. It is noted that to enumerate 30 candidates, only 4 representations are used.

The ordering within the index group list is maintained as follows. Components of every element of the group in the candidate index group list are ordered by their column IDs. Also, the order of the index group list as new groups are added is based on the column IDs. This is the protocol followed in determining the columns when an index definition is required. Thus, the index group list is ordered by the column IDs of the starting columns of each group. If there is a conflict, use the next pair of column IDs, and so on.

For example, assume there are two groups, say {abcy, abcx}, in unordered form. Following the above rule the final ordering is {abcx, abcy}, assuming columnID(x)<columnID (y) is true.

Based on this order, the index numbers are assigned. The index numbers are used to obtain the index definition. The index numbers are assigned using the following rules. All the numbers and corresponding column orders are generated using the same procedure. The first number starts with 1. The starting ID of the next group is given as $2^u-1$, where u is the number of columns in the previous element of the group.

This kind of dynamic enumeration results in a situation where the same column combination can have multiple index numbers, which are called index synonyms. In the example given above, the combination of {cd} has three synonyms as it exists in three groups. Similarly, {c}, {d} have synonyms. During the index configuration enumeration in the algorithm, the search may result in synonyms being selected. This is evaluated and eliminated during the different operations performed in the algorithm.

The enumeration described above has the advantage of providing a search space with a reasonably good size, thus eliminating the need to apply heuristics to reduce search space.

To include covering indexes in the analysis, the projection list is also scanned to obtain those columns that will be used to generate the index group list. An index is covered by a query when the optimizer module is able to respond to a query from the secondary index without accessing the primary or base table. The terms of the projection list are again passed through the same procedure as described above. For example, assume
{abc, cd, abcd, ab, cdx, cdy}→predicate list; and
{abuv, abc, pqr}→projection list.
The final list is:
{abc, cd, abcd, ab, cdx, cdy, abuv}.

The group {pqr} is ignored as it is not associated with any likely index candidate (such as due to an unconstrained select). Defining an index on columns that are used only in the projection list occupies space and causes maintenance overhead without providing the benefit of an alternate search path. Hence, this group of columns is ignored.

The columns identified to cover the index are marked as "For Covering" so that during index definition from the index group, the columns marked as "For Covering" are not used to generate the multiple index definitions that are possible from the index group. The following example illustrates this.

Assume that the index group is {abuv} in the example above. The columns u and v are marked as "For Covering" as a and b are already obtained from the predicate list and are not marked as "For Covering". The total number of index definitions from this group is 3 (as only a and b are indexable with u and v added for covering). The index definitions are {auv}, {buv}, and {abuv}. In case {auv} and {buv} are selected by the optimizer module 18 and are included in the final index recommendations when the entire workload is analyzed, the columns u and v are included in the index {auv} if space occupied by {auv} is less than space occupied by {buv}. Otherwise, u and v are included in {buv}.

In one embodiment, the index group list is limited to a maximum 512 (due to memory constraints) entries per table. This implies that 512 groups can be enumerated for each table during this phase, which is tunable. To reduce the impact of losing information on good index candidates due to this limit, the index group list for the workload is incrementally built from the index group list obtained for each statement. Even if the list is full, the candidate index enumeration phase continues due to Rule 3 above, which causes the existing index group list to be modified and thus freeing up a slot for another group.

Following the candidate index enumeration phase performed by the candidate index enumerator 310, the index search phase is performed by the index search engine 319. As noted above, a genetic algorithm is used in one embodiment to optimize the search for index candidates. An objective of the index search phase is to obtain the optimal index configurations from a given set of candidate indexes such that the turn-around time is minimized (a minimization problem). The number of indexes on a table involved in the index analysis can be set by the user, up to some predetermined maximum number of indexes.

The genetic algorithm approach is chosen to solve the candidate search problem. The fundamental unit upon which a genetic algorithm operates is called the chromosome, which in this case is the index configuration. The terms "chromosome" and "configuration" are used interchangeably in this discussion. The term "configuration" stands for the collection of all available slots on a table on which indexes can be defined. Each of the candidate indexes is identified by an index identifier. In one example, the identifier is two bytes long, which permits searching among $2^{16}$ candidate indexes per table. If during the index analysis, combinations exist that exceed this number, those combinations are ignored. To minimize the impact of a loss of a potentially good candidate index in a search due to this limitation, the candidate indexes for the workload are built from "good" candidate indexes obtained for each query. This means that the queries that are analyzed are sorted in descending order of query cost so that the costly queries are given preference to fill the candidate search space.

The fundamental operators used by a genetic algorithm (reproduction, mutation, and crossover) are also adapted to suit the chromosome representation. Sine the information is represented in the form of an index identifier (and not a single bit that is traditionally used in the genetic algorithm chromosome), the mutation operator is no longer a simple bit flipping-type of operator but has to choose from the index space.

The first fundamental operator is the reproduction operator, which is used to generate a new population for the next generation. The fundamental principle behind reproduction operators is to given better-than-average individuals more chance of survival than ordinary individuals, which follows the principle of "survival of the fittest." There are two possible techniques to implement this process, which are the "binary tournament selection (BTS)" and the "linear rank selection (LRS)" techniques. The BTS (with replacement) technique operates by choosing any two individuals from any generation and allowing the one with the highest fitness to pass to the next generation. This process continues until the required population size is reached. The advantage of this technique is that it is relatively fast and simple.

The LRS technique sorts the candidate for reproduction based on its fitness and uses a biased formula that will select the candidates for the next generation in such a way that the "better-than-average" individuals get a pre-decided share of copies of the population of the next generation.

The next operator is the crossover operator, which randomly picks up two configurations, and chooses a random point and swaps whatever is found after that point between the two chromosomes. Effectively, this operator tries out variations using only the better-than-average chromosomes in an attempt to identify better configurations.

The mutation operator fundamentally introduces new indexes into a search mechanism. This operator is applied with a relatively low probability of occurrence. Since the problem representation involves index identifiers instead of bits as in any classical case, the mutation operator is modified in a manner in which the operator identifies the table on which it is going to operate on and chooses the corresponding index from the index space for that particular table. The population size is one of the parameters that is tuned to suit performance needs. The population size is the number of chromosomes that are exercised in each genetic algorithm generation. This parameter can be tuned to suit performance needs.

As noted above, the workload is saved in the QCD using the enhanced INSERT EXPLAIN modifier. This permits statistics to be collected (using the FOR SAMPLE clause) and saved in the QCD. The statistics are collected on columns that result from the predicate analysis discussed above. The difference is that statistics are collected only on individual columns and not on the possible multi-column enumeration. In case a multi-column index is picked for analysis, the statistics are derived from the individual column statistics. In this way, during index analysis, all that needs to be done is to retrieve the statistics from the QCD.

Statistics can either be based on a full table scan (in which all rows of a table are read to collect statistics) or based on a sample, in which some preset percentage of rows are read to collect the statistics.

Figure 10:
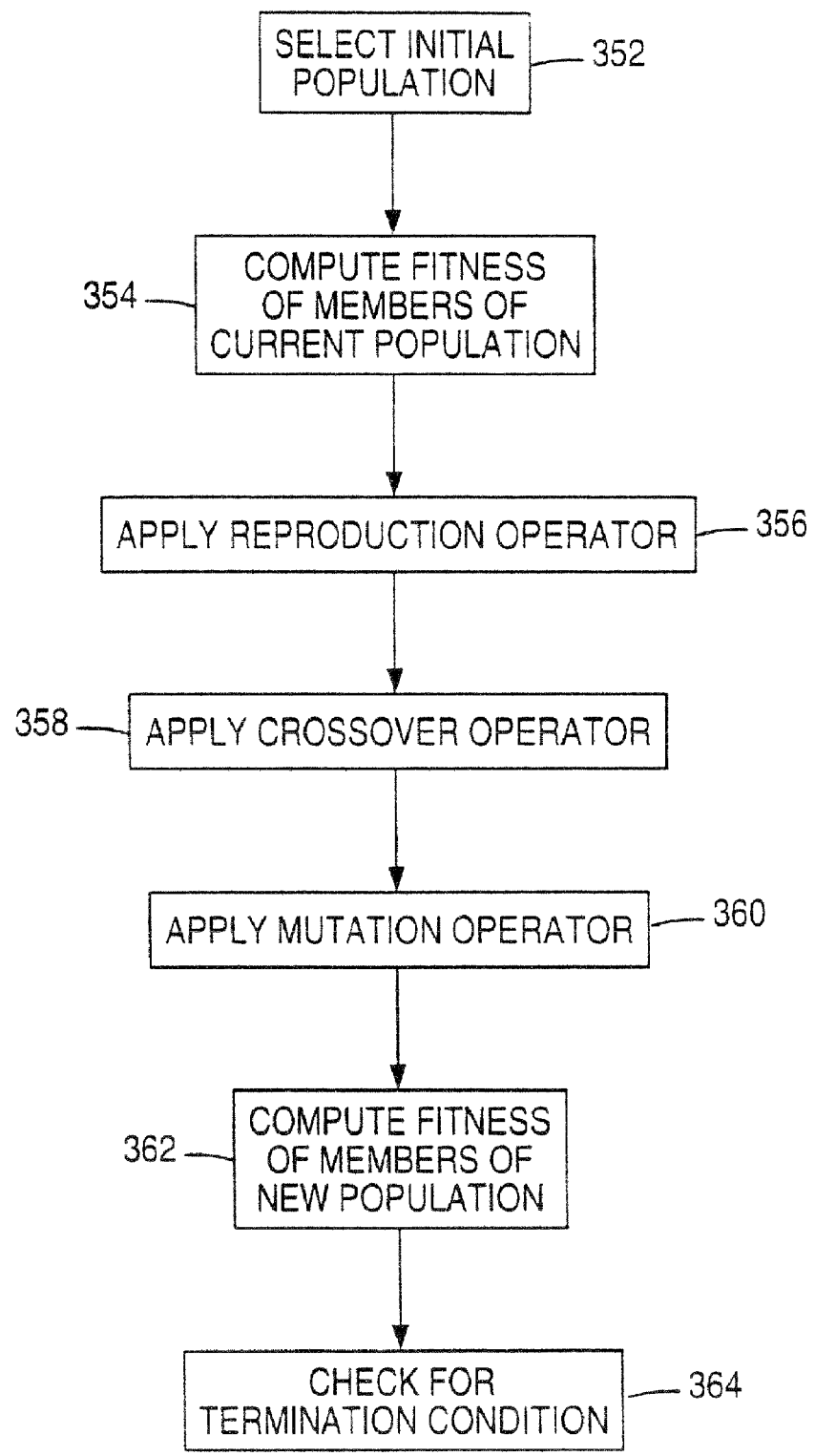
FIG. 10 is a flow diagram of an index search process.

As shown in FIG. 10, the index search algorithm is as follows. An initial population of chromosomes is selected (at 352) by the index search engine 319 randomly from the search space. This becomes the current population. Next, the fitness of the members of the current population is computed (at 354). In computing the fitness of the members of the current population, for each chromosome in the current population, the index search engine 319 generates the query plan and computes the query cost by faking the indexes and the statistics. The query cost is calculated by invoking the optimizer module 18. Next, the cost contribution is set equal to a value that is the product of the query cost and the query frequency. The cost contribution is then added to the workload cost for each chromosome.

The optimizer module is provided the candidate indexes (the current population) to generate index recommendations. In addition, statistics are accessed by the optimizer module to determine cost. Generally, the index with the lowest cost is recommended. The optimizer module also takes into account selectivity of an index. An index that retrieves many rows is said to have low selectivity. Generally, the higher the selectivity of an index, the lower the cost.

Also, if the costs of all candidate indexes is too high, as set by some predetermined criteria, then the optimizer may not pick any index for recommending. In this case, the index wizard tool does not make an index recommendation.

Next, the reproduction operator is applied (at 356) to the population to generate a new population. Then, a crossover operator is applied (at 358) with a predefined crossover probability, $P_c$. Next, the mutation operator is applied (at 350) with a predefined mutation probability, $P_m$.

After application of the reproduction operator, crossover operator, and mutation operator, the fitness of the members of the new population is computed (at 362). Then, the new population is made the current population. Next, it is checked (at 364) if the termination condition has been satisfied. The termination condition is the algorithm having been run for a predefined maximum number of times (generations) or the variance of the fitness of the solution being zero (or a predefined delta, δ, which implies that convergence has been reached). If not, then the operation proceeds to act 356.

The number of optimizer module invocations during this phase is a function of the number of queries that are analyzed. The total number of invocations is P (population size)*Q (number of queries)*G (number of generations).

Assume that there is a set of queries (W), which constitutes the workload, where W={q1, q2, q3 . . . qn}.

The goal is to tune this set of queries by providing indexes on the tables they use in such a way that the overall cost of that workload is minimized. The set of indexes on all the tables that is the final recommendation configuration is referred to as C.

C={TC1, TC2, TC3, ... TCm}, where TCi is the set of indexes on the table Ti, that optimizes the overall cost of all the queries in the workload. The aim of the index analysis phase is to find C for the given workload W.

Figure 11:
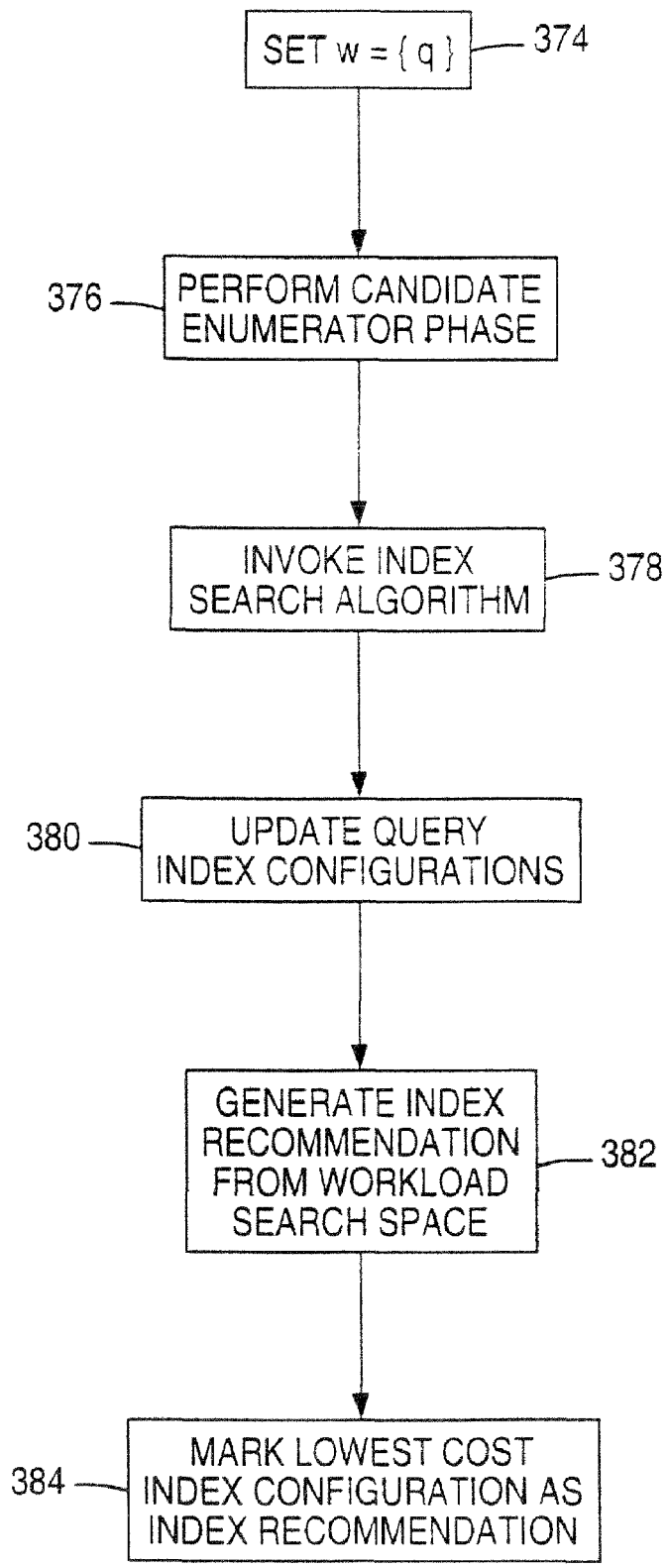
FIG. 11 is a flow diagram of an index analysis process.

As further shown in FIG. 11, the basic index analysis algorithm is repeated below. Initially, the workload index group list is empty. Next, the search space for the workload is built. For each query q in the workload, W, the candidate index enumerator 310 sets (at 374) w={q}. The candidate indexes in the query index group list are then enumerated (at 376) by the candidate index enumerator 310.

The index search algorithm is then invoked (at 378) by the index search engine 319 to obtain the query index configurations for w. The index search algorithm is described in connection with FIG. 10. The query index configurations are as many as the population size. The query index configurations are updated (at 380) in the workload index group list by applying the same procedure as done while building the query index group list.

The acts 374, 376, and 378 causes the search space for the workload to be built. Once the search space is built, the index recommendations are generated (at 382) from the workload search space. The index search algorithm is invoked for the workload queries by setting w=W. The index configuration from the population that has the least cost is chosen as the final set of index recommendations. These are marked (at 384) as recommended indexes.

Figure 12:
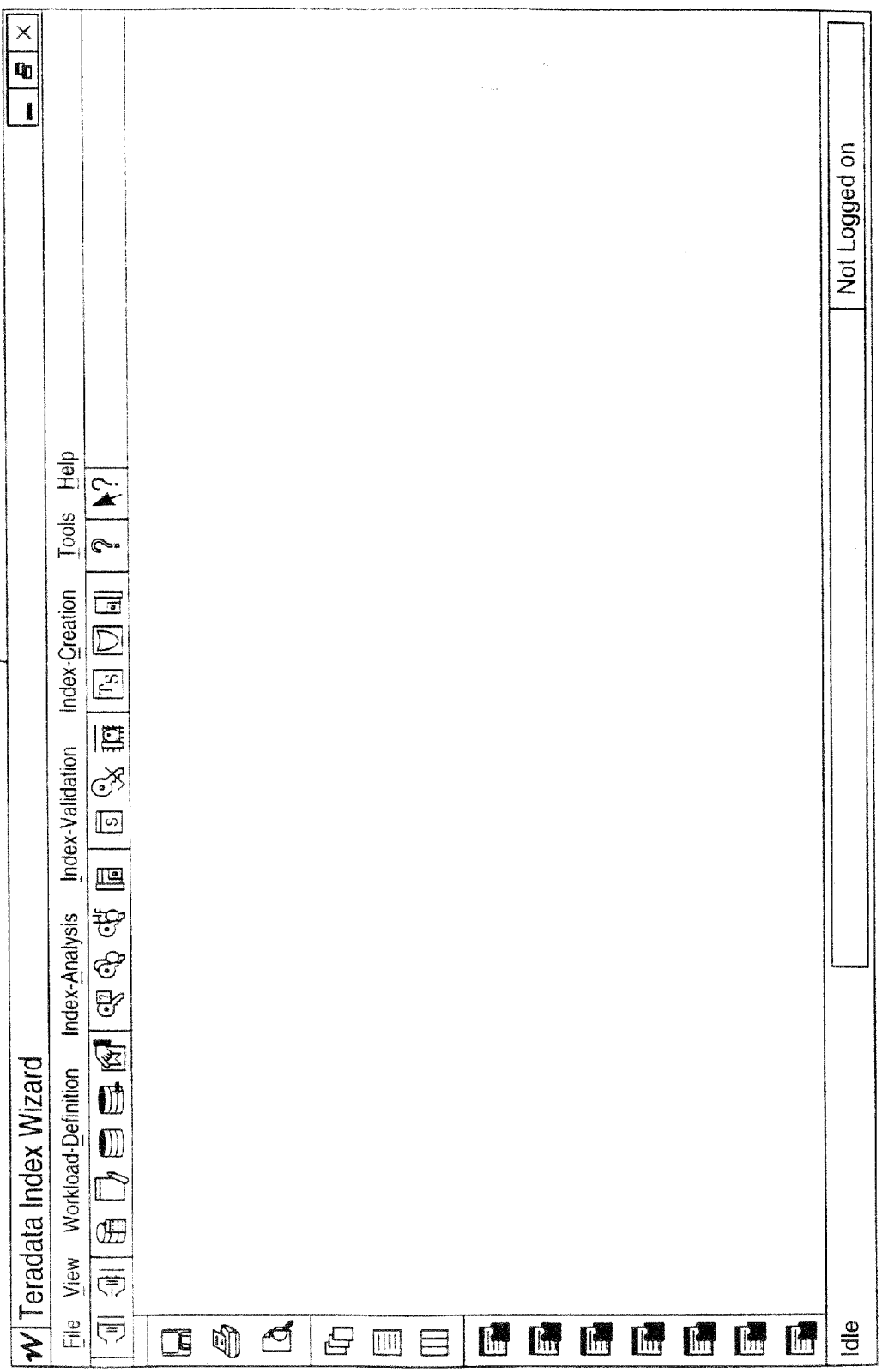

The index wizard client module 24 presents various graphical user interface (GUI) screens through which a user can issue commands and view results of tasks performed by the index wizard tool. An index wizard main screen 400 is illustrated in FIG. 12. In the embodiment illustrated, the screen is presented in a WINDOWS® operating system environment. The WINDOWS® operating system is provided by Microsoft Corporation. However, the invention is not to be limited in scope to GUI screens presented in the WINDOWS® environment, as other GUI screens in other operating system environments can be used.

Figure 13:
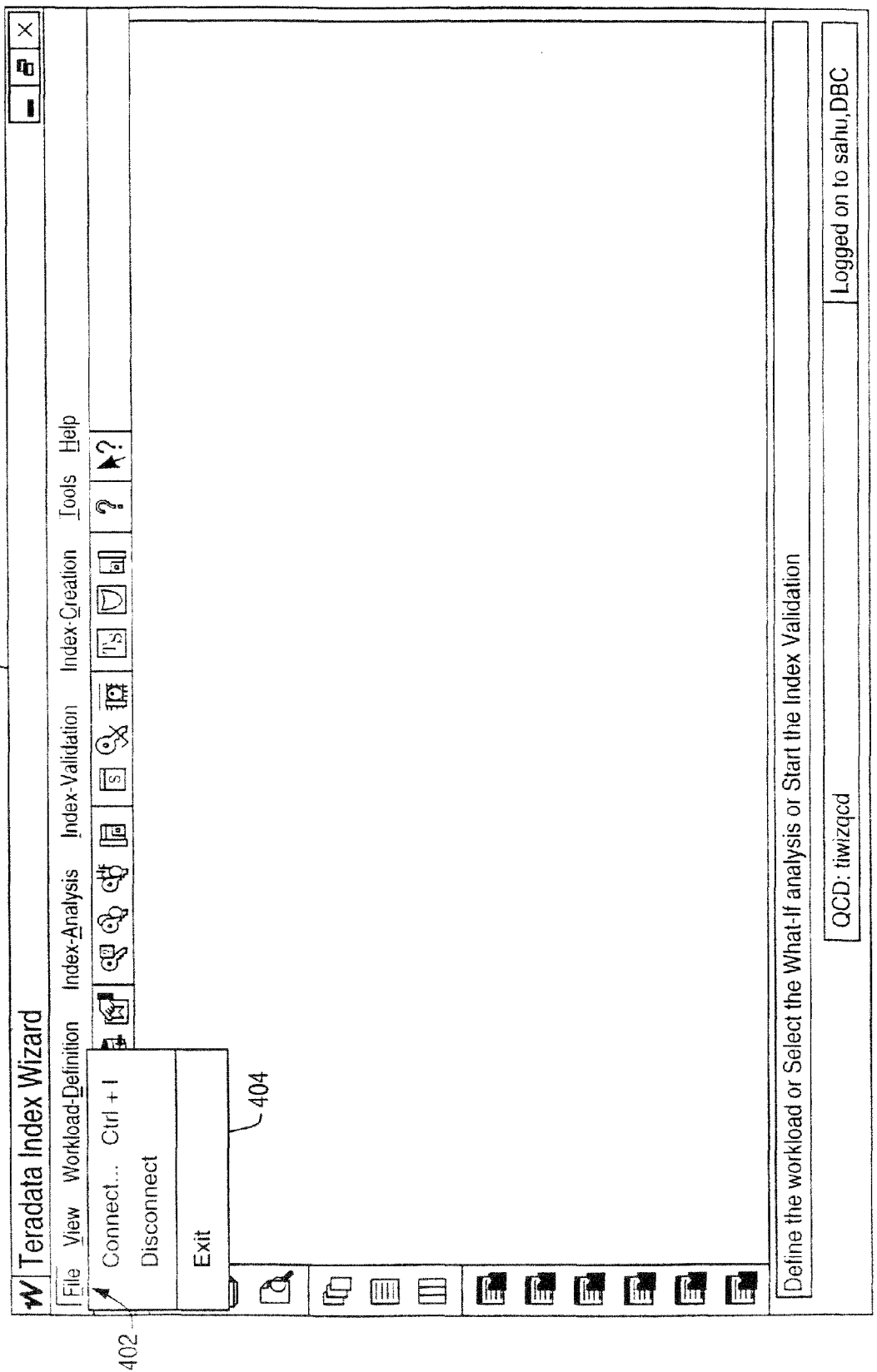

As shown in FIG. 13, if a File menu 402 is selected, then a frame 404 as shown in FIG. 13 is displayed. The File menu frame 404 includes a Connect menu item, which is used to connect to a target database system 14. According to some implementations, the connection between the client system 20 and target database system 14 can be based on a Call Level Interface (CLI) or an Open Database Connectivity (ODBC) interface. The CLI interface can be an SQL/CLI interface, which provides a programming call level interface to SQL databases. The ODBC interface enables an application to communicate with a database manager. In other database embodiments, other types of interfaces are used.

A Disconnect menu item in the File menu frame 404 is used to disconnect from a target database system 14 (after connection has been established). An Exit menu item is used to exit from the index wizard client module 24.

Figure 14:
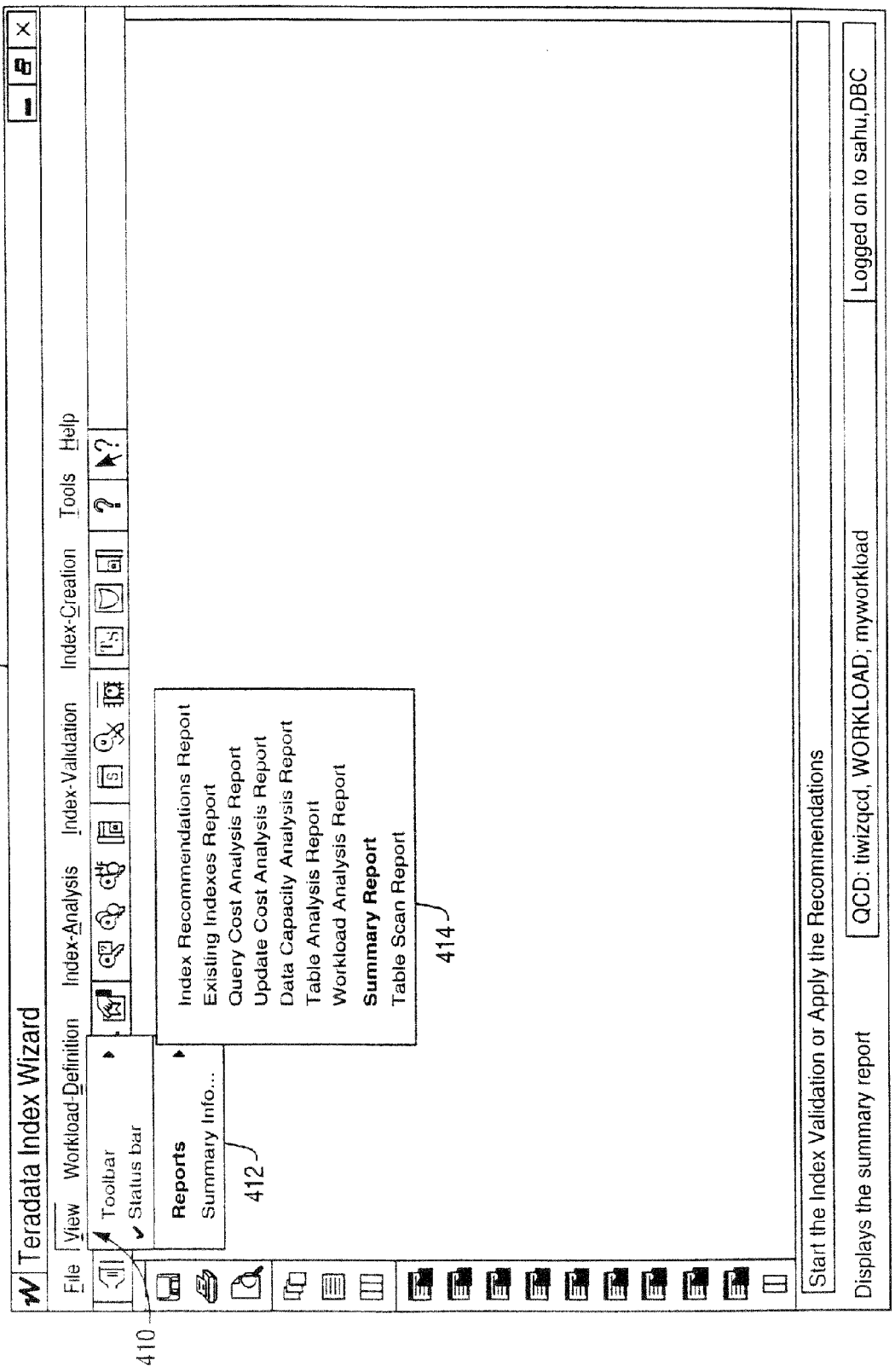

When a View menu 410 is selected, as shown in FIG. 14, a frame 412 is displayed. One of the menu items in the View frame 412 is a Reports menu item. Selection of the Reports menu item causes another frame 414 to be displayed. The frame 414 includes an Index Recommendations Report menu item, which is used to generate an index recommendations report. The frame 414 also includes an Existing Indexes Report menu item (to generate a report of existing indexes); a Query Cost Analysis Report menu item (to generate a query cost analysis report); an Update Cost Analysis Report menu item (to generate an update cost analysis report); a Disk Space Analysis Report menu item (to generate a disk space analysis report); a Table Usage Report menu item (to generate a table usage report); a Workload Analysis Report menu item (to generate a workload analysis report); a Summary Report menu item (to generate a summary report); and a Table Scan Report menu item (to generate a table scan report). These reports are discussed further below.

The screen 400 also has a Workload-Definition menu 420 (FIG. 15), which when selected causes a frame 422 to be displayed. The Workload-Definition frame 422 includes a DBQL Statements menu item (to select SQL statements from the database query log 52 in FIG. 1); a Statement Text menu item (to enter SQL statements or select statements from one or more files); a QCD Statements menu item (to select SQL statements from a QCD); an Import Workload menu item (to import a workload from a target database system using the system emulation tool 22); an Existing Workload menu item (to select an existing workload for analysis). Thus, the Workload-Definition menu 420 is used by a user to perform workload identification.

Figure 16:
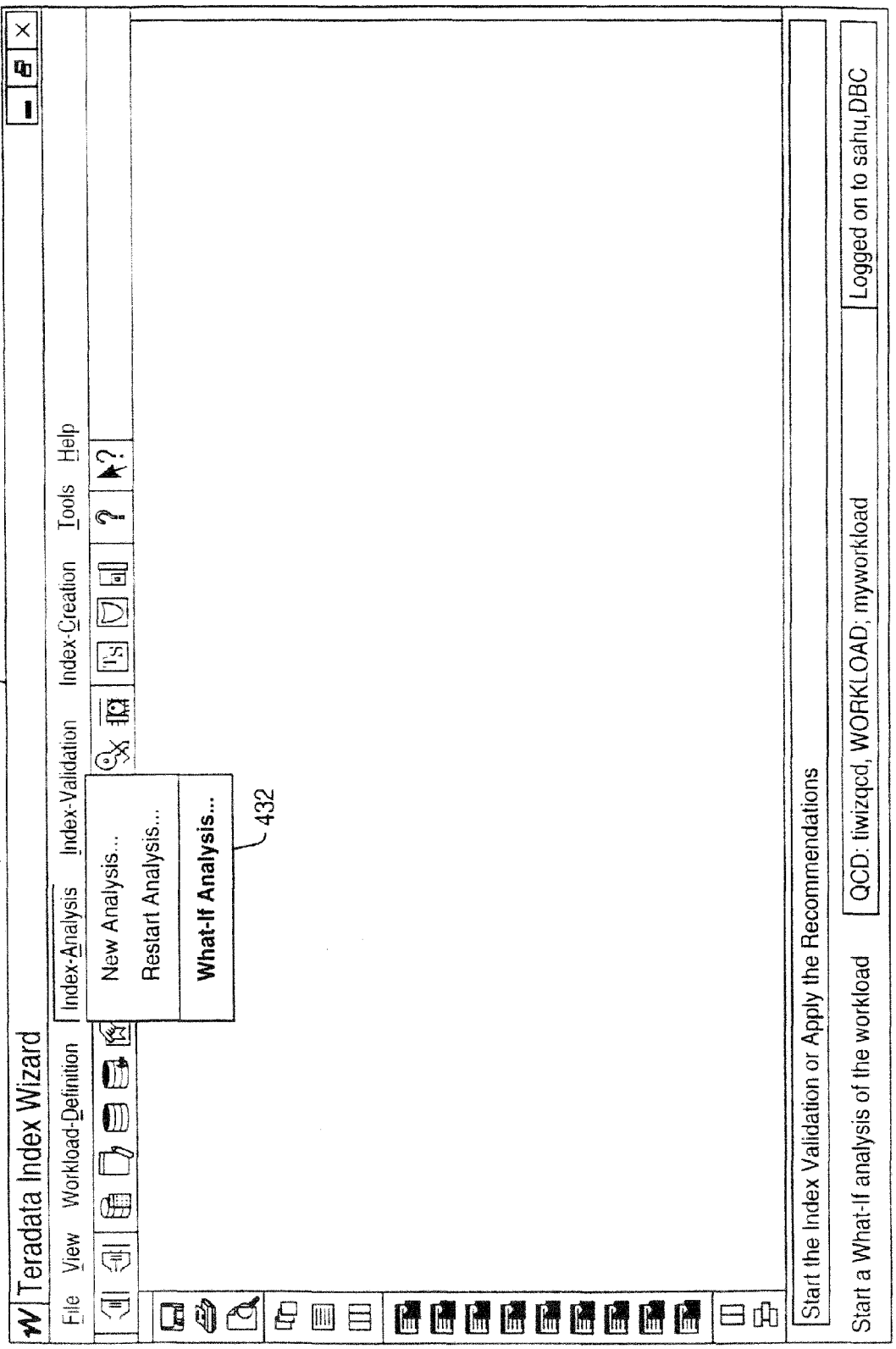

As shown in FIG. 16, the main screen 400 also includes an Index-Analysis menu 430, which when selected causes display of a frame 432. The frame 432 includes a New Analysis menu item (which when selected starts a fresh analysis of a created or selected workload); a Restart Analysis menu item (which when selected causes the restart of an analysis that was previously halted); and a What-If Analysis menu item (which when selected starts the what-if analysis of a selected workload).

Figure 17:
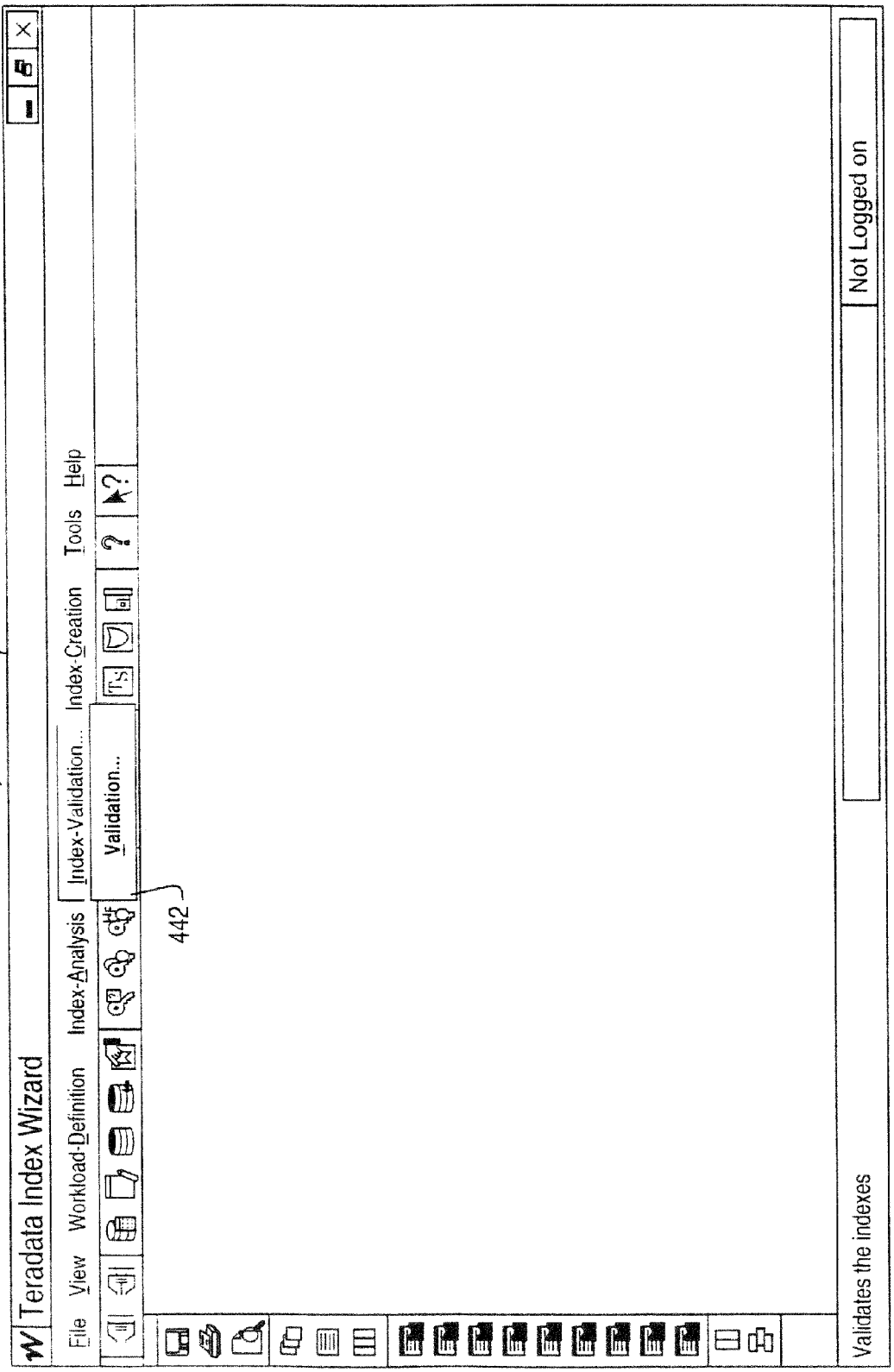

As shown in FIG. 17, the main screen 400 also has an Index-Validation menu 440, when which selected cause a frame 442 to be displayed. The frame 442 includes a Validation menu item, which is selected by a user to validate index recommendations generated by the index wizard tool.

Figure 18:
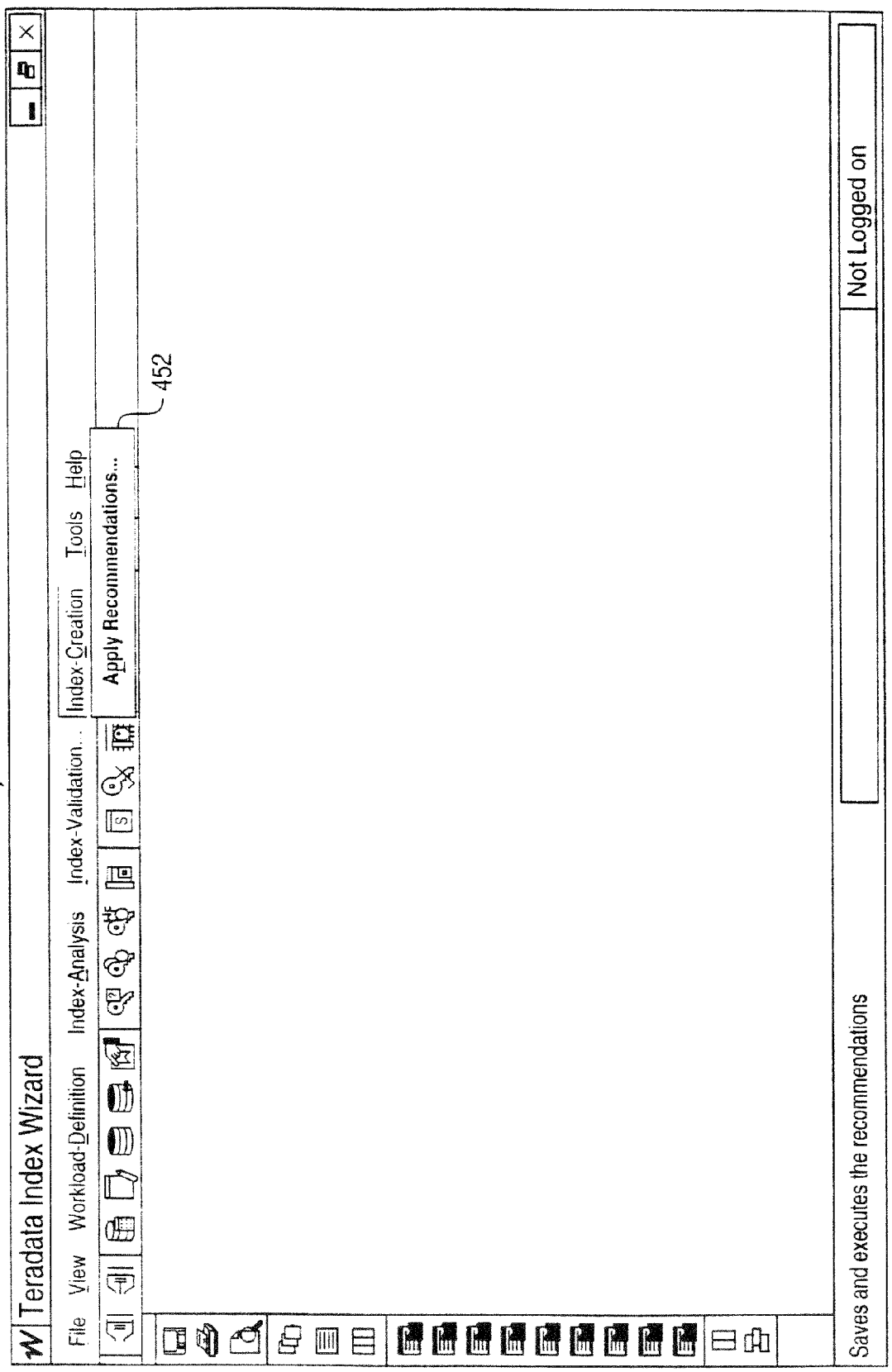

The main menu 400 also includes an Index-Creation menu 450, as shown in FIG. 18, which when selected causes a frame 452 to be displayed. The frame 452 includes an Apply Recommendations menu item, which is selected by a user to schedule the creation of index recommendations in a target.

Figure 19:
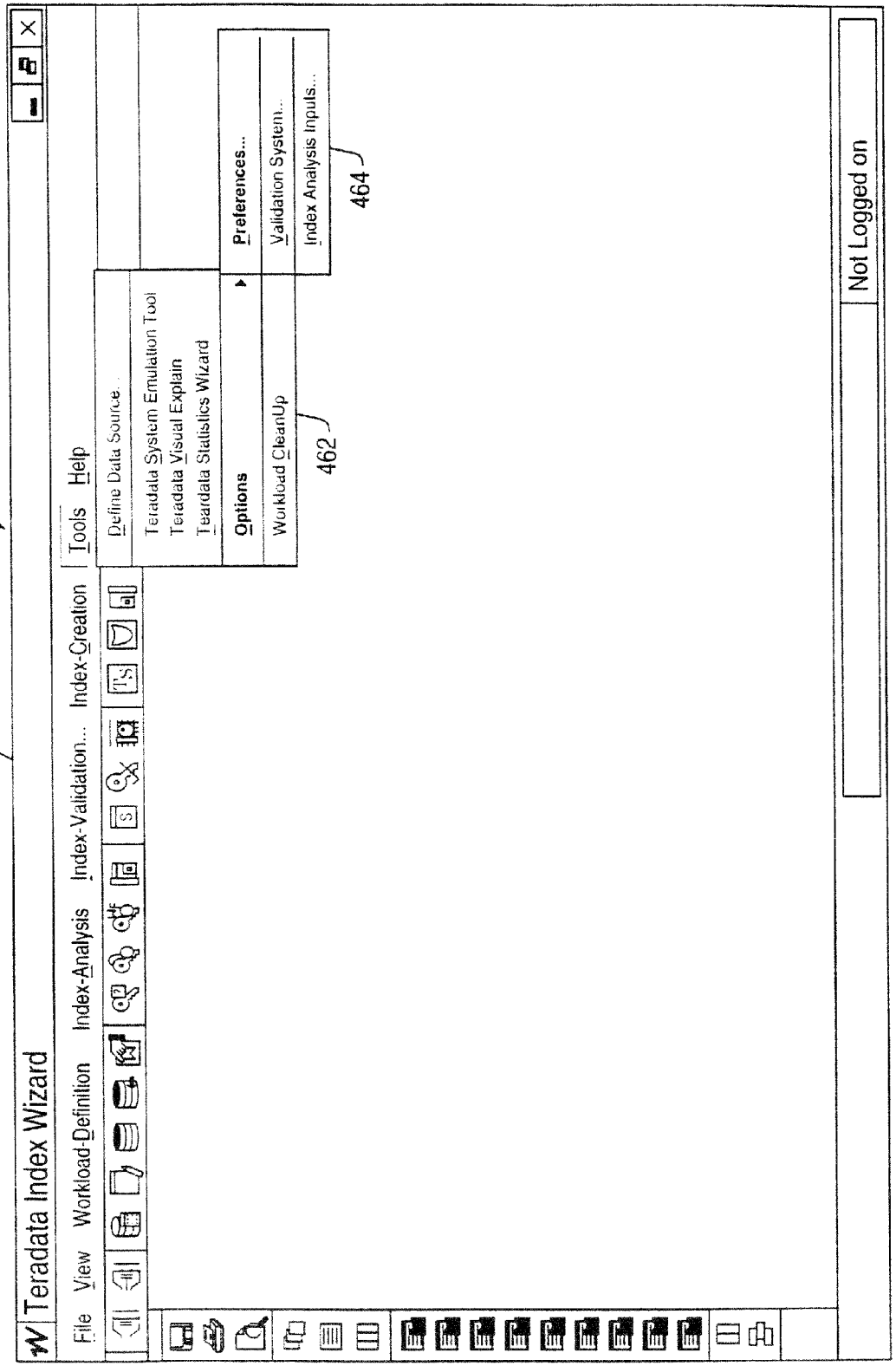

As shown in FIG. 19, the main screen 400 also includes a Tools menu 460, which when selected cause a frame 462 to be displayed. The frame 462 includes a System Emulation Tool menu item, which when selected invokes the system emulation tool 22 from the index wizard client module 24. The Tools frame 462 also includes a Visual Explain menu item (which when selected causes the visual explain and compare tool 42 or 54 to be invoked); a Statistics Wizard tool menu item (which when selected cause a statistics wizard tool to be invoked); and a Workload Clean Up menu item (which when selected deletes workload and/or execution plan or analyses performed on the client system 20).

Another menu item that is part of the Tools menu 460 is Options, which when activated causes a frame 464 (FIG. 19) to be displayed. A Validation System menu item validates the indexes on another machine. An Index Analysis Inputs menu item when activated enables parameters to be set or reset for index analysis.

Some of the various icons on the left hand side of the screen 40 are defined by a table shown in FIG. 20. The listed icons include an icon 800 to log on to a target database system, an icon 801 to log off from the target database system, an icon 802 to select statements from the database query log 52, an icon 803 to enter SQL statements or select them from one or more files, an icon 804 to select SQL statements from a QCD, an icon 805 to import a workload from a target database system 14, an icon 806 to select an existing workload, an icon

807 to set or reset index analysis parameters, an icon 808 to start index analysis, an icon 809 to perform "What-If" analysis, an icon 810 to restart index analysis from a checkpoint, an icon 811 to display summary information, an icon 812 to validate indexes, an icon 813 to schedule the creation of indexes, an icon 814 to view help contents, an icon 815 to guide the user on how to use the help contents. Other icons are also present on the screen 400.

As noted above, a workload can be identified in a number of ways: by selecting SQL statements from the database query log 52 (FIG. 1). The database query log 52 is a historical record of SQL statements that are run on a target database system 14 over a period of time. The logging feature can be turned on in the target database system 14 to start logging of the SQL statements and related data. To retrieve a set of SQL statements to be analyzed, the user specifies the selection criteria based on which the SQL statements are retrieved from the database query log 52.

Alternatively, the user has the option of entering the SQL statements that are to be analyzed. This is done by manually typing in the SQL statements or by selecting the SQL statements to be analyzed from one or more files. Also, the user can select SQL statements from the QCD (the QCD 56 in the target database system 14). The user can specify a query identifier (Query ID) or a query tag in addition to the name of the QCD. The corresponding statements are retrieved from the QCD. A query identifier (Query ID) can be a single number, a range of identifiers, or a combination of both. The user can also import a workload from another system for analysis. The user can also select an existing workload.

Figure 21:
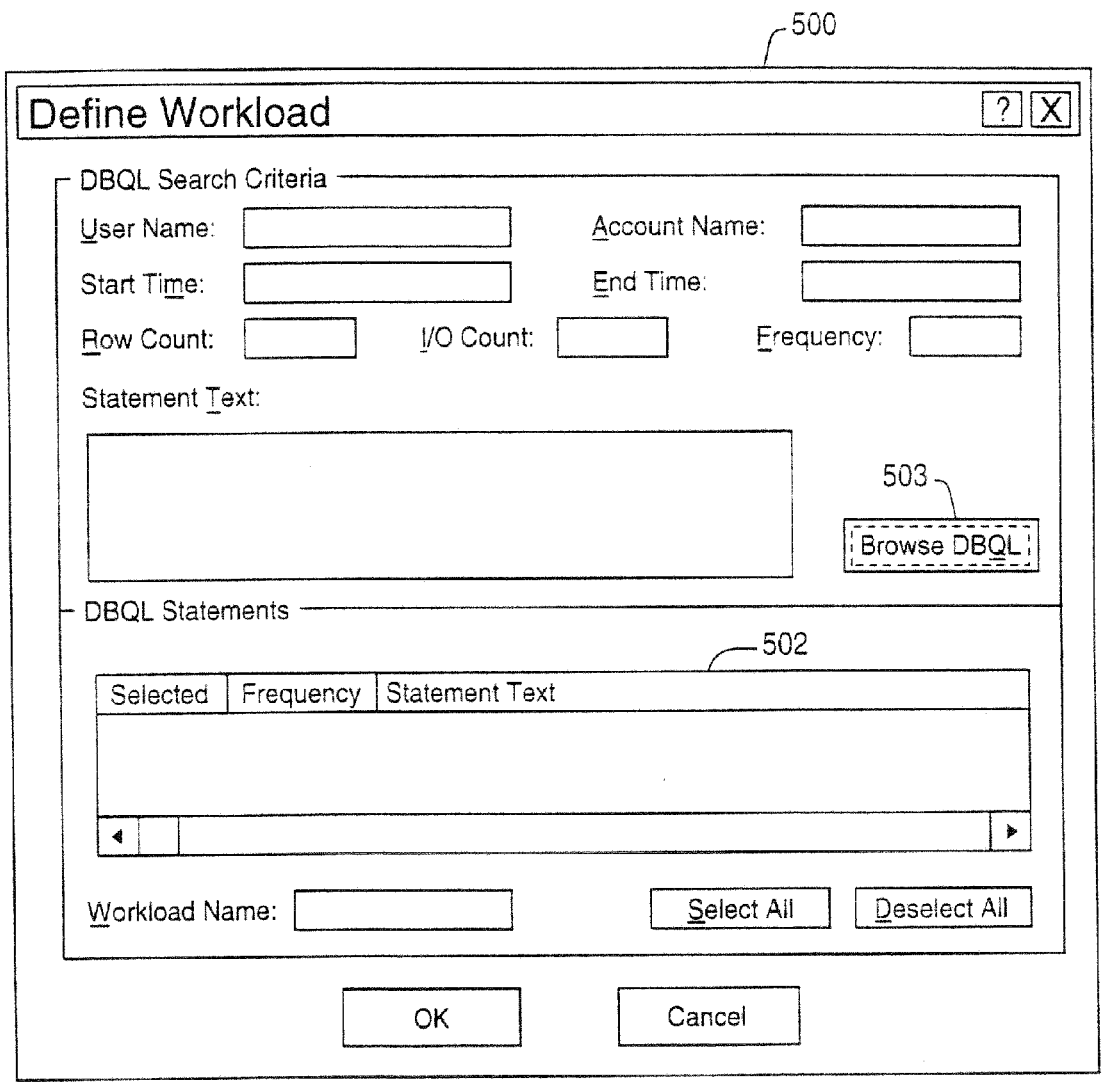

By selecting the DBQL Statements menu item in the Workload-Definition frame 422 (FIG. 15), SQL statements to be analyzed are selected from the database query log 52. In response to selection of this menu item, a Define Workload dialog screen 500 is displayed, as shown in FIG. 21. The Define Workload screen 500 includes various fields in which the user can enter data. Such fields include a User Name field; an Account Name field, Start Time and End Time fields (during which statements started and completed are to be captured); a Row Count field (to specify the number of top SQL statements that return the maximum number of rows); and I/O Count field (to specify the number of the top SQL statements that take the maximum usage of I/O devices); a Frequency field (to select statements that occur more than the frequency specified); and a Statement Text field (to specify a part of or the entire SQL statement that is to be retrieved from the log).

The screen 500 also includes a Browse DBQL button 503, which is used to select SQL statements from a predetermined table in the target database system 14 based on selection criteria entered by a user. DBQL statements are listed in a box 502, which has a Selected column (to indicate whether a statement has been selected or not), a Frequency column (to indicate the frequency of occurrence in the workload); and a Statement Text column (to display the text of the SQL statement retrieved from the DBQL). The screen 500 also includes a Workload Name field (to enter the name of the workload to be created).

Figure 22:
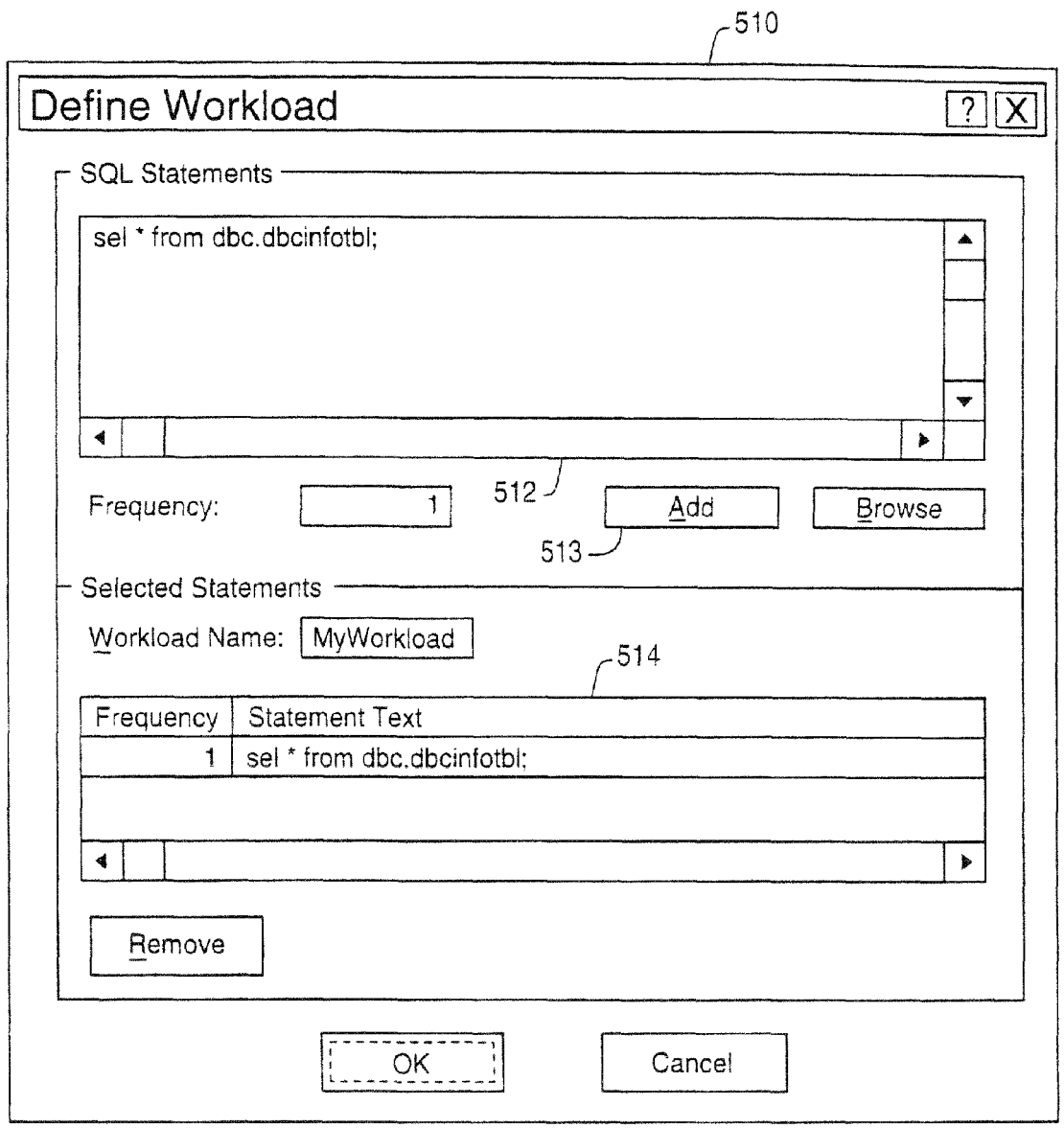

The SQL statements to be analyzed can be typed in manually by a user by selecting the Statement Text menu item (FIG. 15) from the Workload-Definition menu 420. A Define Workload dialog screen 510 (FIG. 22) is displayed as a result. The one or more SQL statements are typed into an entry box 512. The typed statements are added to a display box 514 that lists the selected statements by clicking on an Add button 513. The display box 514 has a Frequency Column and a Statement Text column.

Figure 23:
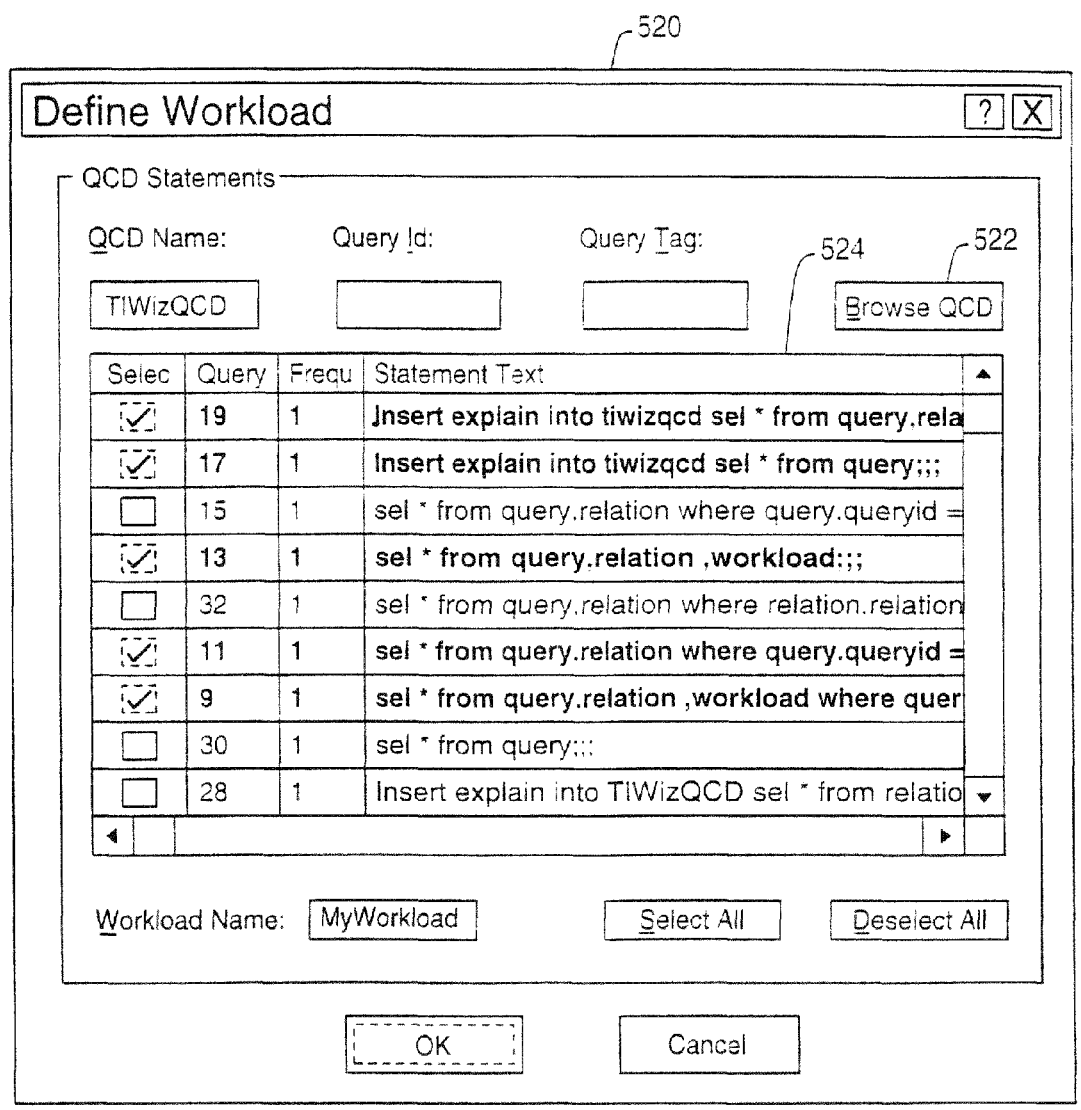

SQL statements can also alternatively be selected from the QCD 52 by selecting the QCD Statements menu item (FIG. 15) of the Workload-Definition menu 420. In response to the selection of this menu item, a dialog screen 520 is displayed (FIG. 23). A QCD Name field contains the name of the QCD from which the workload is to be extracted. Also included in the screen 520 are a Query ID field and a Query Tag field (which are optional). If no values are entered in these fields, then all statements in the specified QCD are displayed when the Browse QCD button 522 is selected.

The QCD statements are listed in a box 524, which includes a Selected column to indicate whether a statement is selected; a Query ID column to display the query identifier of the statement; a Frequency column to display the frequency of the statement; and a Statement Text column.

Figure 24:
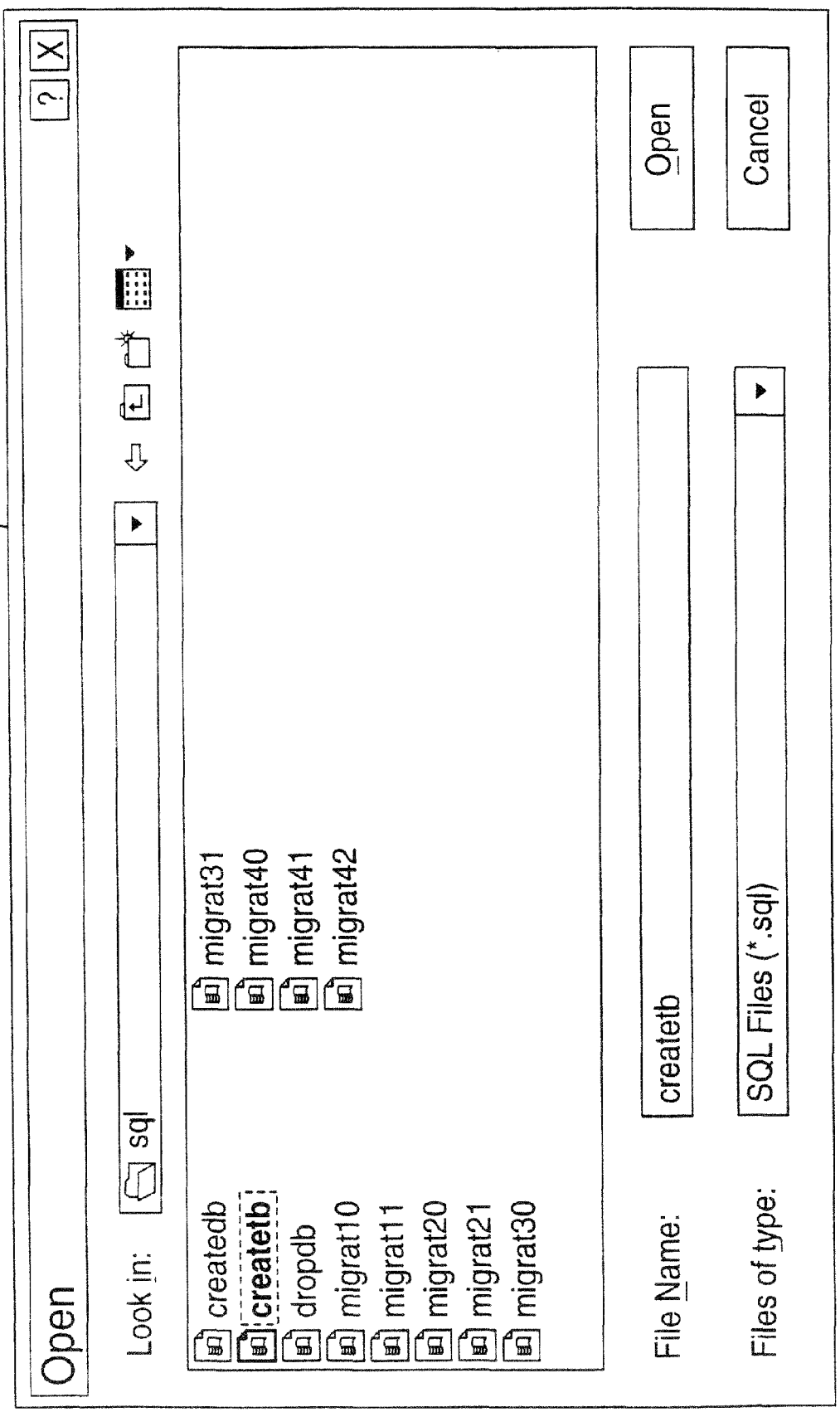

If the Import Workload menu item from the Workload-Definition menu 420 (FIG. 15) is selected, then an Open dialog screen 530 (FIG. 24) is displayed. The Open screen 530 displays a list of files that can be selected for opening. The statements to be imported as the workload are contained in the selected file.

Figure 25:
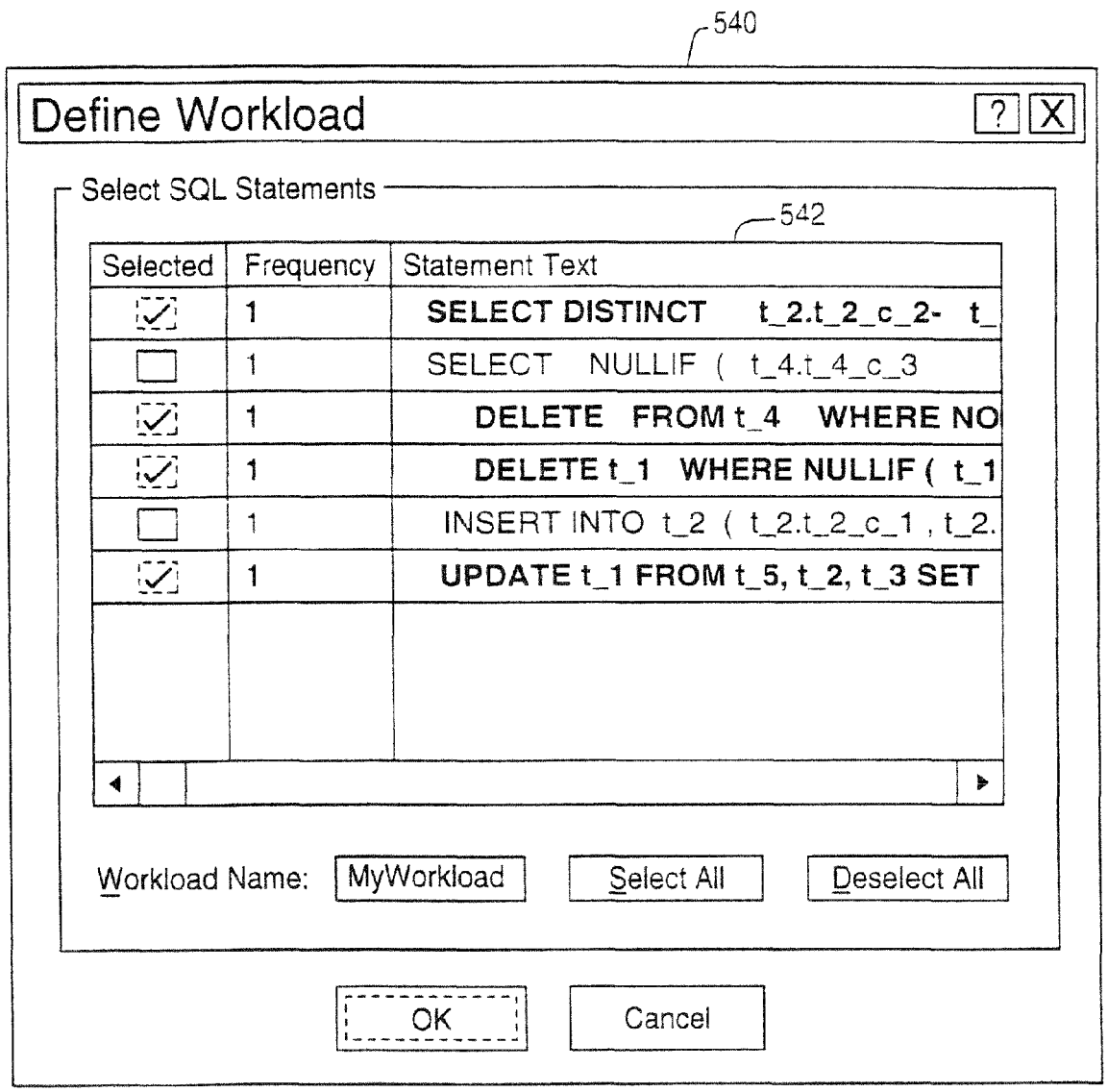

When the file is opened in response to clicking of the Open button 532, another dialog screen 540 is displayed (FIG. 25). The screen 540 contains a box 542 in which SQL statements are displayed. The box 542 includes a Selected column, a Frequency column, and a Statement Text column.

Figure 15:
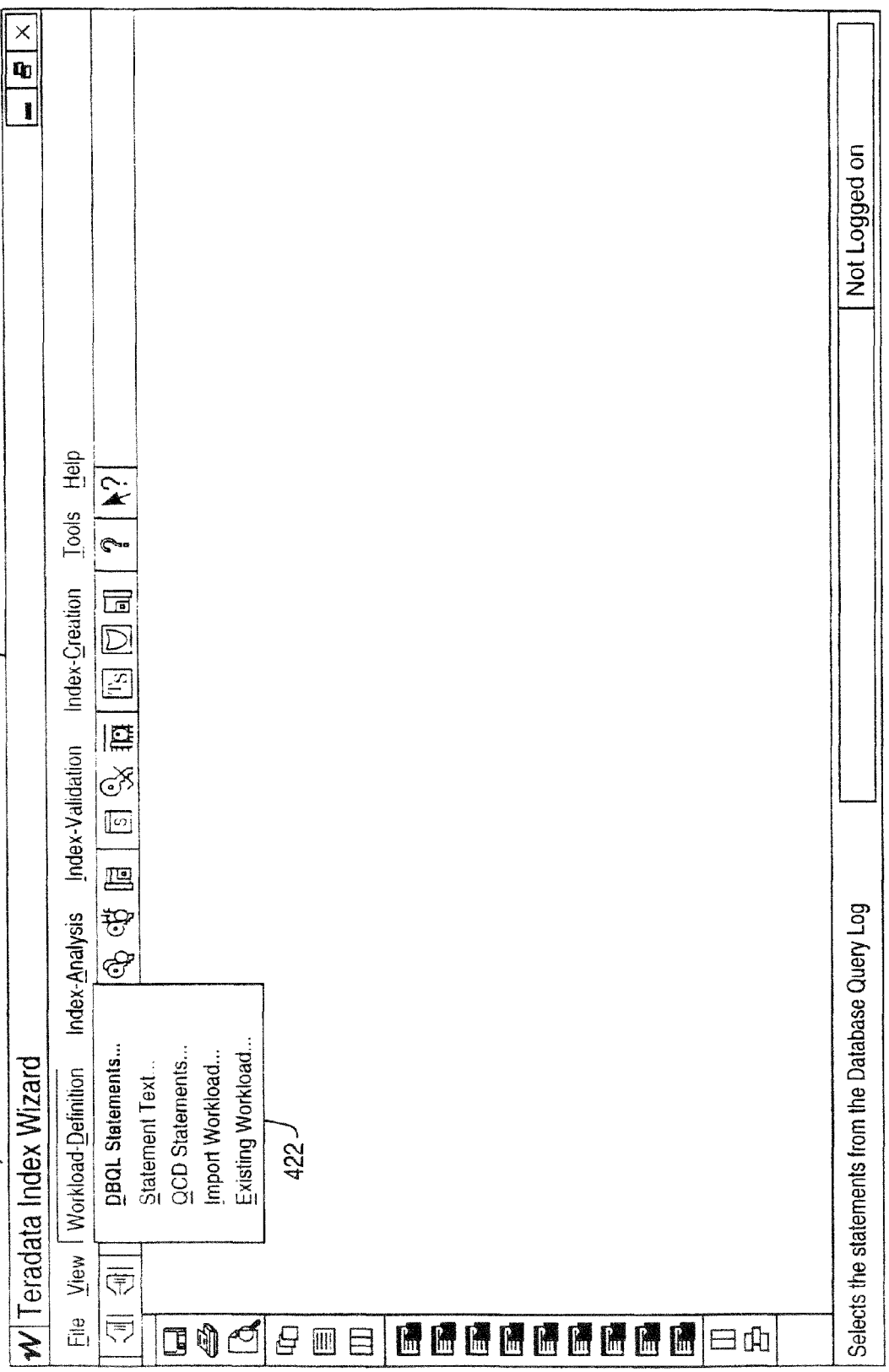

As noted above, the user can also select an existing workload by selecting the Existing Workload menu item from the Workload-Definition menu 420 (FIG. 15). In response, an Existing Workload dialog screen 550 (FIG. 26) is displayed. A QCD Name field displays the name of the QCD, and a Workload Name field displays the name of the workload. A display box 552 displays the statements in the workload. A Workload Status box 554 displays the status of different operations performed on the workload. The Workload Status box 554 includes a Recommendations ID column to display the recommendations identifier, if index analysis has been performed on the workload. Each time a new index recommendation is generated, a new row is entered in a Workload-Status table 214 in the QCD. An Index Tag column displays the index tag of the index recommendation.

A Validated System column displays the name of the system on which the validation was last performed. A ValidatedTimeStamp column displays the timestamp of when the validation was last performed. A Validated QCD column displays the QCD on which validation was last performed. A Recommendations Applied System column displays the name of the system on which the recommendations were applied. A new row is added to the WorkloadStatus table 214, and thus the display box 554, each time index recommendations are applied on a system.

A Modify button 556 allows the workload that is being displayed to be modified by the user. When the Modify button 556 is activated, the Existing Workload screen 550 is changed to an Existing Workload screen 550A, as shown in FIG. 27. The screen 550A is the same as the screen 550 except the box 552 has changed to 552A, in which a Selected column is added to enable a user to select or deselect statements in the workload. Also, Modify Options items 558 are enabled for selection. Clicking of the QCD Statements item allows the addition of statements from the QCD, while clicking of the Query Text item enables statements to be manually entered or to be selected from one or more files. An Update button 559 is clicked to update the changes made in the Existing Workload screen 550A.

After the workload definition phase, index analysis is performed in which the workload is analyzed and index recommendations are generated for the workload based on parameters supplied by the user.

Figure 28:
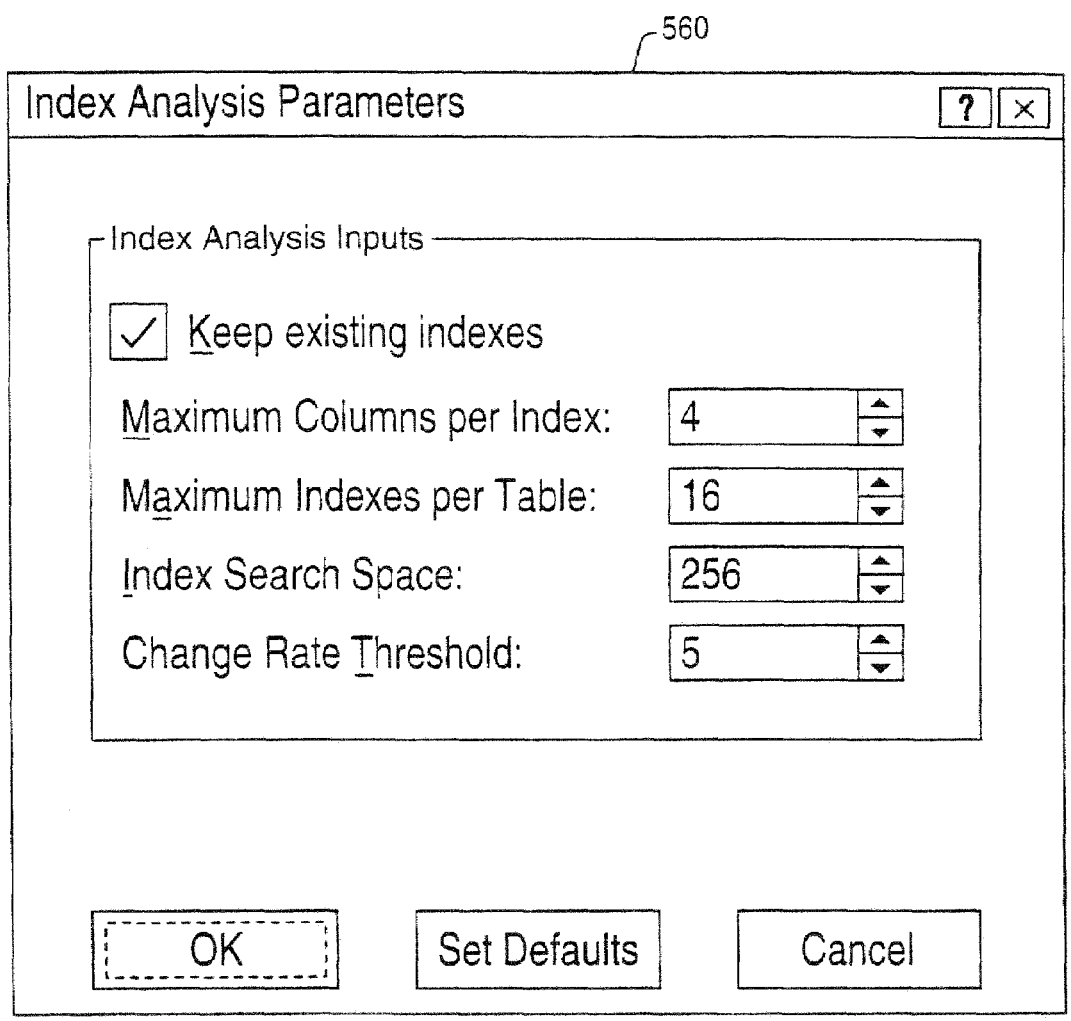

Once the workload is defined, the Index Analysis Input menu item in the frame 464 (FIG. 19) is enabled for selection. The input parameters specified for the index analysis determine the nature of the index recommendations for the workload. The various input parameters that determine index recommendations are set by selecting the Index Analysis Input menu item in the Options frame 464. In response to selection of this menu item, an Index Analysis Parameter dialog screen 560 is displayed (FIG. 28). The screen 560 includes a Keep Existing Index item that is selectable to retain the existing indexes on the tables selected for analysis. When this item is de-selected, the index wizard recommends dropping of indexes that may not be necessary.

Also in the screen 560 is a Maximum Columns Per Index field, which allows the user to assign the maximum number of columns that can be present in an index; a Maximum Indexes Per Table field that allows the user to assign the maximum number of indexes for a table; an Index Search Space field to allow the user to specify the maximum number of candidates to be searched when recommending an index; a Change Rate Threshold field to indicate the threshold value on the column volatility for selecting columns when recommending indexes (for example, if the value is specified as 5, all columns that has a change rate value of 5 or less is considered for an index).

Figure 29:
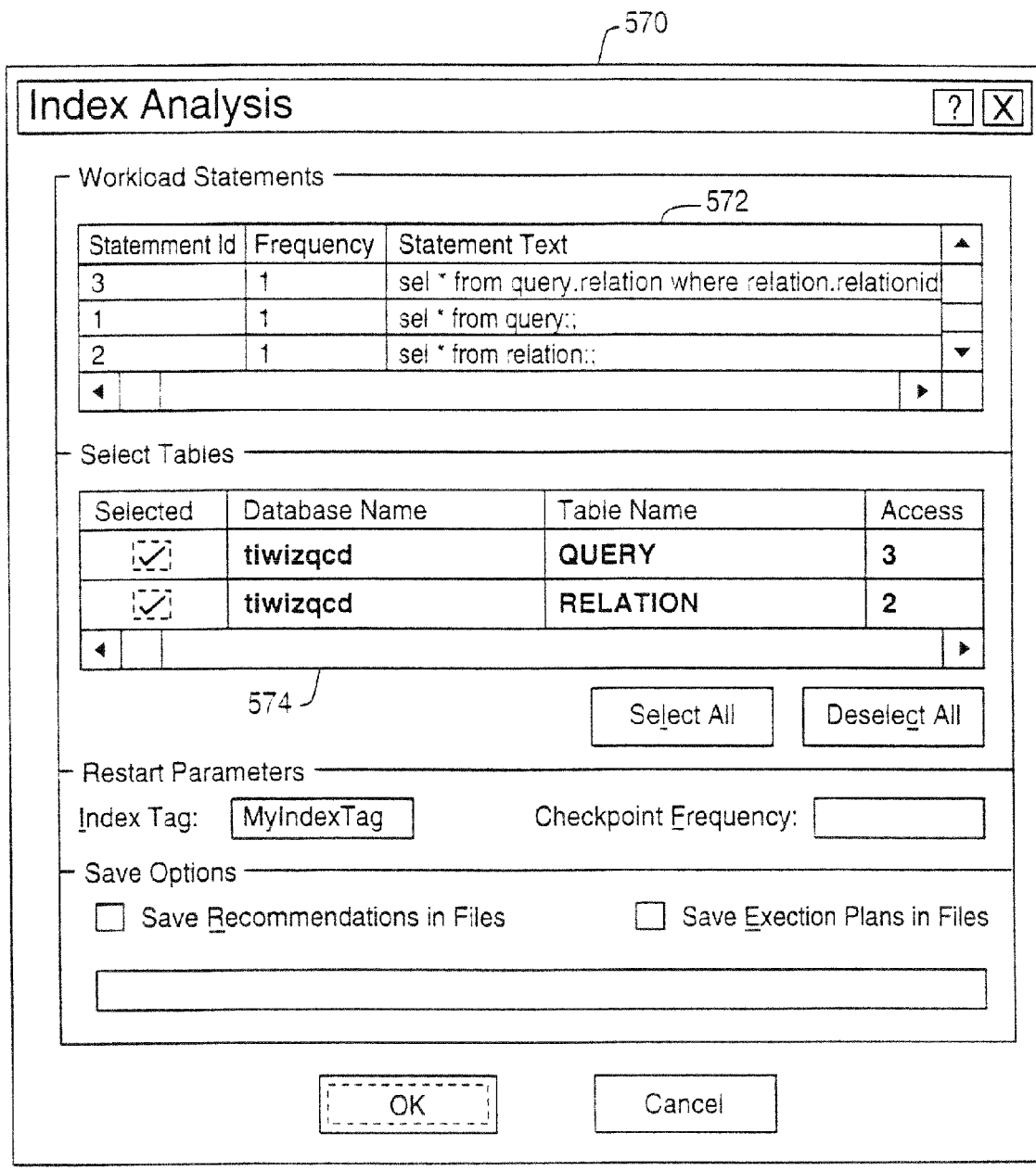

To begin a new index analysis, the New Analysis menu item from the Index-Analysis menu 430 (FIG. 16) is selected, which results in the display of an Index Analysis screen 570 (FIG. 29). The Index Analysis screen 570 includes a Workload Statement display box 572 to display statements of the workload. The screen 570 also includes a Select Tables display box 574 to list tables that are selectable for the index analysis. The Select Tables selection box 574 includes a Selected column to select or de-select tables; a Database Name column to give the name of the database in which the tables are present; a Table Name column to give the name of the table that the select statements refer to; an Access Count column to give the number of times each table is accessed in the SQL statements. An Index Tag field defines a name for the recommendations that are provided. The name is used if analysis has to be restarted at a later point in time. A Checkpoint Frequency field specifies the number of queries after which checkpoint information is saved. A Save Recommendations In Files item is selectable to save the recommendations made by the index wizard tool in one or more files. When this option is selected, a dialog box is displayed in which a file name is entered. A Save Execution Plans In Files item is provided to save execution plans of the SQL statements in files.

Figure 30:
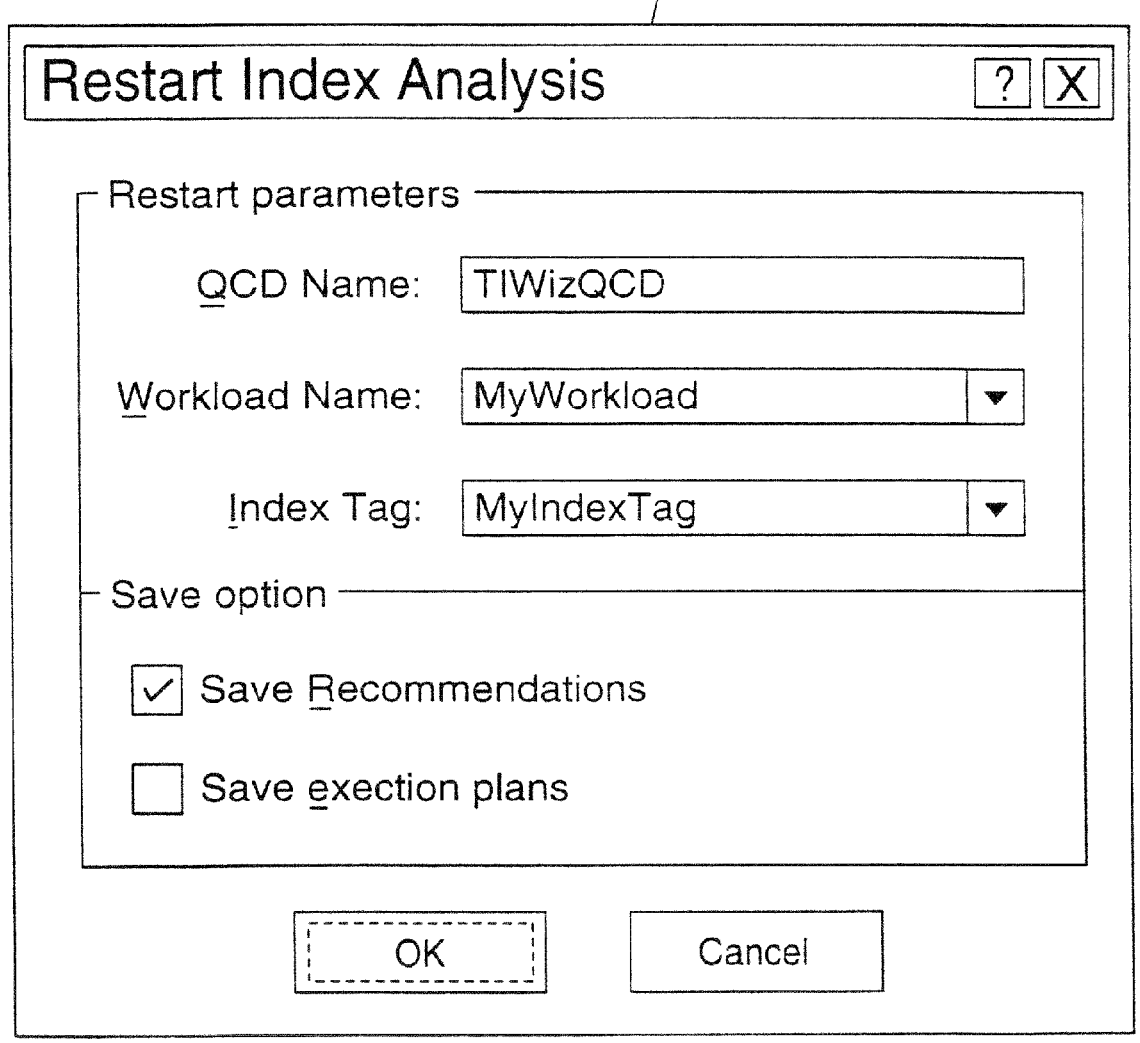

To restart an analysis, a user selects the Restart Analysis menu item from the Index-Analysis menu 430 (FIG. 16). In response, a Restart Analysis dialog screen 580 is displayed (FIG. 30). The Restart Index Analysis screen 580 includes a QCD Name field to select a name of the QCD in which the halted analysis and workload details are present; a Workload Name field to select the workload on which the analysis is performed; an Index Tag field to define a name for the recommendations provided; a Save Recommendations option to enable the saving of recommendations in files; and a Save Execution Plans option to save execution plans of statements in files.

Another feature available from the index wizard client module 24 is "What-If" analysis, in which the user can suggest indexes for the selected workload and monitor the performance improvement (if any) and the execution cost of the workload with the user-suggested recommendations. The suggested indexes are simulated in the test system 10 or target database system 14 and the workload statements are submitted for query plan capture.

Figure 31:
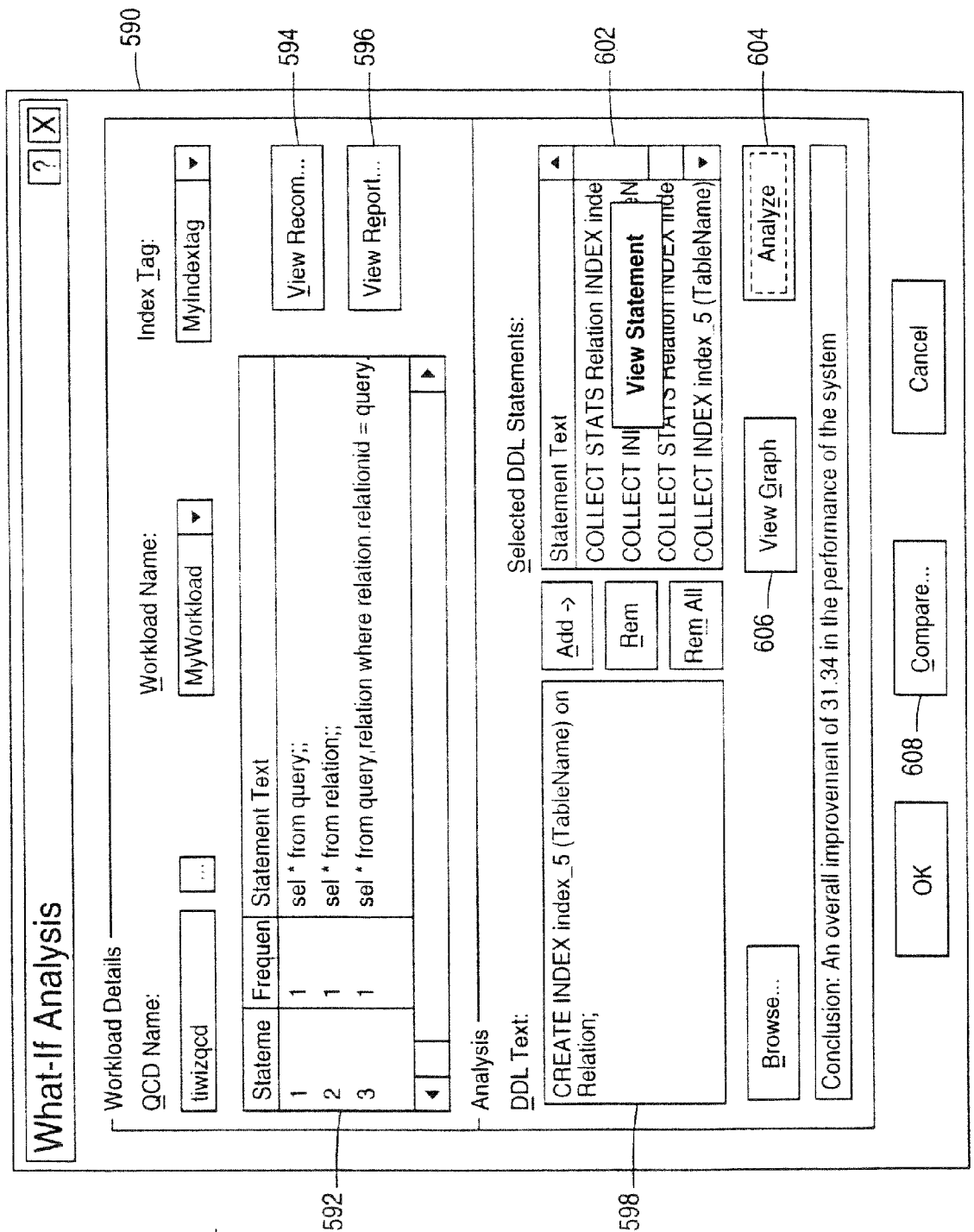

Some of the index recommendations can be removed by the user and new indexes can be added during the What-If analysis. This is enabled by the user selecting the What-If analysis menu item in the Index-Analysis menu 430 (FIG. 16). In response to selection of this menu item, a dialog screen 590 is displayed (FIG. 31). The What-If Analysis screen 590 includes a Workload Details display box 592 that displays the statements of the workload. A View Recommendations button 594 is used to view the recommendations made by the index wizard tool. A View Report button 596 is used to view the table scan report and the workload details for the workload.

A DDL Text display box 598 is used to enter a DDL statement desired by the user. The DDL statement (e.g., CREATE INDEX) is a manually generated statement entered by the user to test indexes created by the user. An Add button 600 causes the statement entered into the box 598 to be added to a list 602.

Activation of an Analyze button 604 causes performance of the index analysis with the selected recommendations. A View Graph button 606 when activated by the user generates a graph displaying an execution cost of the statements before and after the user-recommended index analysis. A Compare button 608 causes a comparison of the statements before and after the user-recommended index analysis.

The output from the index wizard client module 24 includes the set of index recommendations and the estimated cost improvement in the execution of the statements in the workload. The output is in the form of reports, which provide analysis details of the workload. According to one embodiment, the reports include a Recommended Index report, which provides the user with the recommended set of indexes for the tables in the workload; a Current Index Usage report, which provides the user with the existing set of indexes on the tables and their usage; a Query Cost Analysis report, which presents the improvement in the execution cost of the SQL statements with the recommended set of indexes; an Update Cost Analysis report, which gives the cost to maintain the indexes when updates to the rows take place; a Disk Space Analysis report, which provides the space estimate to store the recommended indexes; a Table Usage report, which gives the table-wise accesses made by the statements in the workload; a Workload Analysis report, which gives the overall improvement of the execution cost of the statements in the workload and additional information such as tables and columns referenced, statements with GROUP BY, ORDER BY clauses, and columns with join conditions; a Summary report, which gives the overall summary about the execution of the index wizard tool, the time taken, the number of statements and tables analyzed, and the recommendations made; and a Table Scan report, which gives the table usage information with table cardinality, AMPs retrieved, and geography information.

A screen 620 that displays the Index Recommendation Report is shown in FIG. 32. The Index Recommendation Report screen 620 includes a display box 622 that includes several columns: a Table Name column to give the name on which the index is recommended; an Index Tag column to give the tag of the index as stored in the IndexRecommendations table in the QCD; an Index Type column that gives the type of index that is recommended; a Size column that gives the estimated size occupied by the index in the database; a Time Estimate column that gives the time estimate to actually create the recommended index; an Index DDL column that gives the DDL statement text used to create/drop the index; and a Stats DDL statement that gives the DDL statements used to collect statistics.

An Existing Indexes Report screen 630 is shown in FIG. 33. The screen 630 includes a display box 632 that displays parameters associated with existing indexes, including a Table Name column to provide the table name; an Index Name column to provide a name of the index; an Index Type column to indicate the type of the index; and a Columns column that gives the list of columns (comma separated) that make up the index.

A Query Cost Analysis Report screen 640 is shown in FIG. 34. The screen 640 includes a display box 642 that shows parameters associated with query cost analysis. The box displays a Query Type column to indicate the type of SQL statement (SELECT, INSERT, etc.); a Cost (with existing indexes) column to give the execution cost associated with existing indexes; a Cost (with recommended indexes) column to give the estimated execution cost with the recommended set of indexes; a Percentage Change column to indicate the percentage increase or decrease of cost of executing the statement (cost with existing indexes versus cost with recommended indexes); and a Query Text column to provide the text of the SQL statement for which the cost is calculated.

Figure 35:
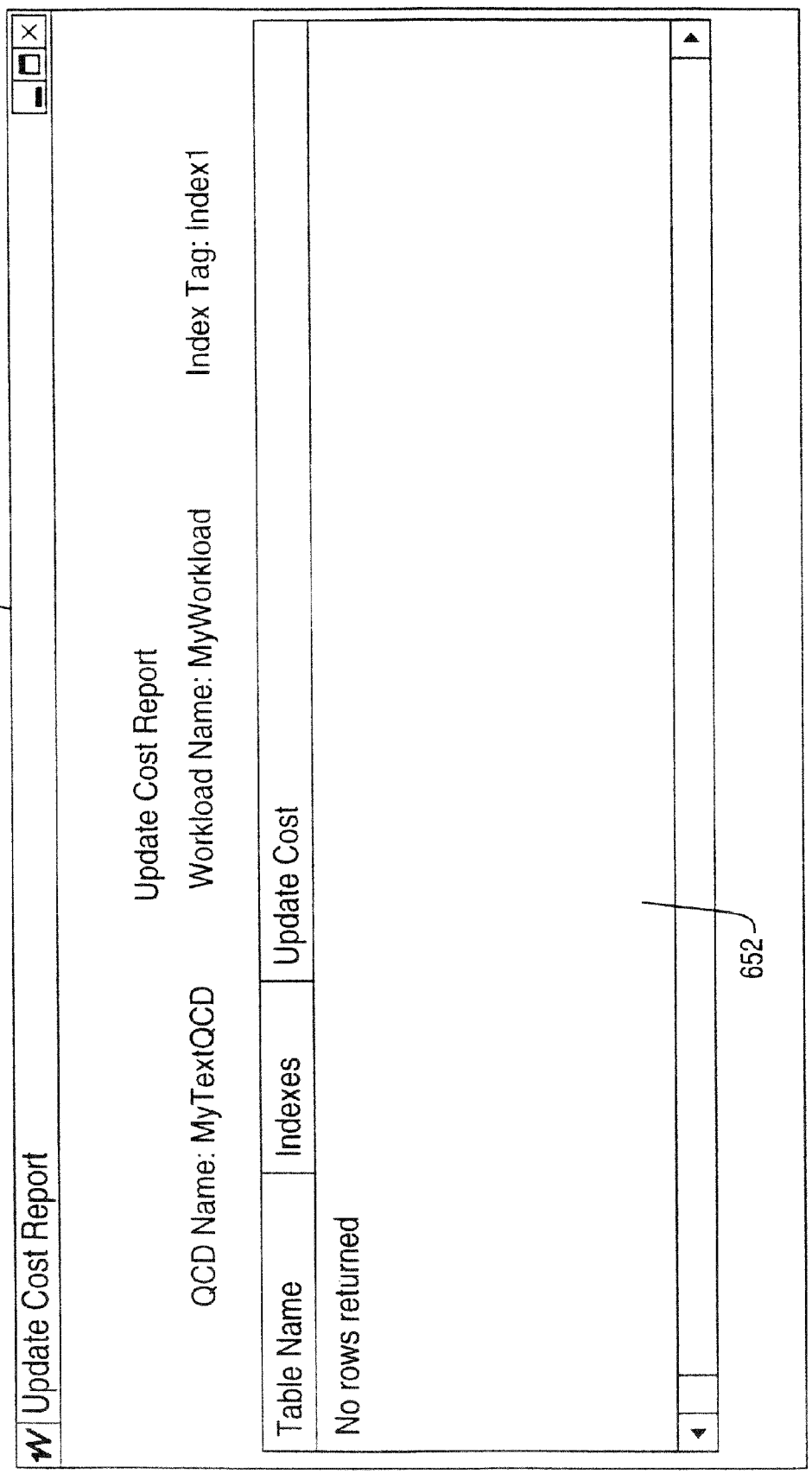

FIG. 35 shows an Update Cost Report screen 650, which includes a display box 652 to display parameters associated with maintenance cost of indexes when updates take place on tables of the workload. A Table Name column gives the name of the table in which the indexes exist; an Indexes column provides the name of the indexes existing and recommended for the table; and the Update Cost column provides the maintenance cost of the indexes when updates to the table take place. Maintenance cost refers to the cost (e.g., I/O operations needed) associated with maintaining indexes for a table.

FIG. 36 shows a Disk Space Analysis Report screen 660 that includes a display box 662. The display box 662 displays information about the estimated permanent space required to store the recommended indexes in the database. A Table Name column gives the user information about the table name; an Index Name column provides the name of the index; and a Size column provides the estimated size needed for storing the index.

FIG. 37 shows a Table Usage Report screen 670 that displays information about the usage of tables in the workload. In a display box 672 of the screen 670, a Table Name column provides the name of the table, an Access Count column provides the number of accesses made by each statement on the table; and a Statement Text column provides the text of the SQL statement.

A Workload Analysis Screen 680, shown in FIG. 38, provides information about the workload. A display box 682 in the Workload Analysis Report screen 680 includes a Statement Type column to provide the type of the statement (SELECT, INSERT, etc.); a Cost column to provide the estimated execution cost of the statement with the recommended indexes; a Relative Cost column to provided the execution cost of the statement with respect to the execution cost of the entire workload; a Table Name column to provide the tables access by the statement; a Columns column to provide the columns accessed by the statement in the table; a Columns (with join conditions) column to provide the columns that contain join conditions in the table; and a Statement Text column to provide the text of the SQL statement. For each statement, multiple rows exist in the report, with one row for each table.

FIG. 39 shows a Summary Analysis Report screen 690, which provides the overall summary of the analysis. A display box 692 in the Summary Report screen 690 includes a Table Name column to provide the table name on which the recommendations are made; an Index Name column to provide the name of the index; an Index DDL column to provide a DDL text of the index recommendations; and a Stats DDL column to provide a DDL text of a statement used to collect or drop statistics.

FIG. 40 shows a Table Scan Report screen 700 that provides information about the usage of tables including table cardinality, AMPs usage, and geography information in the workload. The table provides details on how tables in the workload are used for different queries to help the user check whether a given table is duplicated on the AMPs or is hash redistributed. The report also helps the user in selecting the tables and indexes should be recommended.

The screen 700 includes a display box 702 that includes an Owner column to provide the table owner database; a Table Name column to provide the table name; a Cardinality column to provide the table cardinality; an AMPs Retrieves Info column to provide the AMPs retrieves information; a Geography Info column to provide the table geography information; and a Statement Text column to provide the text of the SQL statement.

Another feature provided by the index wizard is workload clean up, in which the workload details are removed from the QCD. This option is invoked by selecting the Workload CleanUp menu item from the Tools menu 460 (FIG. 19). A Workload Clean Up screen 710 is illustrated in FIG. 41. A QCD Name field specifies the name of the QCD, a Workload Name field specifies the name of the workload. A display box 712 indicates a Query ID of the statement; a frequency of the statement; and the statement text itself. Also, a Workload Status selection box 714 displays the status of the operations on a workload. A Recommendation ID column displays the index recommendations identifier, if analysis is performed on a workload. The following columns are also present: Index Tag to display the index tag of the recommendations (for each recommendation, a new row for Index Tag is entered into the WorkloadStatus table); Validated System to display the name of the system on which the validation was last performed; Validated TimeStamp to display the timestamp when the validation was last performed; Validated QCD to display the QCD on which validation was performed; Recommendations Applied System to display the system on which the recommendations were applied (a new row is added each time the recommendations are applied on a system); Delete Workload to delete the entire workload; Delete Plans to delete plans of the statements in the workload along with the workload (if plans are present in some other workload, the plans are not deleted); and Delete Analysis to delete the analysis details made on the workload (the analysis details include the deletion of the validation details).

Index validation is the process of checking whether the recommended indexes, when created, actually improve system performance. Index validation involves an operation that permits the optimizer module to use the recommended indexes in plan generation.

The index recommendations are validated on a set of statements analyzed by the index wizard tool. The statements are submitted to the database system (either the test system 10 or the target database system 14) in a "no execute" mode (in other words, the statements are analyzed, not executed). During validation, the query plans are saved into the specified QCD.

Figure 42:
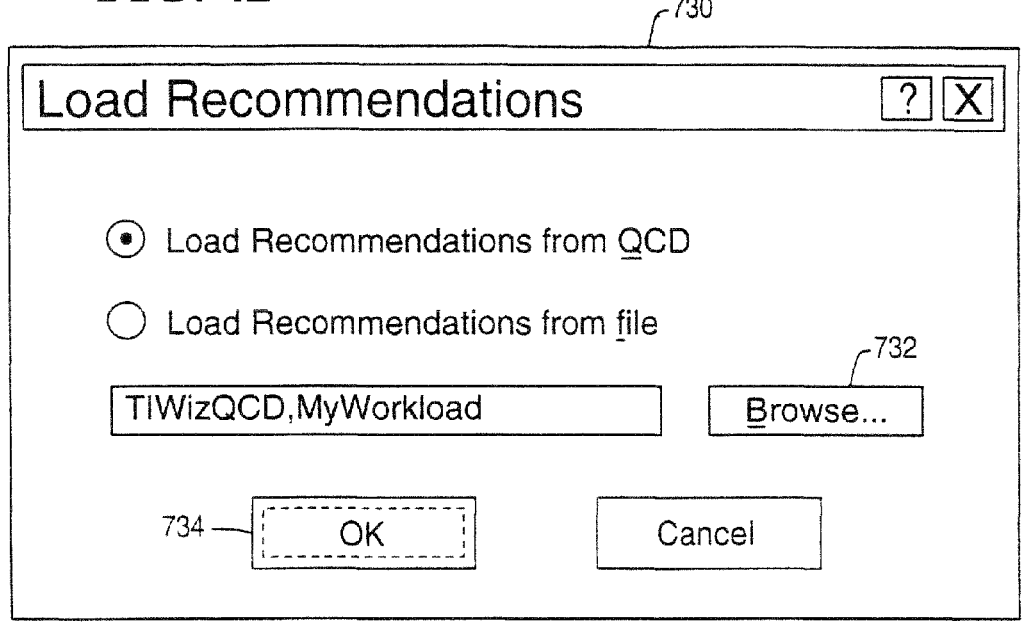
FIGS. 42 and 43 illustrate screens for loading index recommendations.

To start index validation, the Validation menu item from the Index-Validation menu 440 (FIG. 17) is selected. In response, a Load Recommendations dialog screen 730 appears (FIG. 42). The Load Recommendations screen 730 provides an option to load the recommendations from a file, or to load recommendations from the QCD. To load from a file, a Browse button 732 enables selection of a desired file.

Figure 43:
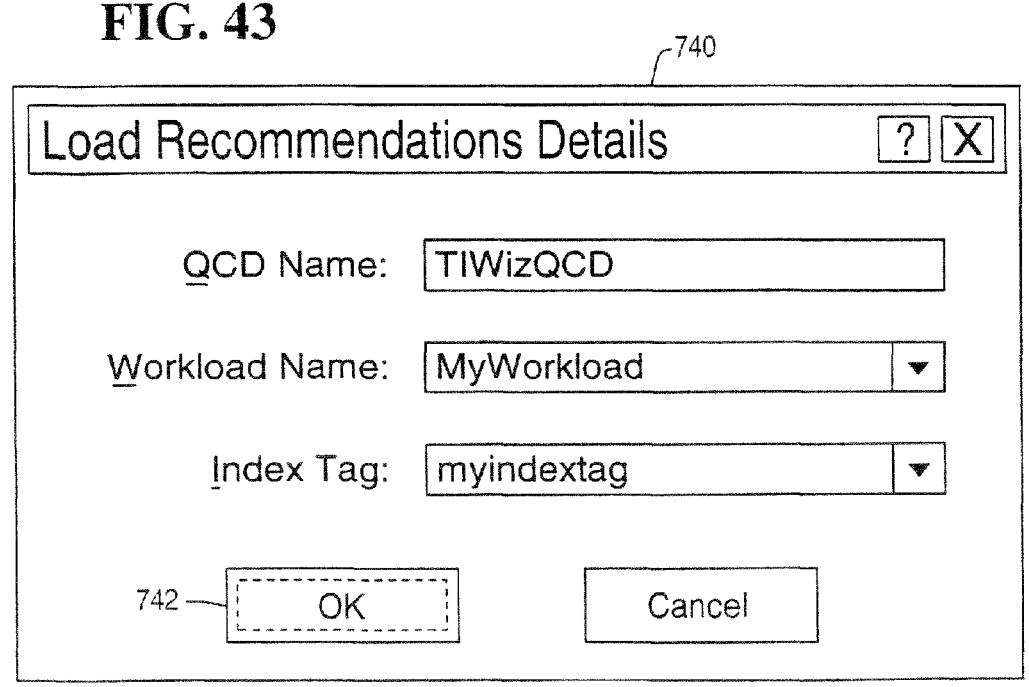
Figure 44:
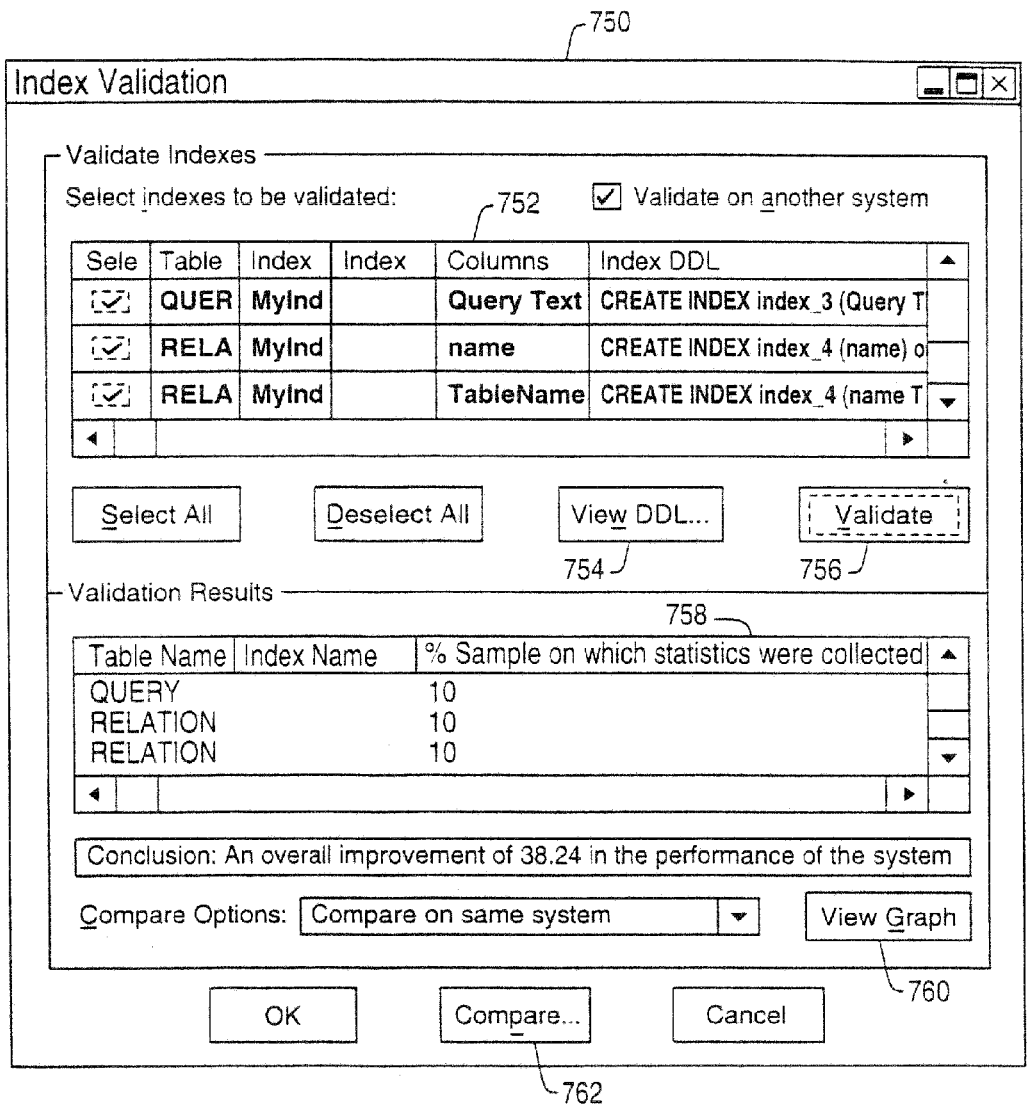
FIG. 44 illustrates a screen for performing index validation.

In response to activation of an OK button 734 in the Load Recommendations screen 730, a Load Recommendation Details screen 740 is displayed (FIG. 43). The screen 740 includes a QCD Name field, a Workload Name field, and an Index Tag field. When the OK button 742 of the Load Recommendation Details screen 740 is selected, an Index Validation screen 750 is displayed (FIG. 44). A Validate On Another System option is selectable to validate the recommendations on another system. A Selected column in a selection box 752 indicates whether an index is selected for validation or not; a Table Name column indicates the table name on which the index is recommended; an Index Tag column provides the tag of the index as stored in the IndexRecommendations table in the QCD; an Index Name column provides the name of the index; a Columns column provides a list of columns in the index; the Index DDL column provides a part of the DDL statement to create the index; a Stats DDL column provides the COLLECT/DROP STATISTICS recommendations for the recommended index.

A View DDL button 754 is used to view the DDL statement to create the selected index. A Validate button 756 is used to validate indexes for the workload. A Validation Results display box 750 displays the results of the validation process. The Validation Results display box 758 includes a Table Name column to provide the name of the table on which the index is recommended; an Index Name column to provide the name of the index; a % Sample On Which Statistics Were Collected column to provide the percentage of the sample on which the statistics where collected for the recommended index.

A View Graph button 760 when activated causes display of the graph for displaying the execution cost of the statements before and after validation. A Compare button 762 compares the execution plans of the statements with and without the index recommendations.

The visual explain and compare module 42 or 54 uses a set of defined icons to graphically depict an execution plan generated by the optimizer module 18 in the graphical user interface 28 of the client system 20. Example icons that are displayable in the graphical user interface 28 include a Select icon, which represents the SQL SELECT statement to return rows in the form of a result table. An INSERT icon represents an SQL INSERT statement that inserts a row into a result table. A DELETE icon represents a DELETE statement that deletes one or more rows from a result table. An UPDATE icon represents an UPDATE statement that allows a user to modify data in one or more rows of a table.

Various lock step icons are also provided, including a ReadLock icon that represents a lock that is placed when a SELECT statement is performed to restrict access by a user who requires exclusive or write locks. A WriteLock icon represents a write lock that is performed when INSERT, DELETE, and UPDATE statements are performed on a table to restrict access by another user. Other icons may also be defined for other types of locks.

Icons representing retrieval of data are also defined. For example, an AllAMPRetrieve icon represents an all AMP retrieval that is performed if data resides on more than two AMPs. A SingleAMPRetrieve icon represents retrieval of data from a single AMP. A TwoAMPRetrieve icon represents an all AMP retrieval that is performed if data resides on two AMPs. A MultiAMPRetrieve icon represents multi-AMP retrieval when using various hashing combinations.

Icons are also defined to represent data redistribution in the relational database system. A DuplicatedOnAllAMPs icon represents duplication of resultant rows across all AMPs. A Re-DistributedOnAllAMPS icon represents re-distribution of resultant rows across all AMPs. A LocallyBuildOnAllAMPs icon represents locally building resultant rows on all AMPs.

Various icons are also used for representing tables and spools. A Table icon represents the table on which the operation is to be performed. A Spool icon represents a spool where data is temporarily stored. Many other types of icons may also be defined. The types of icons that are desired is implementation specific, with different embodiments employing different types of icons to represent different operations and components of the relational database management system.

Figure 45:
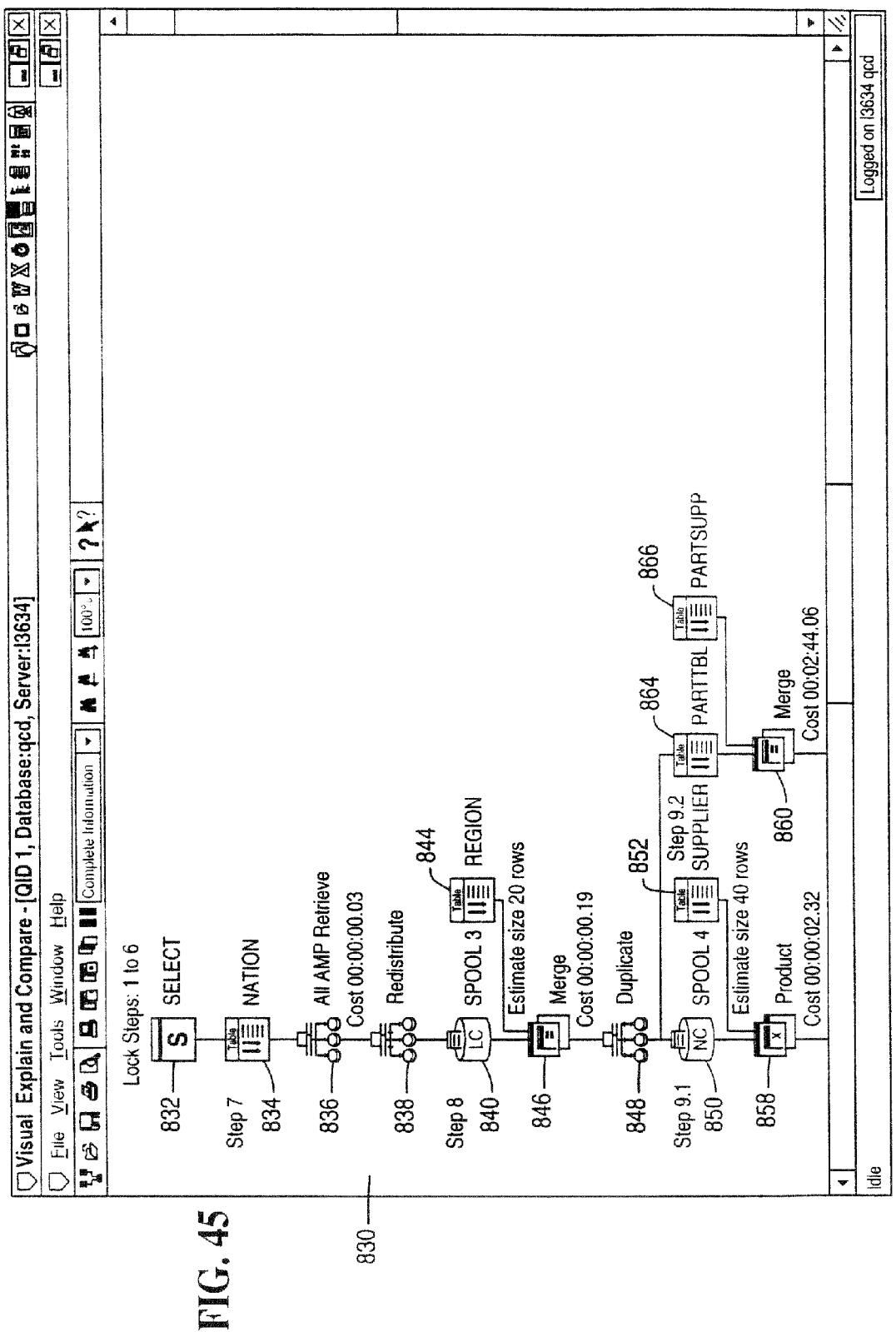
FIGS. 45 and 46 illustrate screens of a visual explain and compare tool.

As shown in FIG. 45, a portion of an example query execution plan is shown in a screen 830. The example is provided for illustration purposes; other execution plans of varying degrees of complexity are also displayable by the visual explain and compare module. The screen 830 contains various icons that correspond to the operations or components involved in each step of the execution plan. Steps 1 through 6 are lock steps in which six tables are selected, as indicated by the SELECT icon 832. One of the tables selected is the Nation table, represented by the icon 834. Next, an AllAMPRetrieve icon 836 represents retrieval of data from the Nation table 834 residing on more than two AMPs. The cost of the AllAMPRetrieve operation is about 0.3 seconds (00:00:00.03) in the example. Next, a Redistribute icon 838 represents an operation to redistribute a resultant row (created by retrieval of data from the Nation table 834) across all AMPs.

The data generated by the previous operations are temporarily stored in "Spool 3," as represented by a spool icon 840, which represents a temporary storage location, such as on a disk or other storage device. A spool temporarily stores the result of an operation performed on two or more tables. The estimated size of the resultant row stored in Spool 3 is 20 rows. An LC indication is provided in the spool icon 840 to indicate that the estimated size is a "low confidence" estimate.

Next a merge join operation (represented by icon 846) is performed on data stored in Spool 3 and a row from the Region table (represented by icon 844). The estimated cost of the merge join operation is about 0.19 seconds (00:00:00.19). A duplicate operation is then performed (as represented by icon 848) to duplicate the row resulting from the merge join operation across the AMPs. The merge-join resultant row is stored in "Spool 4," as represented by a spool icon 850. The estimated size of the merge-join resultant row is 40 rows.

Operations 858 (a relational product join) and 860 (a merge join) are performed in parallel. The product join operation is performed on the resultant row in Spool 4 and a row from a Supplier table (icon 852). The merge join is performed on a row from a PARTTBL table (icon 854) and a PARTSUPP table (856). The estimated cost of the product join operation is about 2.32 seconds (00:00:02.32), and the estimated cost of the merge join operation is about 2 minutes and 44.06 seconds (00:02:44.06).

Figure 46:
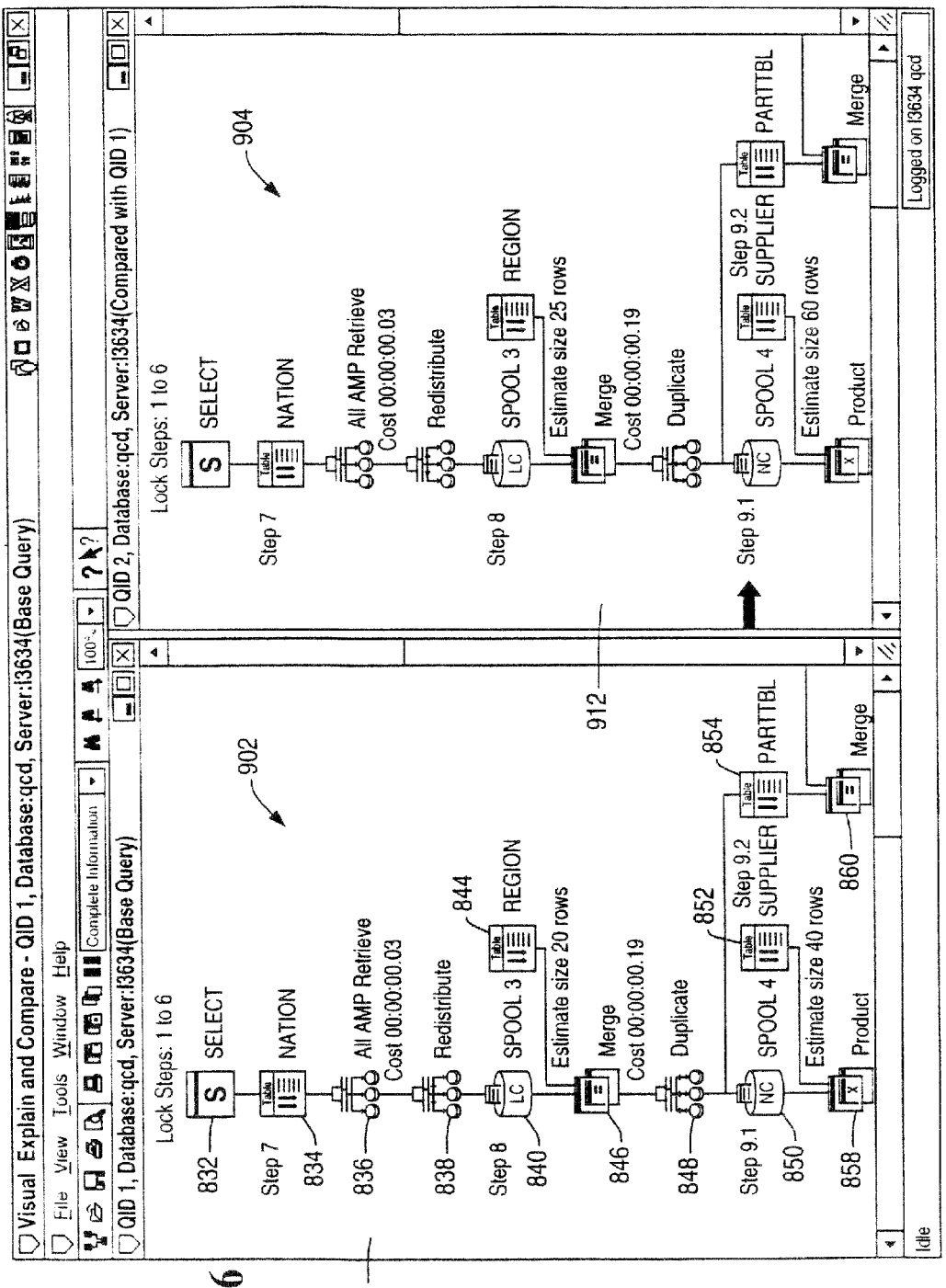

As shown in FIG. 46, in response to selection of query execution plans for comparison, the base execution plan 902 is displayed in a first screen 910 and the second execution plan 904 is displayed in a second screen 912. The base execution plan 902 is the same as the execution plan shown in FIG. 45 (and the steps are assigned the same reference numerals).

One technique of improving accuracy in estimating performance of a query is by changing the index of a table (as discussed above). The execution plan 902 displayed in screen 910 is generated based on existing indexes. However, the execution plan 904 is generated with recommended indexes from the index wizard tool.

Instructions of the various software routines or modules discussed herein (such as those in the client system 20, test system 10, and target database systems 14) are stored on one or more storage devices in the corresponding systems and loaded for execution on corresponding control units or processors. The control units or processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the various software modules and layers) are stored in respective storage units, which can be implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks; other magnetic media including tape; and optical media such as compact disks (CDs) or digital video disks (DVDs).

The instructions of the software modules or layers are loaded or transported to each device or system in one of many different ways. For example, code segments including instructions stored on floppy disks, CD or DVD media, a hard disk, or transported through a network interface card, modem, or other interface device are loaded into the device or system and executed as corresponding software modules or layers. In the loading or transport process, data signals that are embodied in carrier waves (transmitted over telephone lines, network lines, wireless links, cables, and the like) communicate the code segments, including instructions, to the device or system. Such carrier waves are in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A system comprising:
   at least one processor;
   a first module executable on the at least one processor to:
   receive a set of queries;
   scan predicates in the queries to identify terms in the predicates satisfying predefined properties;
   provide potential indexes based on the terms satisfying the predefined properties; and
   eliminate one or more of the potential indexes based on one or more predetermined criteria to produce a set of candidate indexes that excludes the eliminated one or more potential indexes; and
   an optimizer executable on the at least one processor to generate a recommended index from the set of candidate indexes.

2. The system of claim 1, wherein the set of queries comprises a set of SQL statements.

3. The system of claim 1, wherein the optimizer is executable to generate at least another recommended index from the set of candidate indexes.

4. The system of claim 1, wherein the optimizer is configured to use statistics, wherein the statistics are based on a scan of a sample of one or more tables, the sample less than all the rows of the one or more tables.

5. The system of claim 4, further comprising a user interface to receive an indication of a user-specified size of the sample.

6. The system of claim 1, wherein the one or more predetermined criteria comprises a threshold change rate, the first module configured to eliminate the one or more potential indexes having a change rate exceeding the threshold change rate.

7. The system of claim 6, wherein the first module is configured to further eliminate a potential index that is a subset of another potential index.

8. The system of claim 6, wherein the change rate of a column that is part of one of the potential indexes indicates a rate of change of values of the column.

9. The system of claim 1, further comprising an analysis module configured to apply a genetic algorithm, the analysis module configured to cooperate with the optimizer to generate the recommended index.

10. The system of claim 1, further comprising a validation module configured to validate the recommended index in a database system.

11. The system of claim 10, further comprising a user interface to receive user-specified one or more indexes, the optimizer configured to generate a cost associated with a query plan based on the user-specified one or more indexes.

12. The system of claim 11, wherein the user interface is configured to receive a user-specified percentage value, the system further comprising another module to collect statistics based on a sample of rows of one or more tables, a size of the sample based on the user-specified percentage value.

13. The system of claim 1, further comprising an analysis module configured to apply a predetermined algorithm, the analysis module configured to cooperate with the optimizer to generate the recommended index.

14. The system of claim 13, wherein the analysis module is configured to submit candidate indexes to the optimizer, the optimizer configured to determine the cost of one or more of the queries based on the candidate indexes.

15. The system of claim 14, wherein the optimizer is configured to select the candidate index associated with a lowest cost as the recommended index.

16. The system of claim 1, wherein the set of queries comprises a workload captured in a database system, and wherein the database system is a parallel system having plural access modules.

17. The system of claim 1, wherein the optimizer is responsive to a validation command to generate a first query plan using the recommended index, and to generate a second query plan without using the recommended index.

18. The system of claim 1, wherein the terms satisfying the predefined properties are selected from the group consisting of an explicit term, a bind term, and a range term.

19. A method comprising:
   receiving, by a system having a processor, a set of queries;
   scanning, by the system, predicates in the queries to identify terms in the predicates satisfying predefined properties;
   providing, by the system, potential indexes based on the terms satisfying the predefined properties;

eliminating, by the system, one or more of the potential indexes based on one or more predetermined criteria to produce a set of candidate indexes that excludes the eliminated one or more potential indexes; and generating, by the system based on output of an optimizer, a recommended index from the set of candidate indexes.

20. The method of claim 19, wherein the one or more predetermined criteria comprises a threshold change rate, the eliminated one or more potential indexes each has a change rate exceeding the threshold change rate.

21. The method of claim 20, wherein the one or more predetermined criteria further comprises one potential index being a subset of another potential index, the eliminated one or more potential indexes including the one potential index, the eliminated one or more potential indexes including the one potential index.

22. The method of claim 19, further comprising applying a genetic algorithm to generate the recommended index.

23. The method of claim 19, wherein the terms satisfying the predefined properties are selected from the group consisting of an explicit term, a bind term, and a range term.

* * * * *